US010746339B2

(12) United States Patent
Sue et al.

(10) Patent No.: US 10,746,339 B2
(45) Date of Patent: Aug. 18, 2020

(54) GRIPPING APPARATUS AND DEVICES FOR PLUGGING OF PIPES, ORIFICES OR CONNECTING

(71) Applicant: USA Industries, Inc., South Houston, TX (US)

(72) Inventors: Tracy Sue, Baytown, TX (US); Casey Sue, Baytown, TX (US); Richard Sallee, Liberty, TX (US)

(73) Assignee: USA Industries, Inc., South Houston, TX (US)

( * ) Notice: Subject to any disclaimer, the term of this patent is extended or adjusted under 35 U.S.C. 154(b) by 101 days.

(21) Appl. No.: 15/852,239

(22) Filed: Dec. 22, 2017

(65) Prior Publication Data

US 2018/0119866 A1 May 3, 2018

Related U.S. Application Data

(63) Continuation-in-part of application No. 15/356,206, filed on Nov. 18, 2016, now Pat. No. 9,927,058.

(Continued)

(51) Int. Cl.
*F16L 55/132* (2006.01)
*F16L 55/128* (2006.01)
(Continued)

(52) U.S. Cl.
CPC ......... *F16L 55/132* (2013.01); *F16L 55/1283* (2013.01); *F16L 55/136* (2013.01); *F16L 2101/60* (2013.01)

(58) Field of Classification Search
CPC . F16L 55/1133; F16L 55/132; F16L 55/1283; F16L 2101/60
(Continued)

(56) References Cited

U.S. PATENT DOCUMENTS 1,933,935 A 11/1933 Santiago
2,375,995 A 5/1945 Kaeser
(Continued)

FOREIGN PATENT DOCUMENTS

EP 0240851 10/1987
EP 0240851 A2 10/1987
WO 2017129631 8/2017

OTHER PUBLICATIONS

Shane Thomas, PCT Written Opinion of the International Searching Authority, dated Feb. 1, 2017, 11 pages, ISA/US, Alexandria, Virginia, United States.

(Continued)

*Primary Examiner* — Craig M Schneider
*Assistant Examiner* — David R Deal
(74) *Attorney, Agent, or Firm* — Oathout Law Firm; Mark A. Oathout; Laura Tu

(57) ABSTRACT

The disclosure relates to a gripping apparatus, for use in connecting to a pipe wherein the pipe defines an inside radius, the apparatus having at least one discrete gripping device mounted on a body, wherein the body is a wedge cone; an outer surface on each of the at least one discrete gripping device, wherein the outer surface has a transition surface defined by a means for reducing any sharp transition point; a collective actuation-retraction mechanism connected to the wedge cone and to each of the at least one discrete gripping device; and a collective extension-retractable mechanism connected to each of at least one discrete gripping device. The disclosure further relates to an alternative exemplary embodiment wherein the gripping apparatus further includes a spring, wherein the spring pre-biases each of the at least one discrete gripping device beyond the inside radius of the pipe to instantly grip the inside radius.

20 Claims, 64 Drawing Sheets

Related U.S. Application Data

(60) Provisional application No. 62/258,311, filed on Nov. 20, 2015, provisional application No. 62/313,376, filed on Mar. 25, 2016, provisional application No. 62/366,591, filed on Jul. 25, 2016.

(51) Int. Cl.
*F16L 55/136* (2006.01)
*F16L 101/60* (2006.01)

(58) Field of Classification Search
USPC .......................................................... 138/89
See application file for complete search history.

(56) References Cited

U.S. PATENT DOCUMENTS

| | | | |
|---|---|---|---|
| 2,607,370 A | | 8/1952 | Anderson |
| 3,837,214 A | | 9/1974 | Guest |
| 3,943,982 A | | 3/1976 | Lecordier |
| 3,978,678 A | * | 9/1976 | Duncan .............. F16L 55/1283 405/171 |
| 4,332,277 A | * | 6/1982 | Adkins .............. F16L 55/1283 138/89 |
| 4,422,477 A | * | 12/1983 | Wittman ............ F16L 55/1283 138/89 |
| 4,498,811 A | * | 2/1985 | Fern ................... F16L 55/1283 138/89 |
| 4,658,860 A | | 4/1987 | Reaux |
| 5,029,614 A | * | 7/1991 | Lara .................... F16L 55/1283 138/89 |
| 5,924,454 A | * | 7/1999 | Dyck .................. F16L 55/1283 138/89 |
| 6,732,762 B2 | * | 5/2004 | Russell ............... F16L 55/136 138/89 |
| 6,880,642 B1 | | 4/2005 | Garrett |
| 7,124,779 B2 | * | 10/2006 | Syse .................... F16L 55/136 138/89 |
| 7,137,308 B2 | * | 11/2006 | Harris ................. G01M 3/005 73/865.8 |
| 9,045,981 B2 | * | 6/2015 | Baas .................... E04G 25/08 |
| 9,664,588 B2 | | 5/2017 | Kotlyar et al. |
| 2002/0101040 A1 | * | 8/2002 | Russell ............... F16L 55/136 277/609 |
| 2004/0194967 A1 | | 10/2004 | Jaensch |
| 2008/0092970 A1 | * | 4/2008 | Carnevali ........... F16L 55/132 138/89 |
| 2010/0051130 A1 | * | 3/2010 | Syse .................... F16L 55/136 138/89 |
| 2010/0133864 A1 | | 6/2010 | Syse |
| 2014/0023440 A1 | | 1/2014 | Early |
| 2015/0063920 A1 | | 3/2015 | Lovett |
| 2017/0234102 A1 | | 8/2017 | Svartvatn et al. |

OTHER PUBLICATIONS

Shane Thomas, PCT International Search Report, dated Feb. 1, 2017, 3 pages, ISA/US, Alexandria, Virginia, United States.
Machine Translation of EP0240851, Feb. 1, 2017, 8 pages, ISA/US, Alexandria, Virginia, United States.
Shane Thomas, PCT/US2016/062928 International Search Report, dated Feb. 1, 2017, 3 pages, International Searching Authority US, Alexandria, Virginia.
Shane Thomas, PCT/US2016/062928 Written Opinion of the International Searching Authority, dated Feb. 1, 2017, 11 pages, International Searching Authority US, Alexandria, Virginia.
Shane Thomas, PCT/US2018/067165 International Search Report and Written Opinion of the International Searching Authority, dated May 8, 2019, 15 pages, International Searching Authority US, Alexandria, Virginia.
Nils Untermann, EP 16 86 7288 Supplementary European Search Report, dated Oct. 2, 2019, 8 pages, European Patent Office, Germany.

* cited by examiner

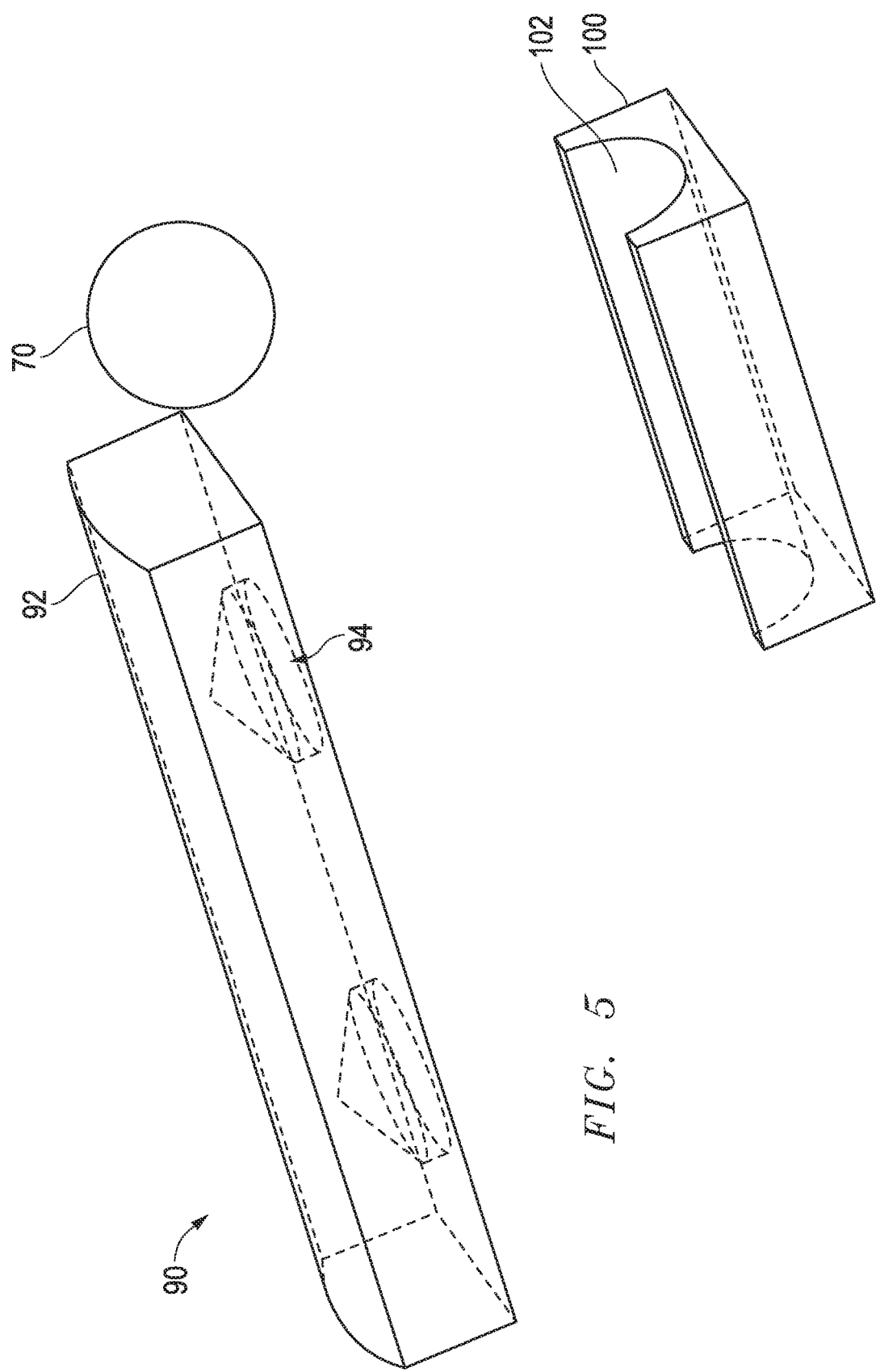

GRIPPING APPARATUS AND DEVICES FOR PLUGGING OF PIPES, ORIFICES OR CONNECTING

STATEMENTS REGARDING FEDERALLY SPONSORED RESEARCH OR DEVELOPMENT

Not Applicable.

NAMES OF THE PARTIES TO A JOINT RESEARCH AGREEMENT

Not Applicable.

BACKGROUND

Technical Field

Plugging systems for plugging pipes in, for example but not limited to, refineries, petro-chemical plants, and power plants.

BRIEF SUMMARY

A gripping apparatus for use in gripping a pipe, for holding forces, or restraining relative movement. The pipe defines an inside radius. The gripping apparatus has an outer surface where the outer surface defines a transition surface or a curve. In certain embodiments the transition surface or curve may have a radius less than or equal to the inside radius of the pipe.

The disclosure further relates to a gripping apparatus, for use in connecting to a pipe wherein the pipe defines an inside radius, the apparatus having at least one discrete gripping device mounted on a body, wherein the body is a wedge cone; an outer surface on each of the at least one discrete gripping device, wherein the outer surface has a transition surface defined by a means for reducing any sharp transition point; a collective actuation-retraction mechanism connected to the wedge cone and to each of the at least one discrete gripping device; and a collective extension-retractable mechanism connected to each of the at least one discrete gripping device. The disclosure further relates to an alternative exemplary embodiment wherein the gripping apparatus further includes a spring, wherein the spring pre-biases each of the at least one discrete gripping device beyond the inside radius of the pipe to instantly grip the inside radius.

As used herein the term "pipe" shall refer to a conduit, pipe, tubular, duct, casing and/or the like. As used herein the term "connection" shall or may include plugging at such connection.

BRIEF DESCRIPTION OF THE DRAWINGS

The exemplary embodiments may be better understood, and numerous objects, features, and advantages made apparent to those skilled in the art by referencing the accompanying drawings. These drawings are used to illustrate only exemplary embodiments, and are not to be considered limiting of its scope, for the disclosure may admit to other equally effective exemplary embodiments. The figures are not necessarily to scale and certain features and certain views of the figures may be shown exaggerated in scale or in schematic in the interest of clarity and conciseness.

FIG. 5 depicts a schematic perspective view of another embodiment having a gripping pad in conjunction with a ball.

FIG. 6 depicts a schematic perspective view of another embodiment depicting a pocket or channel insert for use with balls.

DESCRIPTION OF EMBODIMENT(S)

Figure 1:
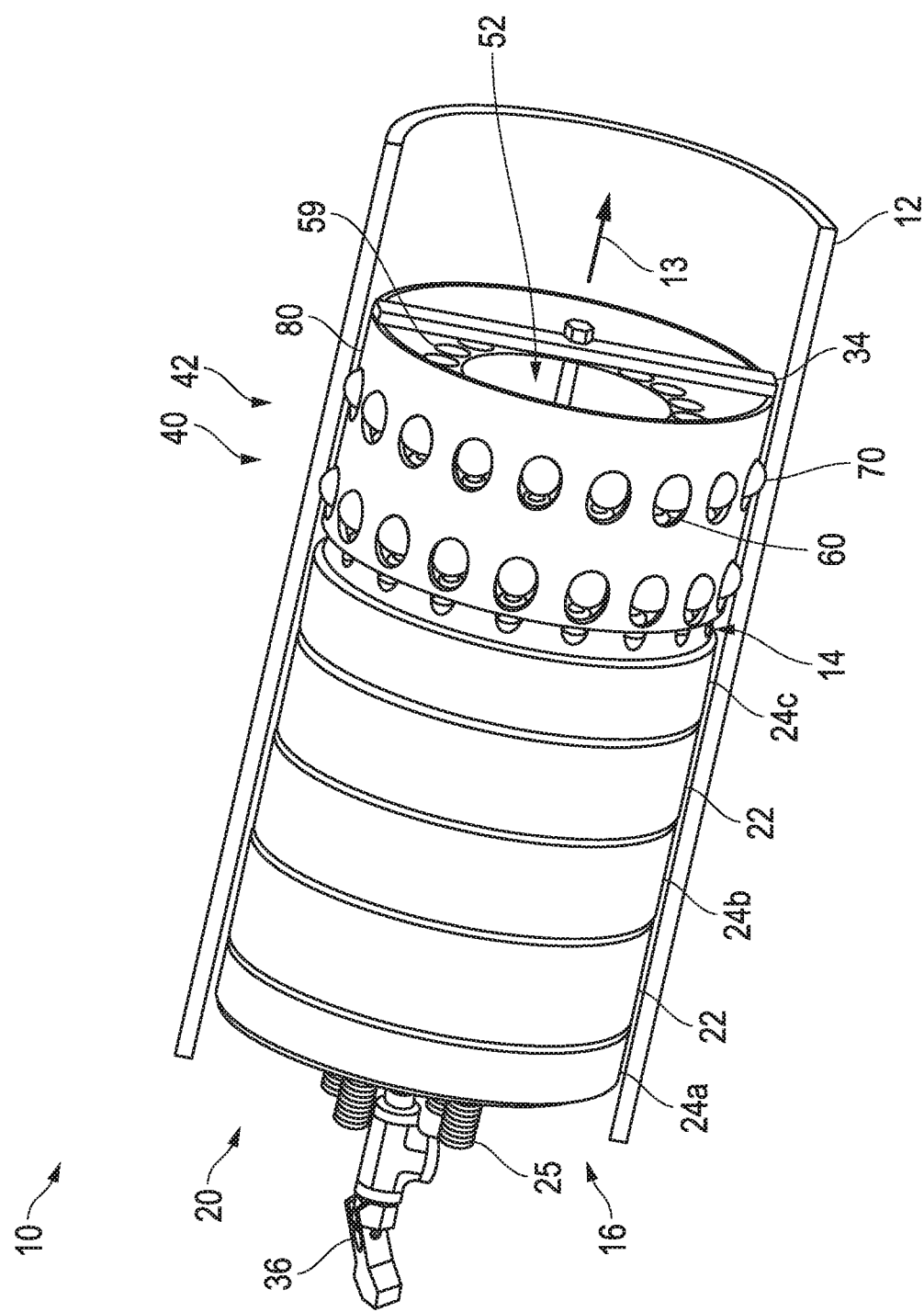
FIG. 1 depicts a perspective view of a gripping plug according to one embodiment within a cross-section of pipe with balls gripping the pipe.

The description that follows includes exemplary apparatus, methods, techniques, and instruction sequences that embody techniques of the inventive subject matter. However, it is understood that the described embodiments may be practiced without these specific details.

Referring to FIGS. 1-4 an exemplary embodiment of a gripping or grasping plug 10 in a pipe, orifice or tube 12 is shown. Such a gripping plug 10 is for use in plugging pipes 12 in, for example but not limited to, refineries, petrochemical plants, and power plants (in e.g. exchangers, heater, boilers, etc.) for reasons of safety, cleaning, maintenance, construction, welding, testing, etc. Such a gripping plug 10 may be used for making a connection to a tube or pipe 12, such as, by way of example only, for connecting a cable to an open tube anchored subsea on the ocean floor, or as, by way of example only, for establishing one or more electrical connections. Gripping plug 310 (see FIG. 36) may also be used for plugging externally or making an external connection to a pipe, rod or tube 312.

The gripping plug 10 includes a conventional or other plugging device 20 (e.g. double-block, expansion, etc.). The conventional or other plugging device 20 in one exemplary conventional embodiment includes seals (e.g. polyurethane seals) 22 and clamping plates 24a, 24b, 24c which may be squeezed together, for example, by bolts 25. Inner limit rings 26 border the inner diameter of the seals 22, abut portions of the clamping plates 24a, 24b, 24c, prohibit inward squeezed of the seals 22. One or more of clamping plates 24a, 24b, and 24c define a hole 28 therethrough. A vent tube 30 may be mounted or attached within one of more of clamping plates 24a, 24b, and 24c through holes 28. The vent tube 30 extends through the plugging device 20 to optional vent the pipe 12 past the plugging device 20.

Figure 43:
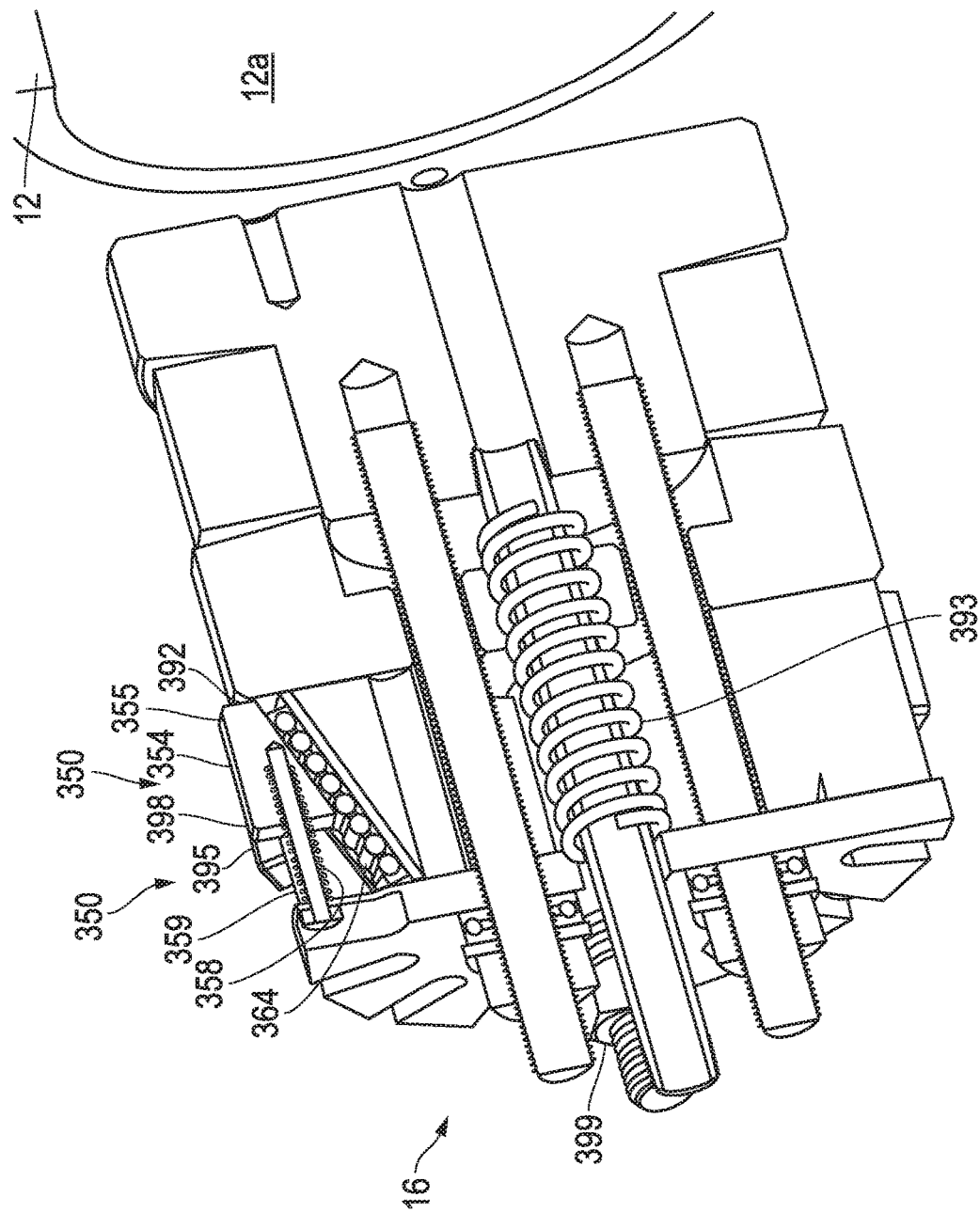
FIG. 43 depicts a schematic sectional perspective view of an alternate exemplary embodiment of a gripping apparatus with wedge jaws.

In the exemplary embodiment shown the gripping plug 10 includes a gripping or gripping apparatus 40. It is to be noted that the gripping apparatus 40 may be mounted, attached, or unitary on the against-pressure or fluid sealed side 14 of the plugging device 20 (as shown), on the atmospheric side 16 (see, e.g., FIGS. 43-44), or may be separate from the plugging device 20 (see, e.g., FIG. 11).

Figure 2:
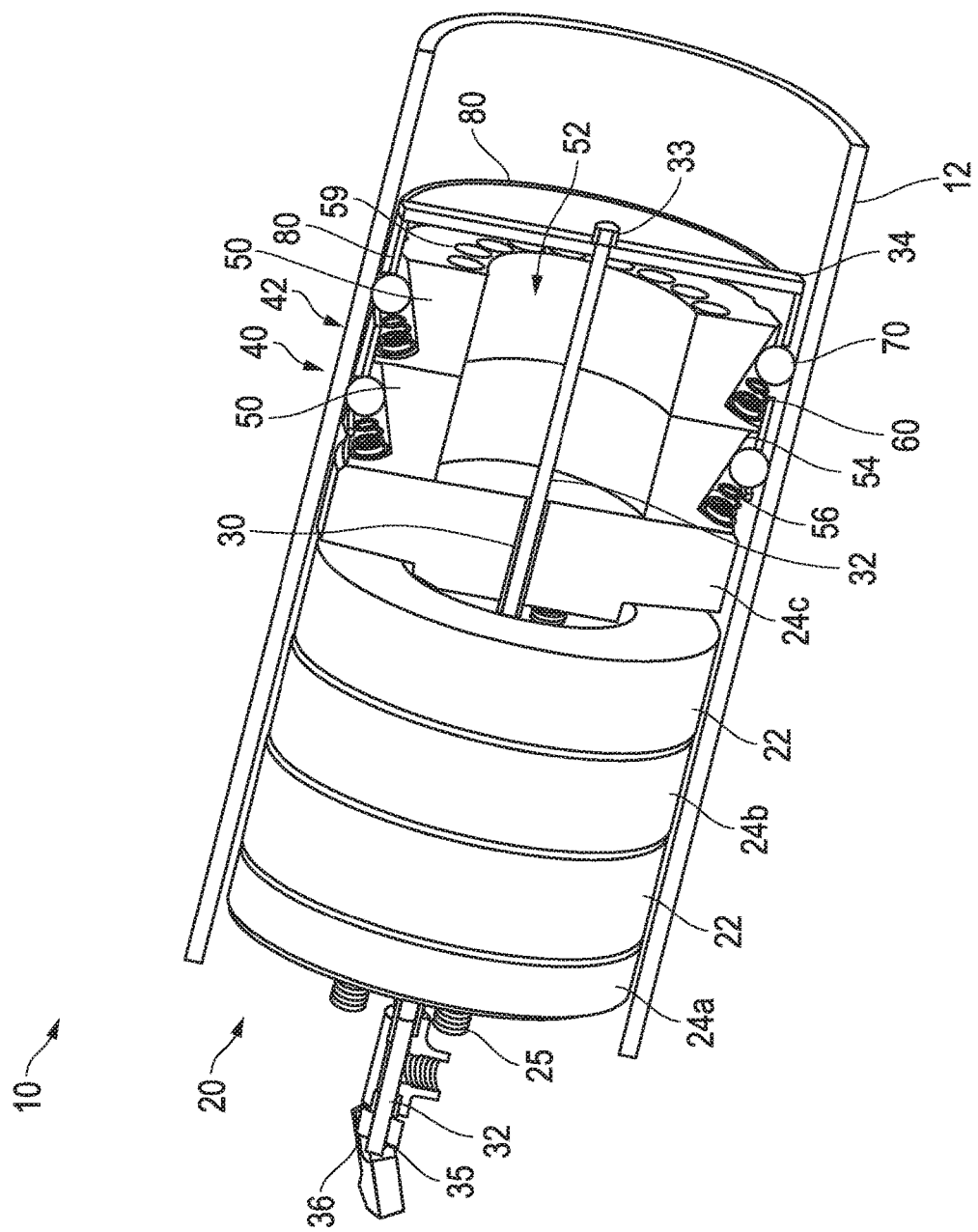
FIG. 2 depicts another perspective view of the embodiment of FIG. 1 showing the gripping apparatus in cross-section.
Figure 2A:
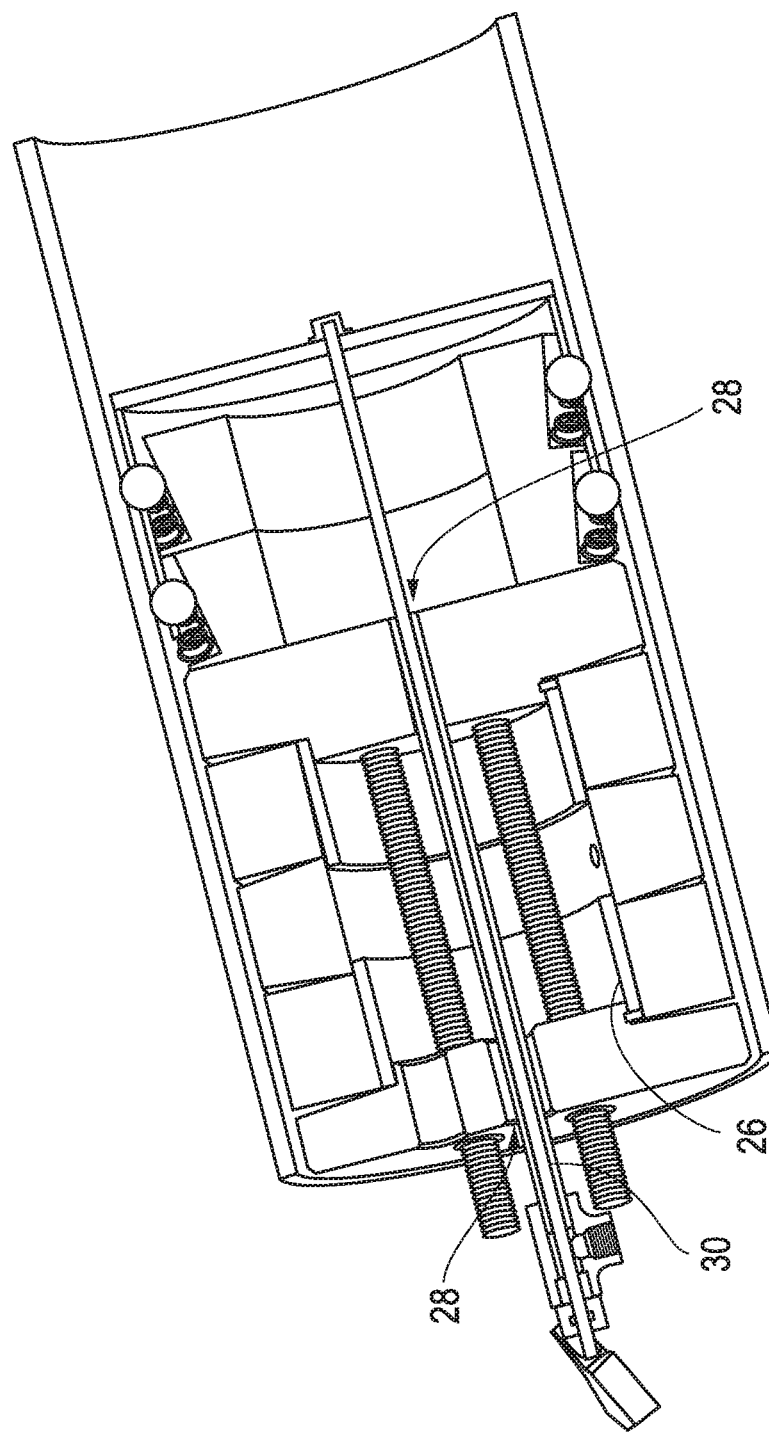
FIG. 2A is a view similar to FIG. 2 with the conventional plugging device in cross-section.
Figure 3:
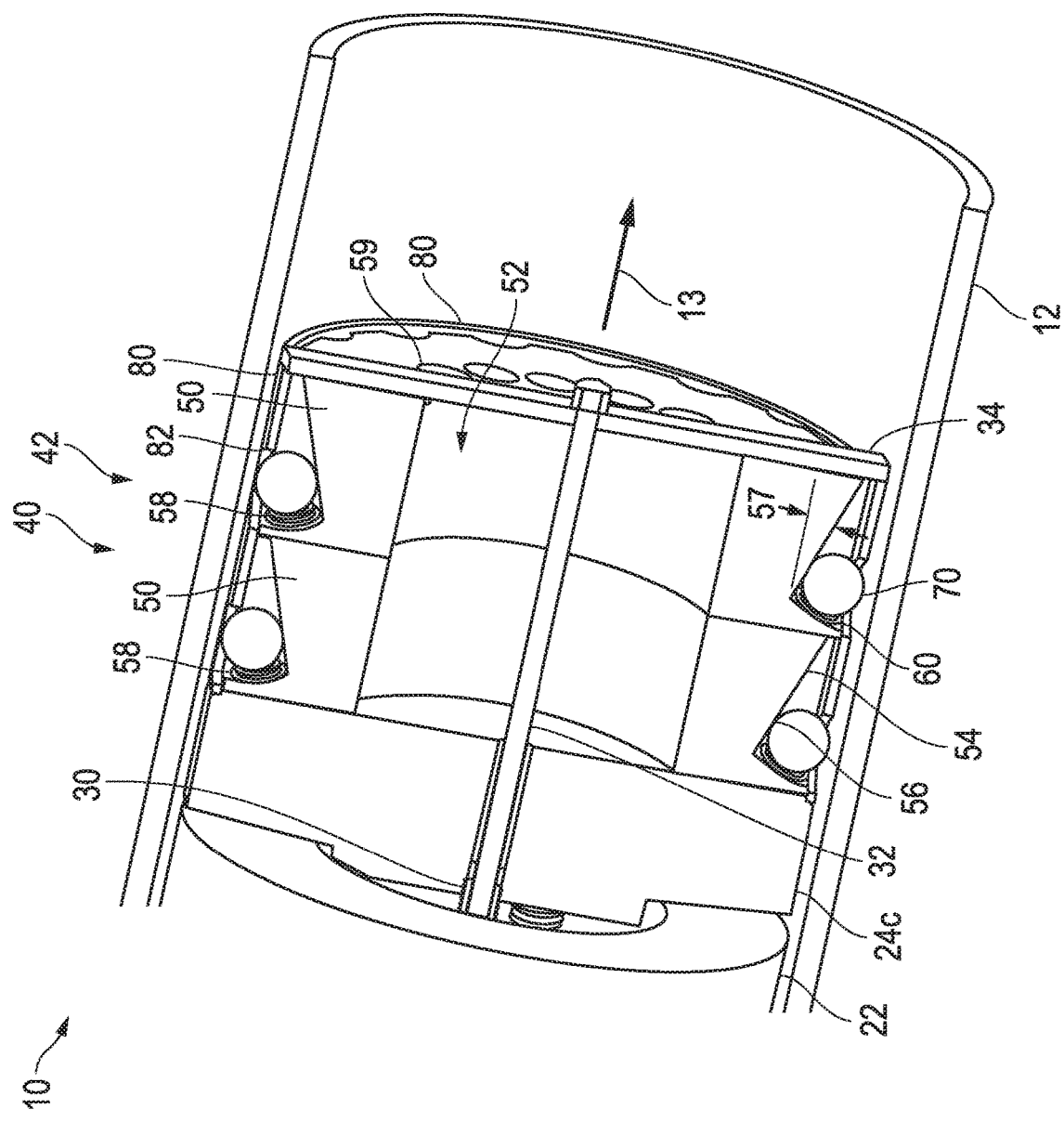
FIG. 3 depicts an enlarged perspective view of the embodiment of FIG. 1 showing the balls retracted, retracting, or just prior to release.
Figure 4:
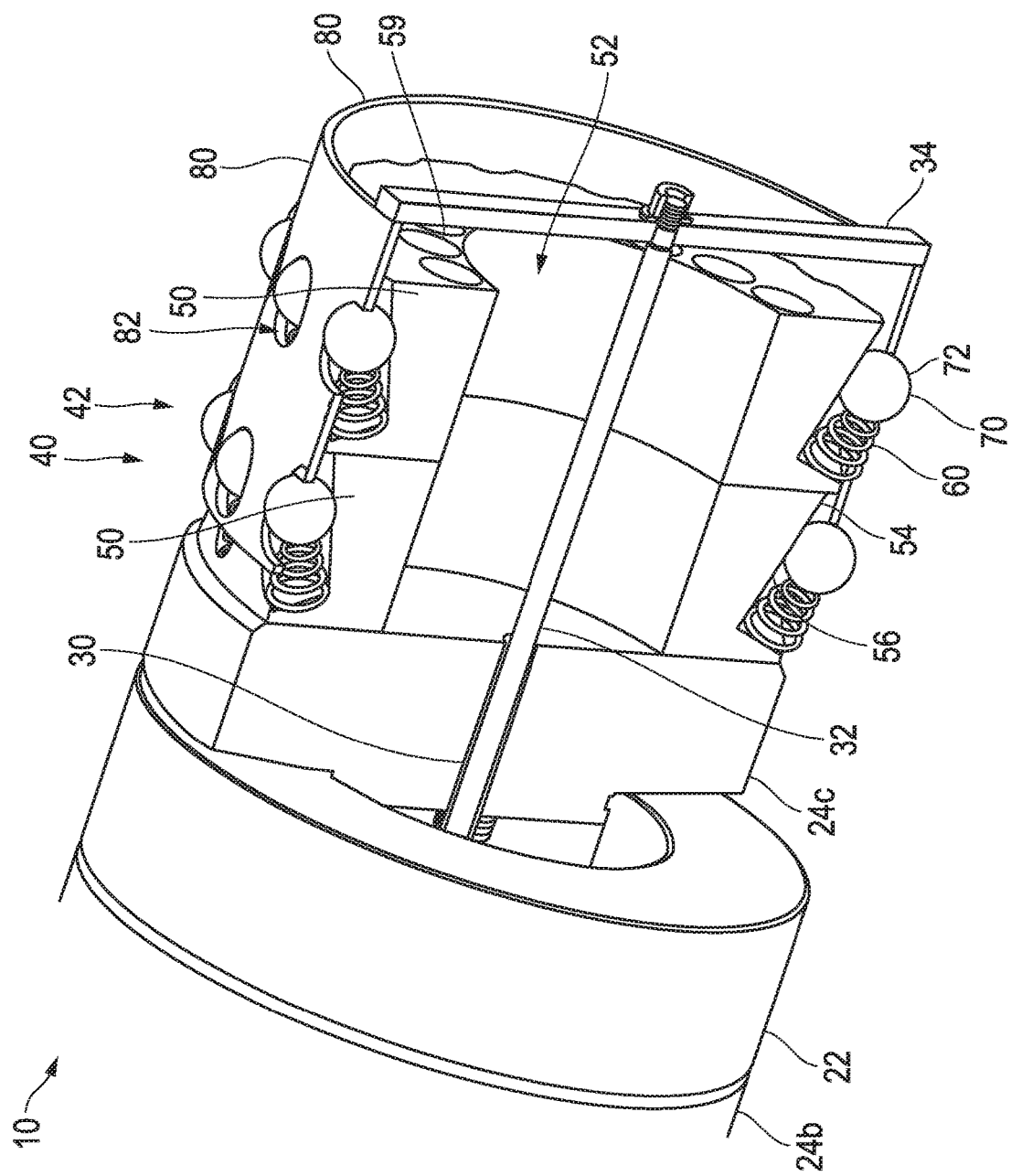
FIG. 4 depicts an enlarged perspective view of the embodiment of FIG. 1 showing the balls extended for active gripping.

In one exemplary embodiment as shown in FIGS. 1-4 the gripping apparatus 40 includes a ball actuated with retaining cage 42 (the balls 70 are individually/discretely spring actuated being held back by either pipe 12 engagement or the retaining cage/ball retraction cage 42). A rod 32 may be extended through the vent tube 30. A bar or key 34 is attached to one end 33 of the rod 32. A lever 36 (cam actuated as shown in FIG. 1-2 with FIG. 3 showing the retaining cage 42 retracting the individually/discretely actuated spring balls 70 when the cam lever 36 is actuated pulling the retaining cage 42 opposite in direction to arrow 13, and threadably actuated, supported or calibrated FIG. 11) is attached to the other end 35 of the rod 32. As will be appreciated from the figures of the drawings the lever 36, rod 32 and bar 34 are used for actuation (in this case retraction of the individually spring actuated balls by the ball retraction/retaining cage 42). The bar 34 may take the form of a key of the rod 32 is to be spring-actuated (not shown).

The exemplary embodiment of the ball actuated with retaining cage 42 represented in FIGS. 1-4, generally includes an assembly of sleeve 80 welded with bar 34. The greater assembly of this exemplary embodiment has one or more wedge bore rings or annular ball-mounting bodies 50, spring(s) 60, ball(s) as discrete gripping devices 70, and the sleeve 80. Many other embodiments are possible.

The exemplary embodiment of annular ball-mounting body or bodies 50 shown defines an inner void 52 for passage of the rod 32. The outer surface 54 of the annular ball-mounting bodies 50 define inclined (or transverse) mounting pockets or track(s) 56. In the embodiment shown the inclined mounting pockets or tracks 56 are arcuate in cross-section (e.g. partial cylindrical bores) to match the ball(s) 70. The angle of incline 57 of the inclined mounting pockets or tracks 56 is defined in relation to the axial direction of the rod 32 or central passage 13 of the pipe 12. The outer surface 54 of the annular ball-mounting bodies 50 further define stop-surface(s) 58 at the inner end of each respective inclined mounting pockets or track(s) 56. In the embodiment shown the stop-surfaces 58 function as a spring 60 mounting surface and ball 70 inward stop. The annular ball-mounting bodies 50 may further define holes 59 which may be used for bolting or attaching the gripping apparatus 40 to the plugging device 20 (other means of attachment, if desired, such as, for example, welding, machined, cast, or formed integral element of the bottom clamping plate 24c may be implemented by one skilled in the art).

The spring(s) 60 actuate the balls 70 as regulated by sleeve 80 as further described below. Springs 60 of other types than as shown may be implemented. Springs 60 may be eliminated and replaced by another means of actuation including but not limited to hydraulic, pneumatic, electrical, magnetic, thermal, gravitational or other mechanical devices. The force of springs 60 or any individual spring within a particular embodiment can be varied as desired by one skilled in the art to effectuate a desirable grip.

The balls(s) 70 are actuated by the springs 60 as further described below and float to contact the inner diameter of the pipe 12. Balls 70 preferably have a round/spherical outer surface 72 for the purpose of locking the device without marking or damaging the inside pipe surface 12a or at most dimpling (cold working) when contacting the pipe 12 as opposed to creating a point, cut or juncture of stress, and for travel as further described below.

The exemplary embodiment of the sleeve 80 shown defines opening(s) 82 shaped to allow the balls 70 to release via spring 60 actuation. The specific shape of the openings 82 may be circular, ovular, oblong, slotted, etc. The inner dimensions of the openings preferably function to allow release of the spring 60 actuated balls 70 and may be limited to prevent escape of the balls 70 (i.e. have a limiting dimension less than the outer diameter of the balls 70). The number of opening(s) 82 may be complimentary to the number of springs 60, balls 70 and inclined mounting tracks 56. The solid inner dimensions of the sleeve 80 preferably function to limit or hold the balls 70 in place against the force of the spring 60.

The angle of incline 57 of the inclined mounting tracks 56 may vary according to the inner diameter of the pipe 12. In one example, a steeper angle may be used according to or as the diameter of the pipe 12 increases. One skilled in the art will appreciate the angle of incline 57 may be used to effectuate a proper grip, grasp or lock within a pipe 12 of any given inner diameter. The respective angles if incline 57 may even be varied within individual inclined mounting tracks 56 within a given embodiment to match the desired gripping strength of any given individual or group of balls 70.

Different options or embodiments of gripping apparatus 40 may include different combinations of springs 60, balls 70, openings 82 in sleeve 80, and inclined mounting tracks 56. By way of example, but not limited to, the foregoing could be arranged in a single row, with one ball only, with two balls only, with staggered balls, with thirty-six balls, some balls could be spring loaded whilst others are not, etc. FIG. 5 shows an exemplary embodiment of a load distribution cap 90. The load distribution cap 90 may be used in combination with the balls 70 (or without) to function or create a clamp pad surface 92 for gripping the inner diameter of the pipe 12. The load distribution cap 90 may have sockets 94 for receiving the balls 70. The clamp pad surface 92 may be textured or coated for enhancing the grip or frictional contact between the clamp pad surface 92 and the inner diameter of the pipe 12.

FIG. 6 represents one exemplary embodiment of a pocket or channel insert 100. The channel insert 100 may be used instead of or in replacement of the inclined mounting pockets or tracks 56, used as an individual ball pocket or channel, with grooves 102 for loading balls 70. The channel insert 100 may be attached to the annular ball mounting body 50 using any known means of attachment.

Figure 7:
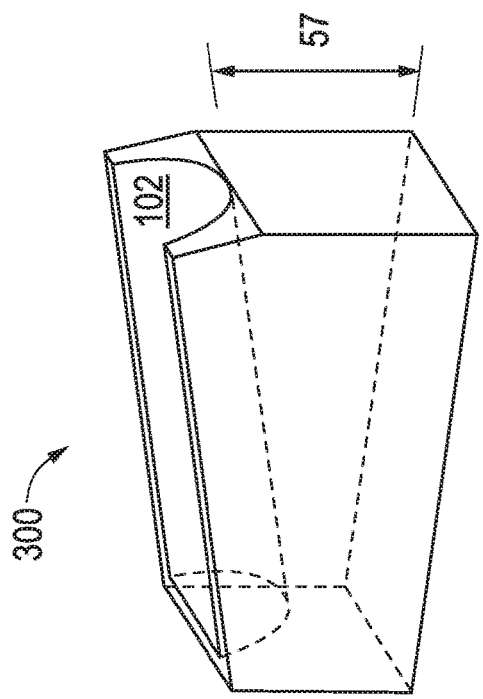
FIG. 7 depicts a schematic perspective view of pocket or channel insert according to another embodiment.
Figure 8:
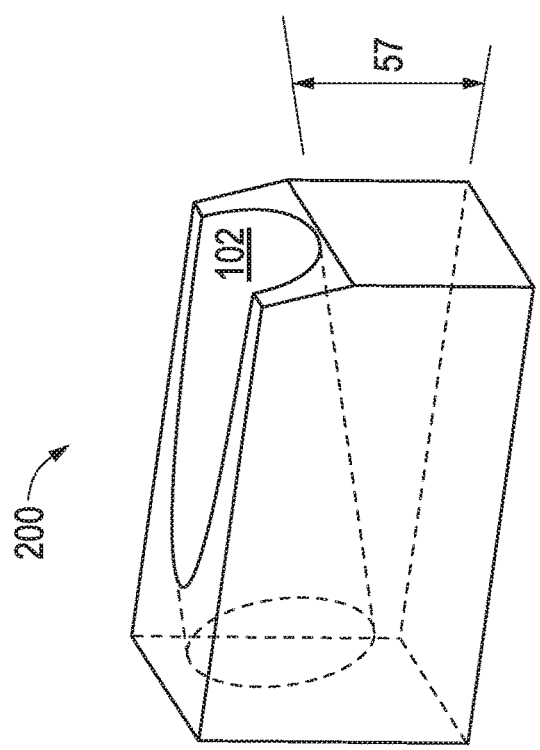
FIG. 8 depicts a schematic perspective view of pocket or channel insert according to another embodiment.
Figure 9:
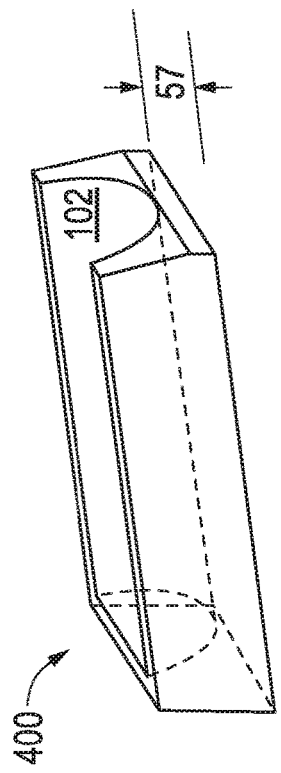
FIG. 9 depicts a schematic perspective view of pocket or channel insert according to another embodiment.

FIGS. 7-9 represent other exemplary embodiments of a pocket or channel inserts 200 (FIG. 7), 300 (FIG. 8), 400 (FIG. 9) similar to FIG. 6 but having a different angle of incline 57.

Figure 10:
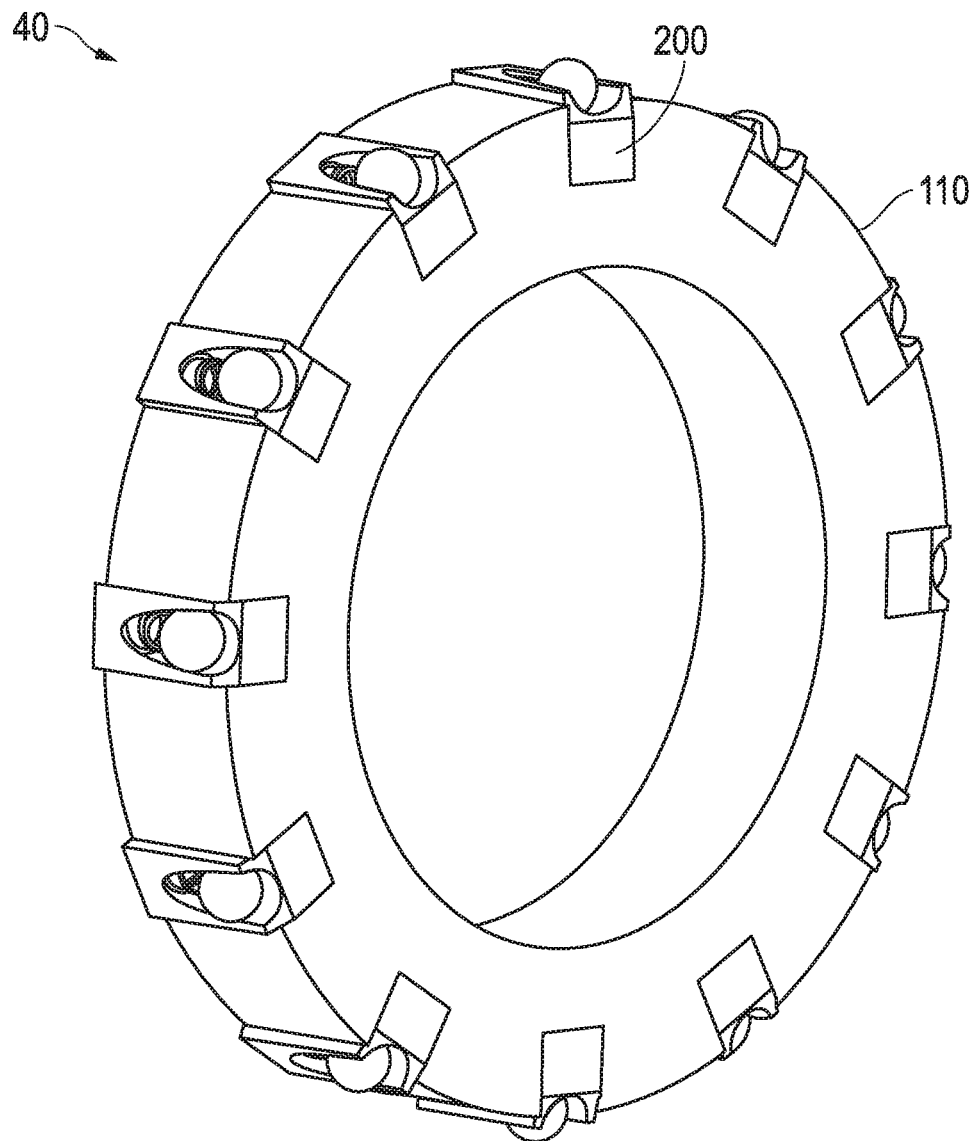
FIG. 10 depicts a schematic perspective view of an embodiment of ball bore inserts mounted to insert ring.

In FIG. 7, ball bore/channel insert 200 is designed to be mounted to a flat back face with a cylindrical nose/roller 110 that may be slotted as in FIG. 10. The bore end may be closed as shown or through the end so that the mating surface defines the end of the ball track or pocket 103.

In FIG. 8, ball bore insert 300 is a similar wedge block to ball bore insert 200, with the ball bore pocket split to allow the pocket to be milled with ball end mills or the like. The mounting body/channel 102 end may be closed as shown or through the end so that the mating surface defines the end of the ball track or pocket 103.

In FIG. 9, ball bore insert 400 is a ball channel or track similar to ball bore insert 300, but is designed to fit into a tapered slot to set the wedge angle on a ring similar to FIG. 10. This ring could be a simple conic and even use the abutting plate for back support. It could also be made of a plurality of wedge angle facets forming a supportive cone shaped diameter. The mounting body/channel 102 end may be closed as shown or through the end so that the mating surface defines the end of the ball track or pocket 103.

All of these exemplary embodiments of a pocket or channel inserts 100, 200, 300, 400 can be made of a sufficiently hard or heat treatable-material to provide strength and wear resistance to the ball clamping forces. The pocket or channel inserts 100, 200, 300, 400 may be attached in any manor including but not limited to locked tabs and groove, pins, bolts, adhesives, press fits or welding. Ball pocket(s) may fully capture the individually actuated balls without the use of a secondary ball cage.

Figure 10A:
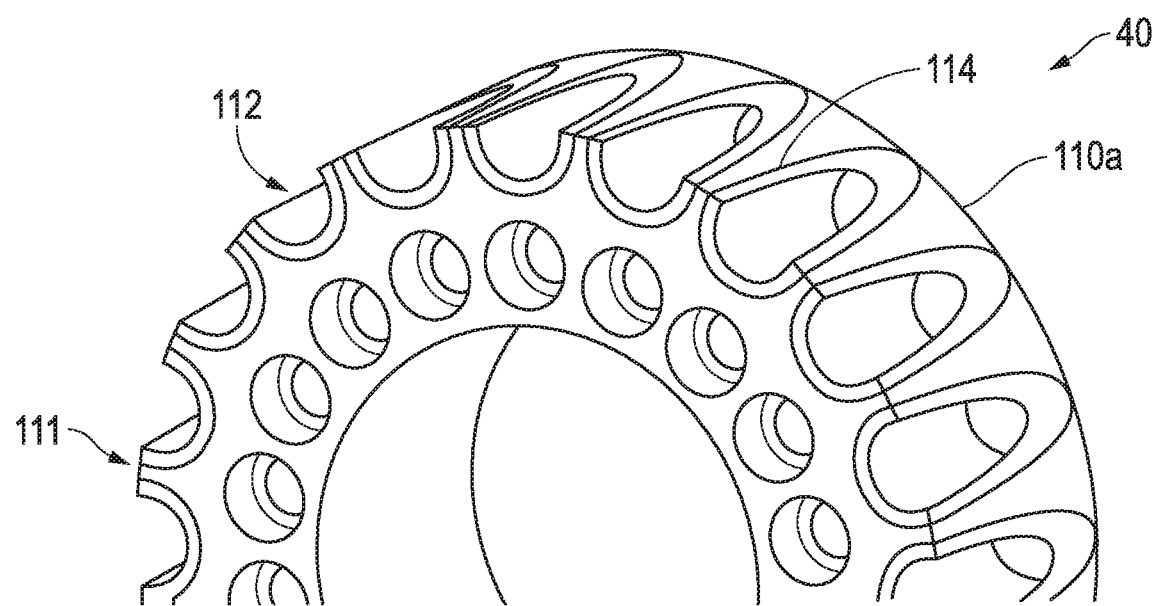
FIG. 10A depicts a schematic perspective view of an alternative embodiment of a gripping apparatus of a hardened ball sleeve design/type.

FIG. 10 depicts a schematic perspective view of an embodiment of a gripping apparatus 40 having ball bore inserts (e.g. 100, 200, 300, 400, etc.) mounted to insert ring 110. FIG. 10A depicts a schematic perspective view of an alternative embodiment of a gripping apparatus 40 of a hardened ball sleeve design/type with a hard sleeve tube 111 having ball bores 112 for respective hard bearing balls 70 (not shown in FIG. 10A) to be able to roll freely without dimpling the inner diameter bores of pipes or tubes 12a from high gripping loads (not shown in FIG. 10A). The embodiment of FIG. 10A allows for much higher forces with, for example, a lightweight (aluminum) ring 110a and hardened sleeves 114 adding strength where most desired. Using the exemplary embodiment of FIG. 10A as an example, but not limited to such embodiment, such a gripping apparatus 40 may be used/implemented as a modular gripping module with one or more balls, disk, rollers or jaws that can be added as needed to a mounting ring or plate to match any pipe shape or diameter. Multiple gripping rings (modular or standard multiple gripper pocket rings) can be added in layers as needed to achieve a desired gripping strength (see, e.g., FIG. 12). Such rings can be oriented to resist movement in either or both direction.

Figure 11:
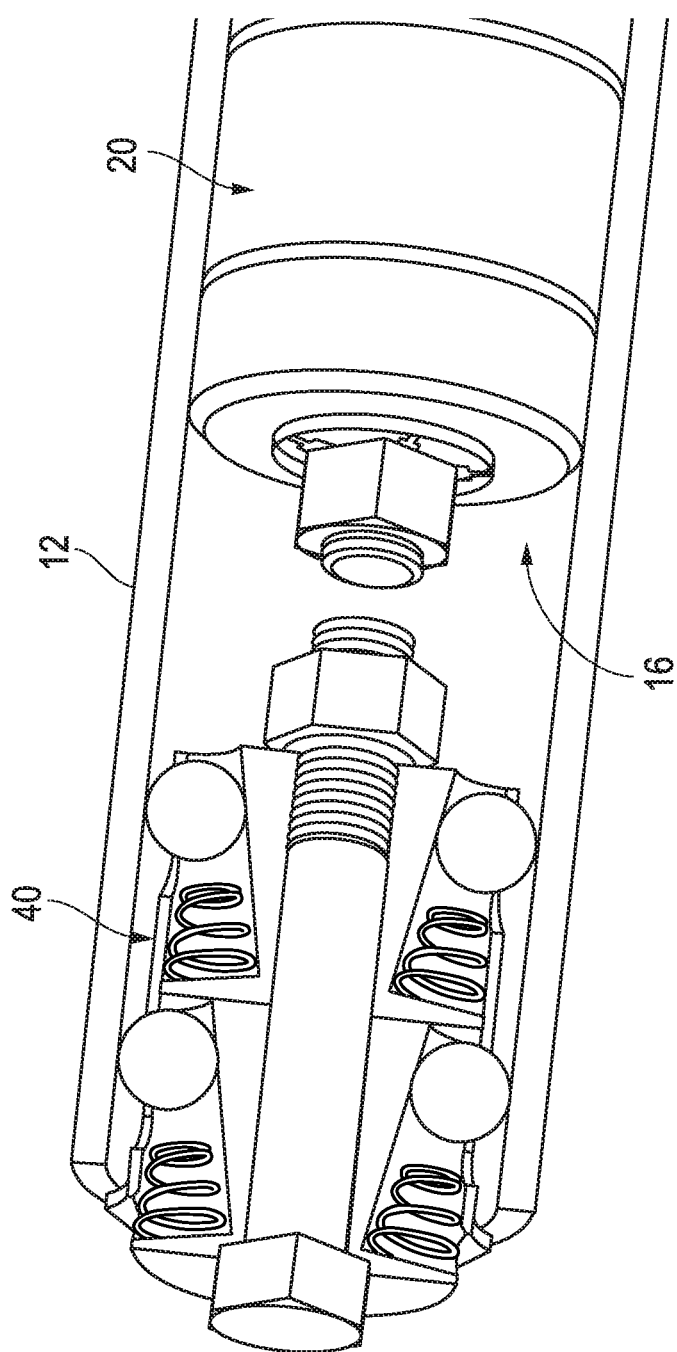
FIG. 11 depicts a schematic perspective view of an embodiment of gripping apparatus used separately as a safety stop to block the pipe inner diameter to keep a plug from ejecting.

FIG. 11 depicts a schematic perspective view of an embodiment of a gripping apparatus 40 used separately (preferably on the atmospheric side 16) as a safety stop to block the pipe 12 inner diameter to keep a plug 20 from ejecting.

Figure 12:
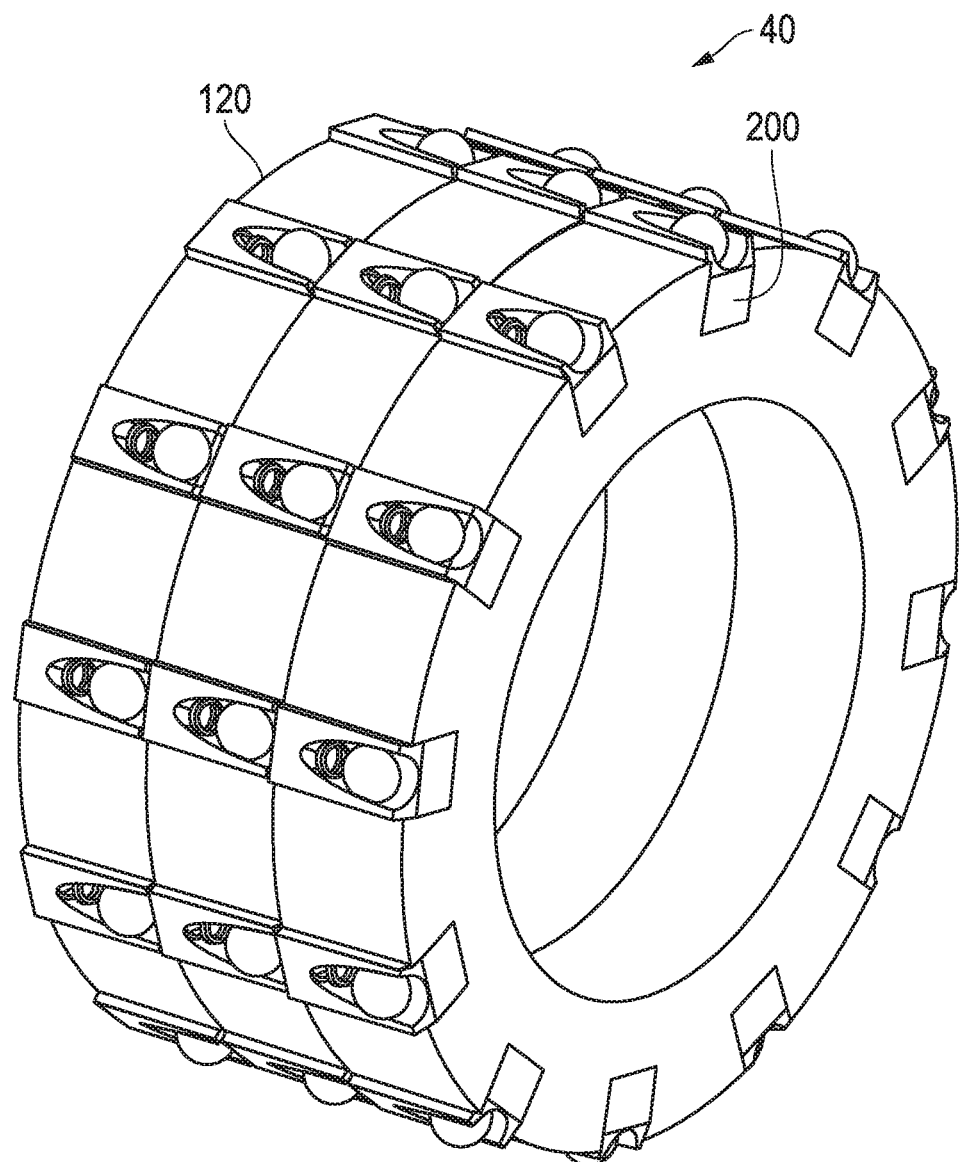
FIG. 12 depicts a schematic perspective view of an embodiment of multiple ball bore inserts on multiple joined insert plates.

FIG. 12 depicts a schematic perspective view of a gripping apparatus 40 multiple ball bore inserts (e.g. 100, 200, 300, 400, etc.) on multiple joined insert plates 120.

Figure 13:
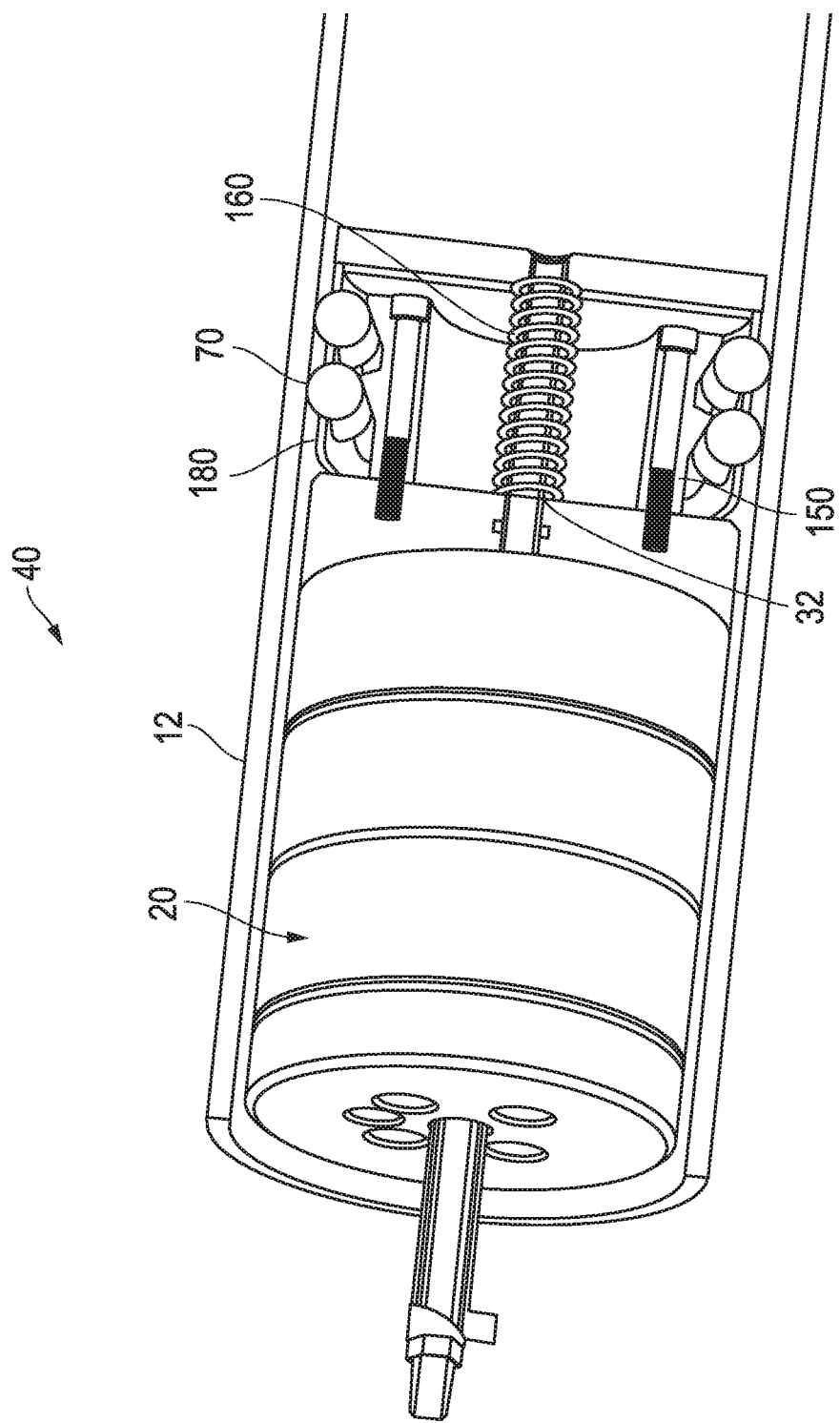
FIG. 13 depicts a schematic perspective view of an embodiment of balls on one cone per row of balls single spring cam actuated.

FIG. 13 represents another exemplary embodiment where the retainer actuates the balls 70, namely, the embodiment shown depicts a gripping apparatus 40 of balls 70 on one cone per row of balls 70 single spring 160 over rod or tube 32 (cam or twist actuated) mounted together as an annular ball mounting body 150 with sleeve 180.

Figure 14A:
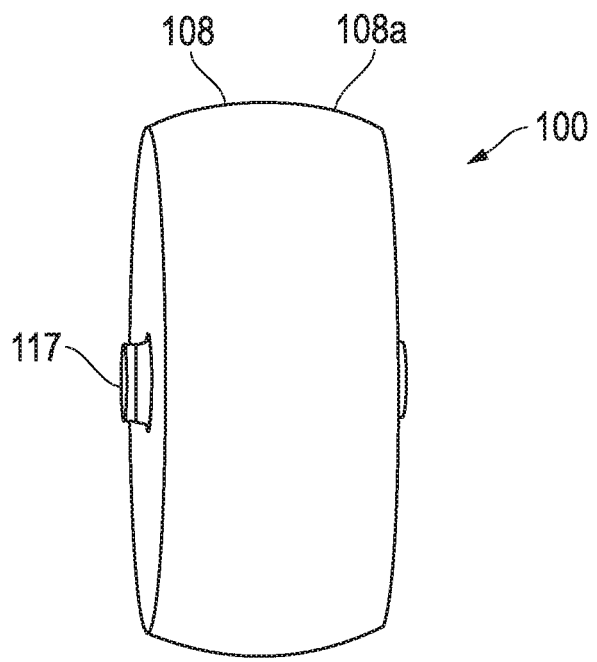
FIG. 14A depicts a perspective view of an exemplary embodiment of a disk.
Figure 14B:
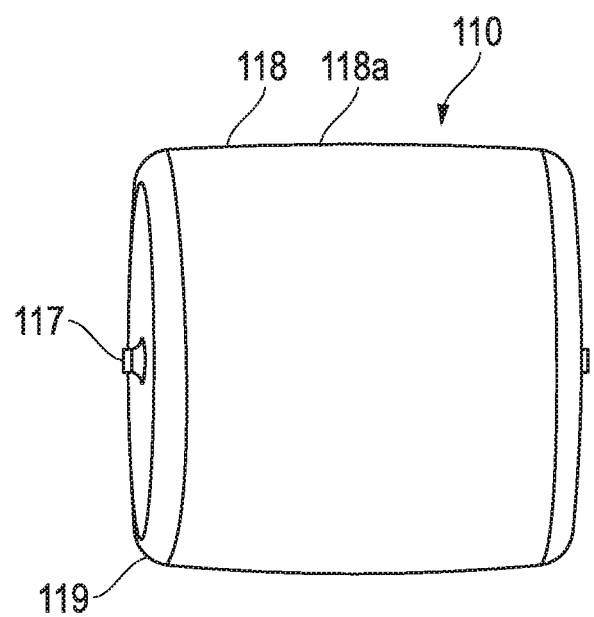
FIG. 14B depicts a perspective view of an exemplary embodiment of a roller.
Figure 15:
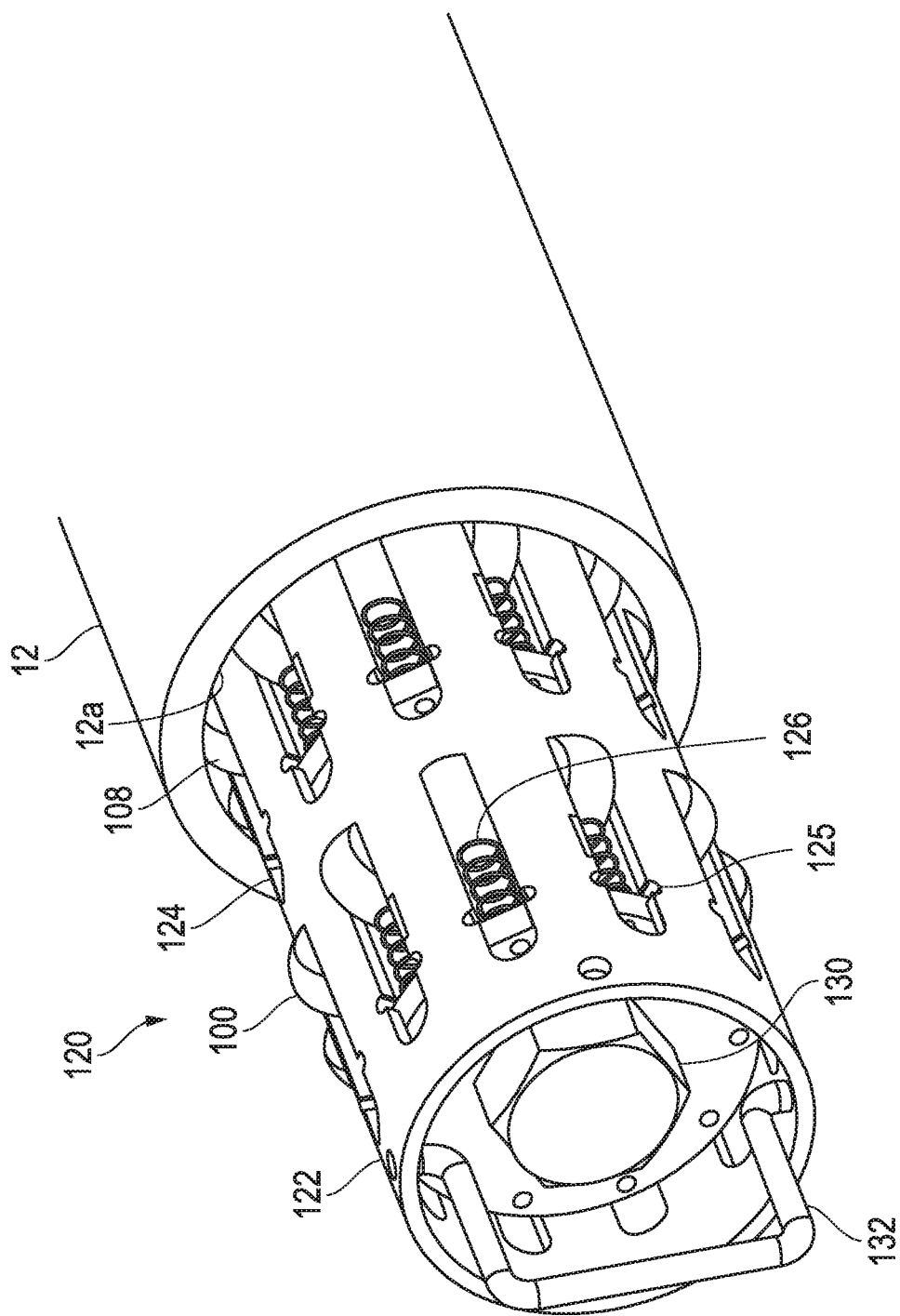
FIG. 15 depicts a schematic perspective view of an alternate exemplary embodiment of a gripping apparatus with disks having the disks individually extended into gripping position.
Figure 16:
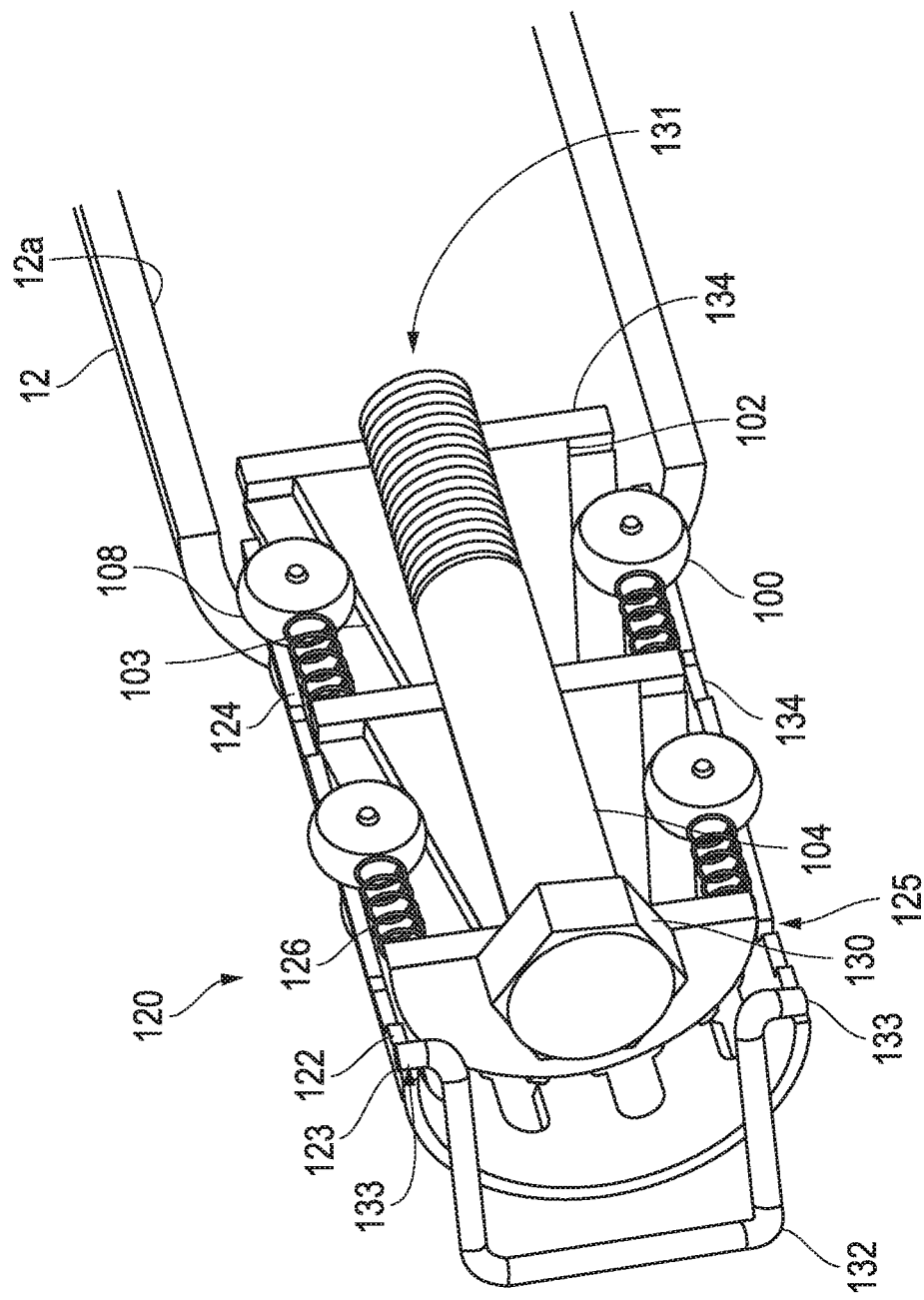
FIG. 16 depicts a sectional schematic perspective view of the exemplary embodiment of FIG. 15 showing the gripping apparatus with individual spring actuation of the individually extended disks.
Figure 17:
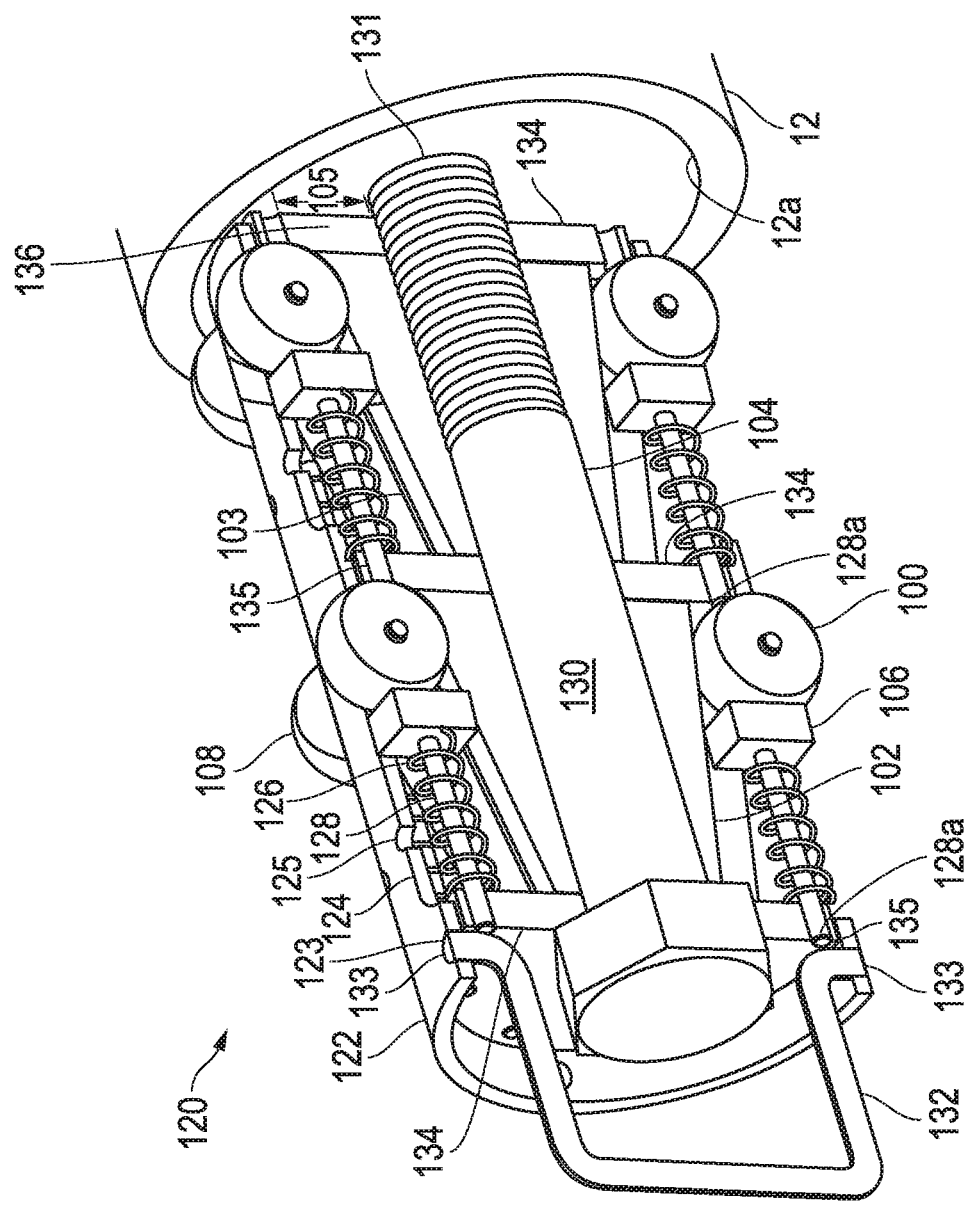
FIG. 17 depicts a sectional schematic perspective view of an alternate exemplary embodiment of a gripping apparatus with disks with individual spring pin shoe actuation on the individual disks.
Figure 18:
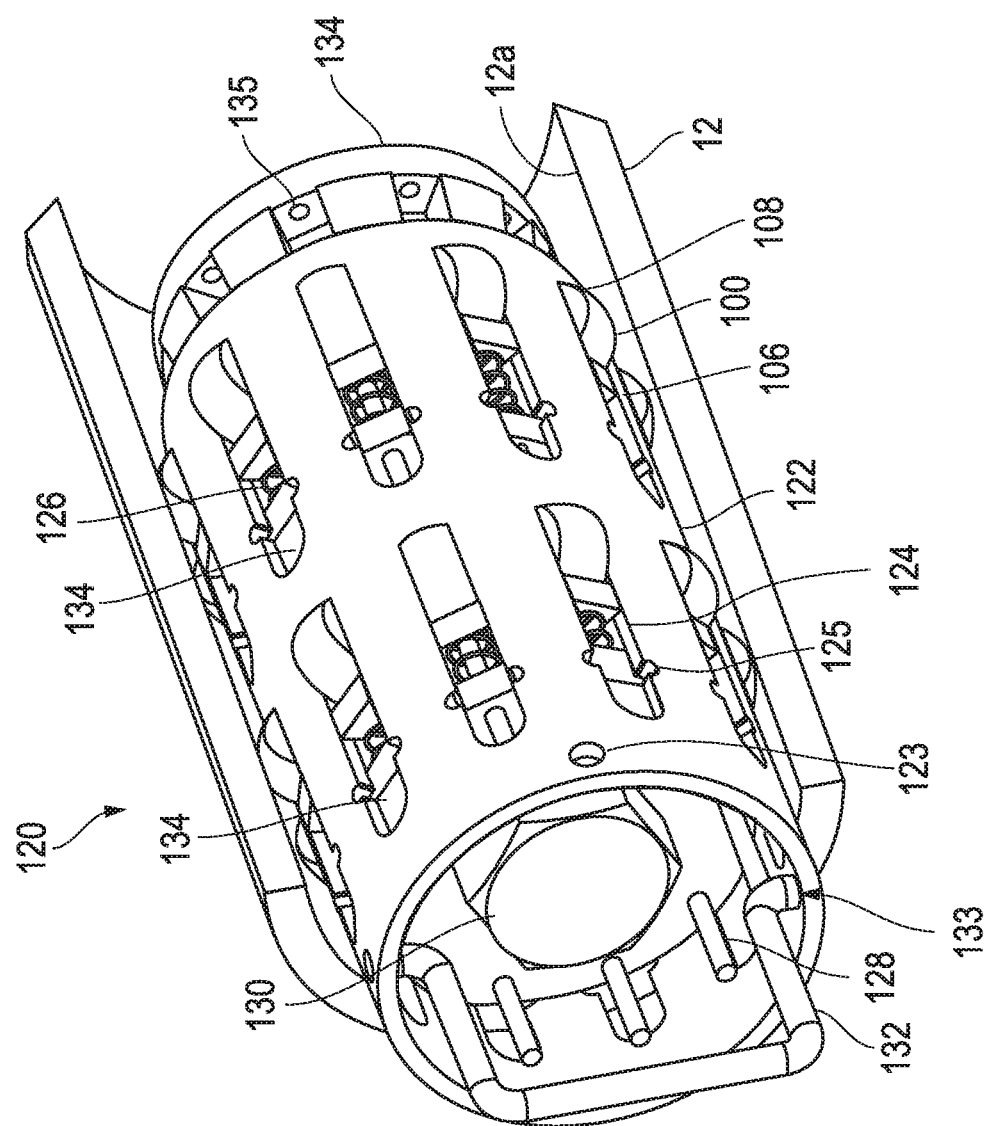
FIG. 18 depicts a schematic perspective view of the exemplary embodiment of the FIG. 17 gripping apparatus with individually actuated disks each actuated for engaging the pipe (shown in cross-section).
Figure 19:
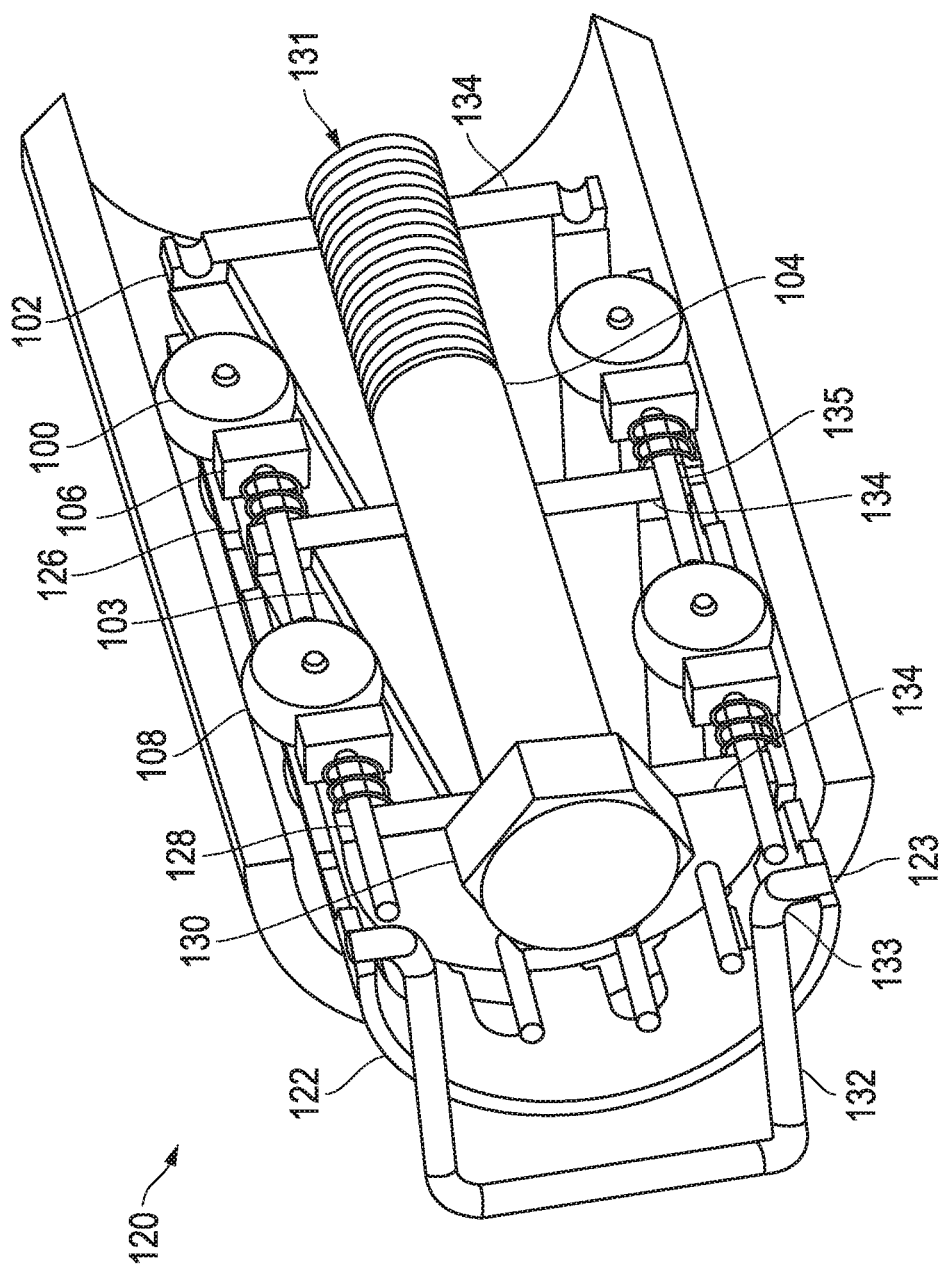
FIG. 19 depicts a sectional schematic perspective view of the exemplary embodiment of the FIGS. 17 and 18 gripping apparatus with the spring pin shoe and disk for engagement of the pipe, and the center or section of the wedge slot.

In alternative embodiments, the gripping apparatus 40 may include disks as discrete gripping devices 100 or rollers discrete gripping devices 110 in place of balls 70. An exemplary embodiment of a disk 100 is depicted in FIG. 14A, and an exemplary embodiment of a roller 110 is depicted in FIG. 14B. The rollers 110 and disks 100 function similar to the balls 70 as they may all be individually/discretely actuated by springs (or any other means of actuation) to conform to any pipe 12 ovality, imperfection in roundness, variation, deformation or abnormality in the pipe inside surface, inside diameter, or orifice 12a. Accordingly, all of the balls 70, rollers 110 and disks 100, and jaws as discrete gripping devices (150, 250) are capable of locking or securing into the pipe surface 12a (individually or concurrently collectively actuated) as compared to having just a few areas of unequal contact pressure as found in conventional jaw style gripping mechanisms. Disks 100 may secure into or engage with the pipe internal surface 12*a* via the disk outer surface 108; and rollers 110 may engage with the pipe surface 12*a* via the roller outer surfaces 118. The balls 70, disks 100 and rollers 110 may lock without marking or make shallow dimple or make dimple marks into the pipe surface 12*a* (similar to, for example, a Brinell hardness test) compressing the metal grain structure without gouging or cutting into the pipe internal diameter 12*a*. The balls 70, disks 100 and rollers 110 disclosed herein only apply gripping force (other than the small spring 60 force used to engage the balls 70, disks 100 and/or rollers 110 to the surface of the pipe internal surface or diameter 12*a* and mounting bodies 50,102) unless or until the plugging device 20 moves or slips. In the disclosed embodiments, if nothing moves, the gripping balls 70, rollers 110 and/or disks 100 cannot damage the pipe 12 as they may just be in light rolling contact with the pipe internal diameter 12*a*.

In any exemplary embodiment the gripping apparatus 40 may individually/discretely, or may also collectively and/or concurrently activate respective balls, cylinders, rollers, disks, jaws or any discrete gripping device 100, 120, etc.

FIGS. 14A and 14B depict exemplary embodiments of a disk 100 and a roller 110, respectively, each which can be used with a gripping device 120. Note that disk 100 of FIG. 14A has a more rounded outer surface 108 when compared to the outer surface 118 of the roller 110 in FIG. 14B. Disk 100 may, in certain embodiments, be a "slice" or a section of a ball 70. Further, the disk 100 or roller 110 can have a plurality of curvatures to the outer surface 108, 118. In certain embodiments, the disk 100 or roller 110 has a surface arc or curve 108*a* or 118*a* that nearly matches or is complementary to the internal diameter or surface 12*a* of the pipe 12. When the width of the disk 100 is widened, it may resemble the roller 110 in design. Optionally, the disk 100 or roller 110 may also include radius edges 119. The width of the outer surfaces 108, 118 and the surface curves 108*a* and 118*a* may be adjusted as desired (i.e. surface curve 108*a* and/or 118*a* may be substantially flat or curved as desired). Disk sections with a different contact radius than the disk radius (i.e. the outer surface 108*a*/118*a* of the disk is not necessarily a perfect cylinder and, for example, may have an ovular or curved arc/curve 108*a*, 118*a*) may be used/implemented to provide closer spacing and a greater contact area to spread out the forces to the gripping surfaces to gradually decrease from the contact center to the edge of the contact area.

Figure 20:
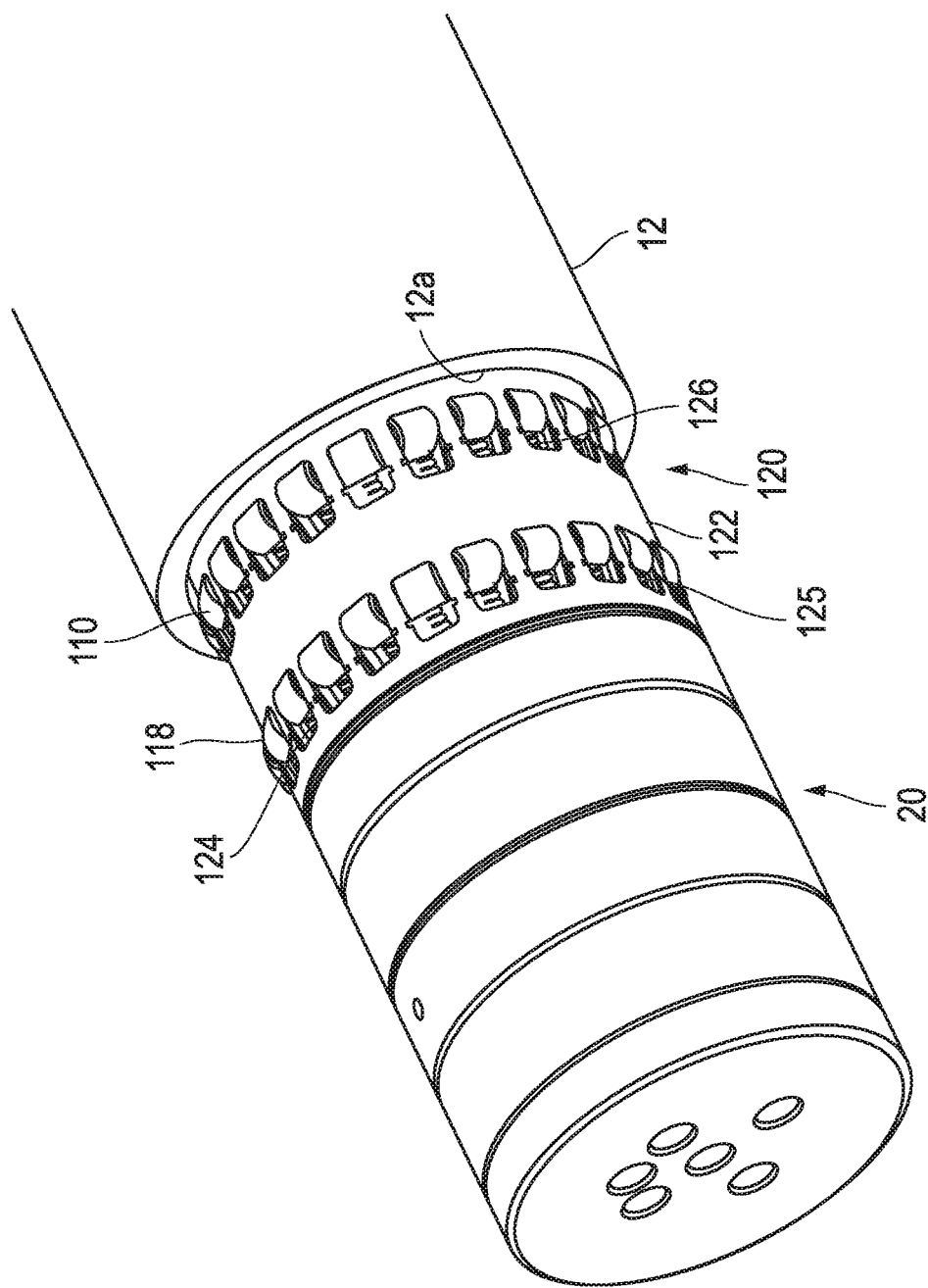
FIG. 20 depicts a schematic perspective view of an exemplary embodiment similar to FIG. 15 of a plugging device and a gripping apparatus with rollers extended individually for gripping the geometry of the inner diameter of the pipe.
Figure 21:
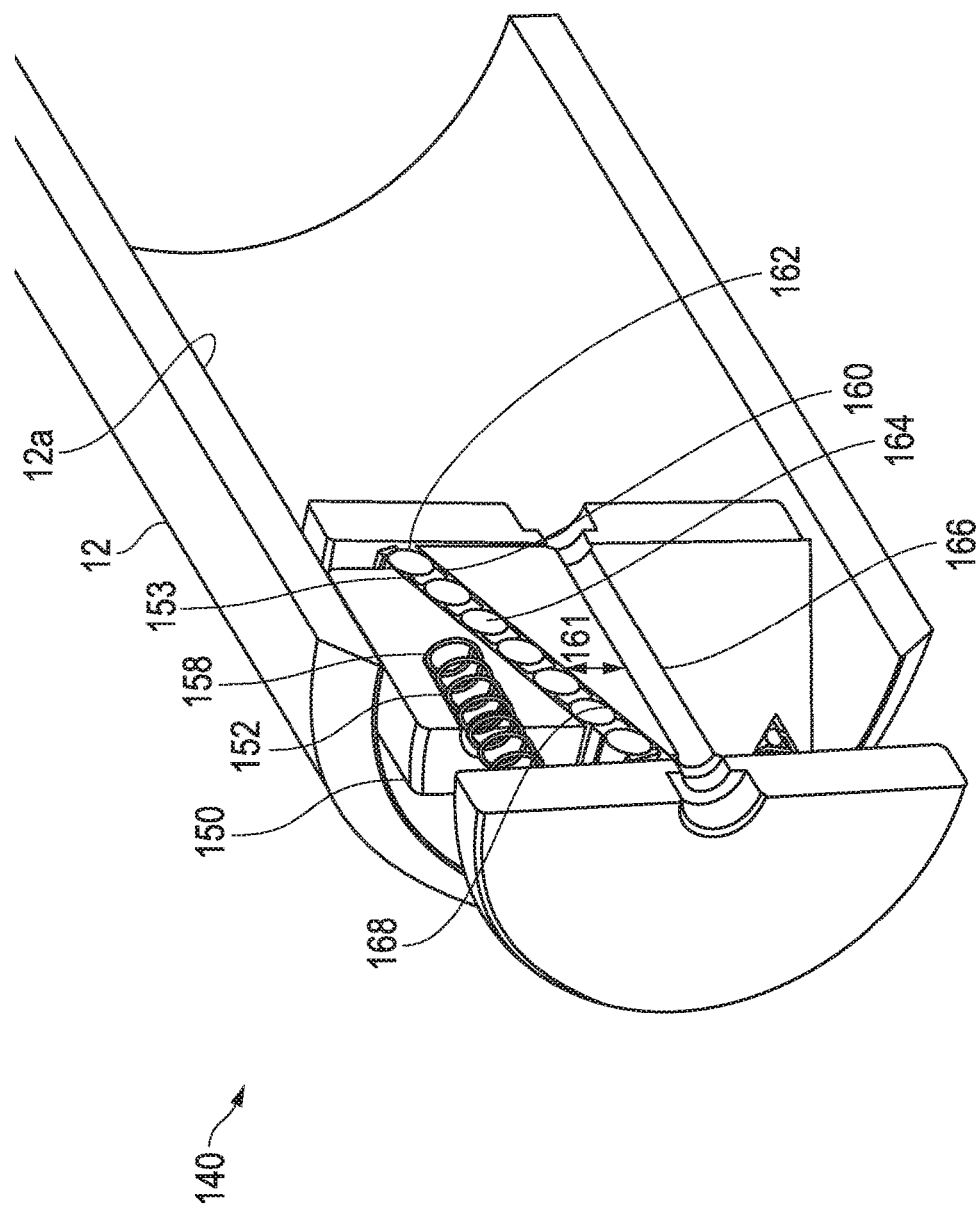
FIG. 21 depicts a sectional schematic perspective view of an alternate exemplary embodiment of a gripping apparatus with individually or independently actuated rolling wedge jaws.
Figure 22:
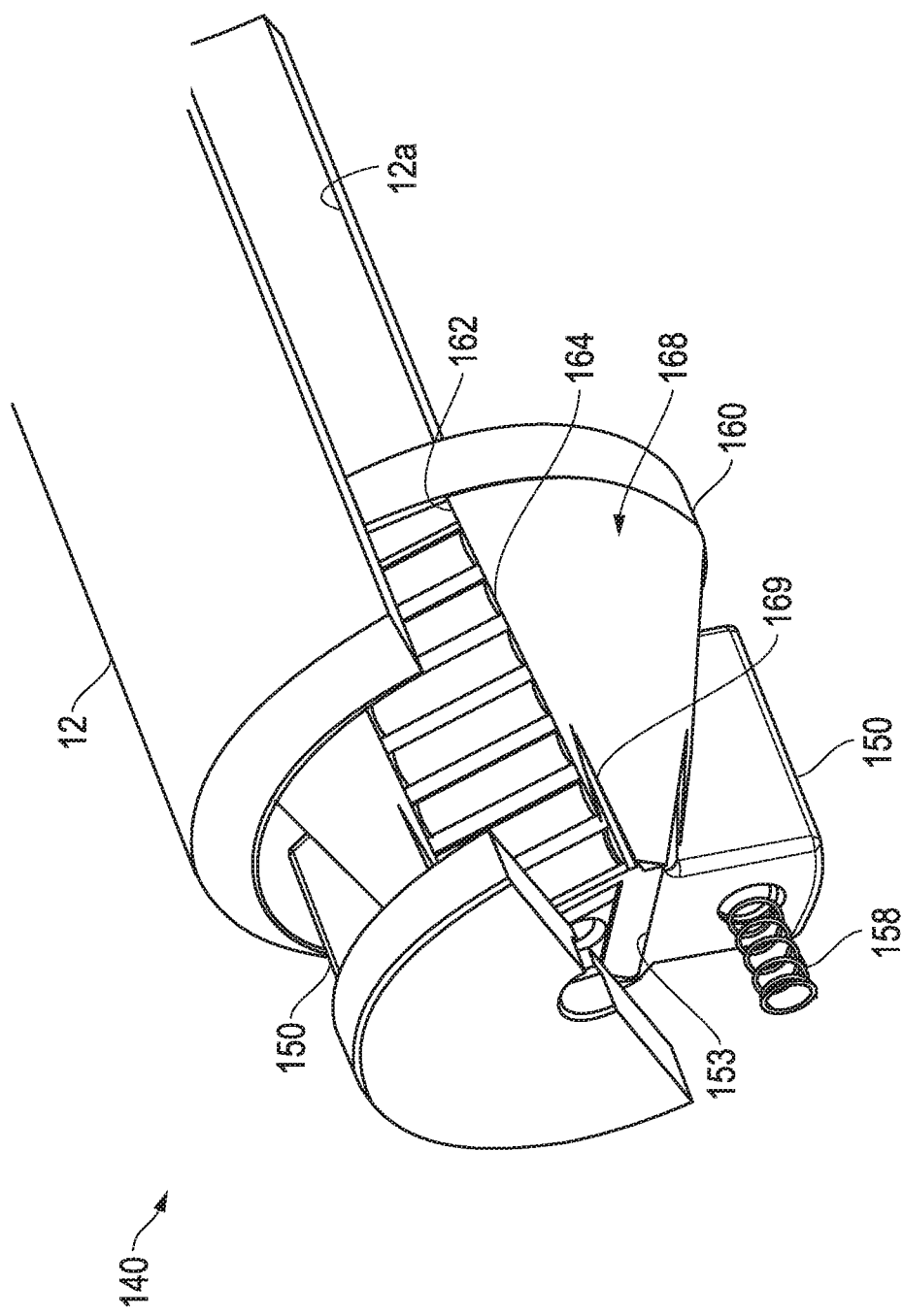
FIG. 22 depicts a partial sectional schematic perspective view of an exemplary embodiment similar to FIG. 21 of a gripping apparatus with wedge jaw(s) removed to represent the linear roller assembly.
Figure 23:
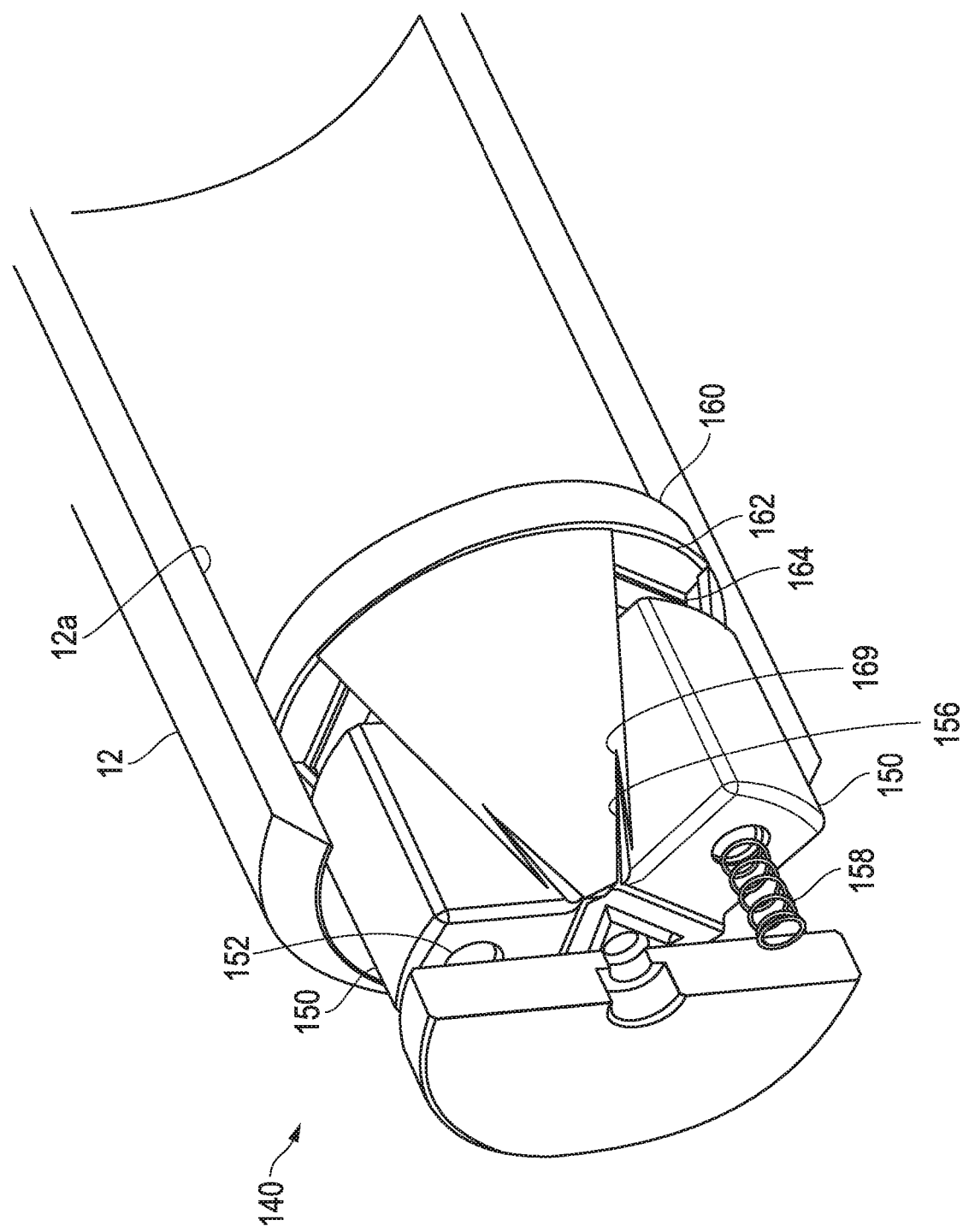
FIG. 23 depicts a schematic perspective view of an alternate exemplary embodiment of a gripping apparatus with wedge jaws retracted.
Figure 24:
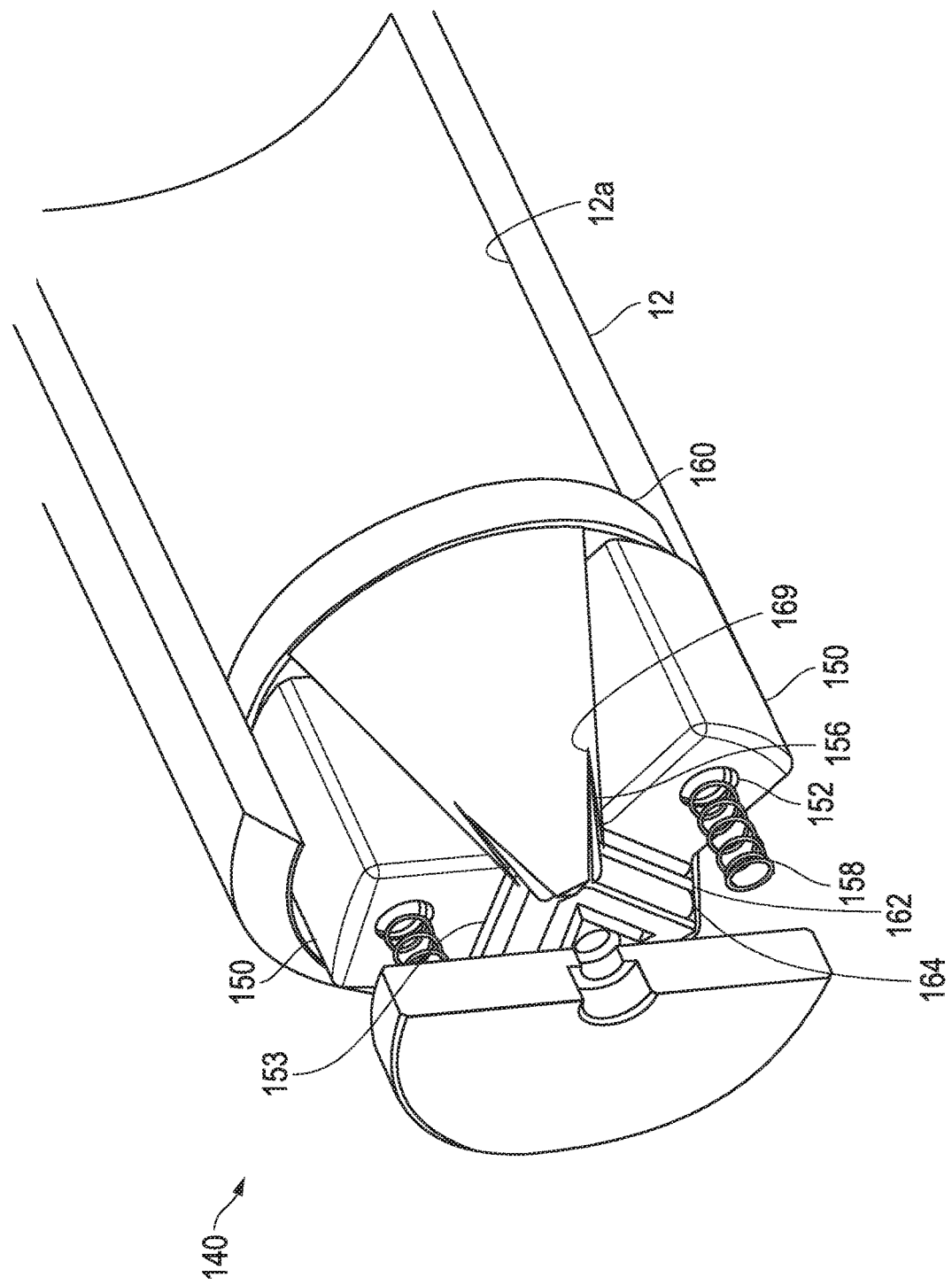
FIG. 24 depicts a schematic perspective view of an alternate exemplary embodiment of a gripping apparatus with wedge jaws actuated.
Figure 25:
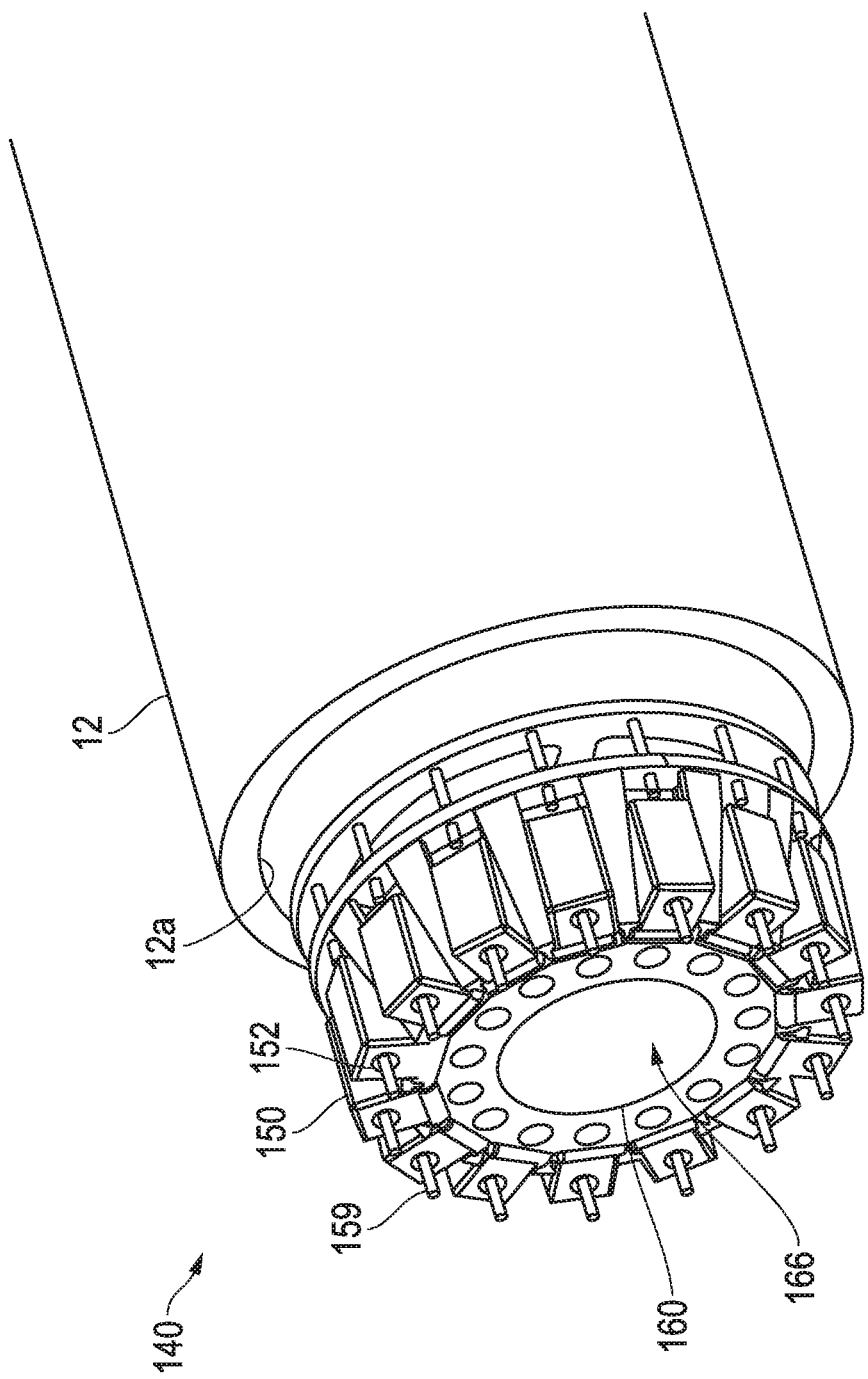
FIG. 25 depicts a schematic perspective view of an alternate exemplary embodiment of a gripping apparatus with wedge jaws retracted.
Figure 26:
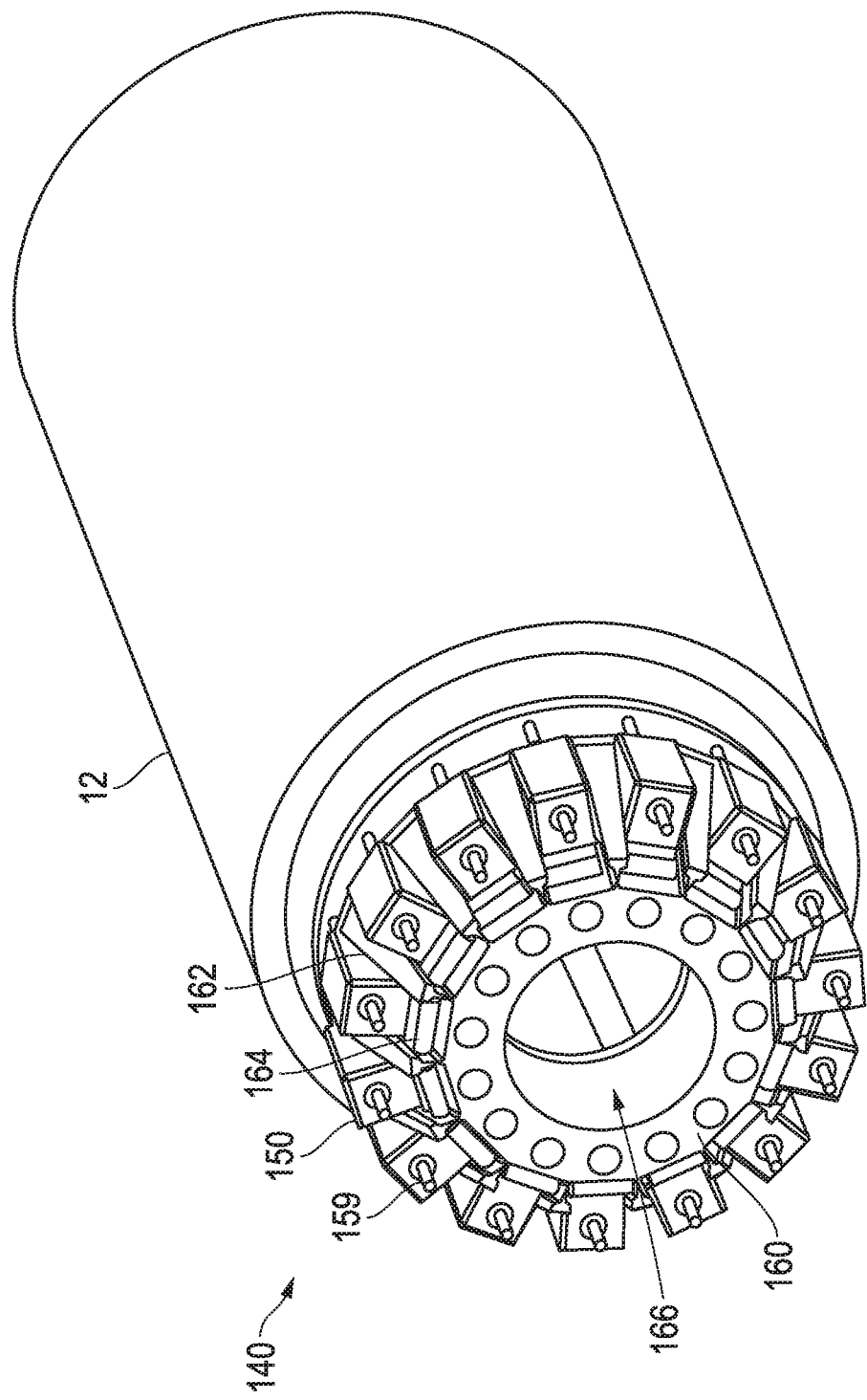
FIG. 26 depicts a schematic perspective view of an alternate exemplary embodiment of a gripping apparatus with wedge jaws actuated.

FIGS. 15-19 display various alternate embodiments of a gripping apparatus 120 with disks 100 which are configured to engage the pipe internal surface or diameter 12*a*. FIG. 20 depicts a schematic perspective view of an embodiment of a gripping apparatus 120 with rollers 110. Similar to gripping or grasping apparatus 40 disclosed in the FIGS. 1-13 and associated paragraphs, the gripping apparatus 120 may be used in conjunction with a plugging device 20 and may also include annular mounting bodies 102, springs 126, and a sleeve 122. The disks 100 and/or rollers 110 may be mounted adjacent to a spring 126 and onto tracks or pockets 103 that have a flat or curved bottom surface defined in mounting body 102. The gripping apparatus 120 may optionally also include blocks/spring shoe 106 situated between the spring 126 and the disk 100 or roller 110 (one end of the spring 126 may be connected to the block/spring shoe 106 and the block in turn pushes disk 100 or roller 110). While depicted as rectangular in shape in FIGS. 17-19, blocks/spring shoes 106 may be of any desired shape—as an example, and not limited, to, see FIGS. 29-33, wherein the embodiments of the blocks 173, 106 are shown as washer-like or cylindrical shapes. Different options or embodiments of gripping apparatus 120 may include different combinations of springs 126, disks 100/rollers 110, slots 124 in sleeve 122, and mounting tracks 103. By way of example, but not limited to, the foregoing could be arranged in a single row, with one disk/roller only, with two disks/rollers only, with staggered disks/rollers, with thirty-six disks/rollers, some disks/rollers could be spring loaded whilst others are not, and/or with some combination of balls, disks, and rollers, etc.

The gripping apparatus 120 may have multiple layers of mounting bodies 102. The layers of mounting bodies 102 may each be separated by a plate 134. Each mounting body 102 may have one or more defined tracks 103 which may guide the movement of a disk 100 or a roller 110. The tracks 103 may be inclined or transverse along an angle or incline 105 as defined with respect to the surface of the pipe internal diameter 12*a*. Additionally, the mounting bodies 102 may define a throughbore 104 through which a rod or bolt 130 may travel therethrough. Plates 134 may define or function as inward stops for the disk 100 or roller 110. Furthermore, plates 134 may also function as a spring 126 mounting surface. The rod or bolt 130 may also include a threaded end 131, which may thread through a throughbore 136 of the plates 134.

The sleeve 122 of the gripping apparatus 120 when assembled, slips over the mounting body 102, wherein the disks 100 or rollers 110 may extend at least partially beyond or out of the sleeve 122 through slots or openings 124 defined in the sleeve 122, when the gripping apparatus 120 is at least partially actuated. The sleeve 122 may also include openings 123 defined near one end of the sleeve 122, where an end 133 of an arm (or potentially a lever) 132 of the gripping apparatus 120 may be inserted.

Additionally, in certain embodiments (see FIGS. 17-19), each of the springs 126 may optionally be mounted onto or around a pin 128. The pin 128 may provide additional support to springs 126. When alternate embodiments include the pins 128, the plates 134 may have plate openings 135 which allow the travel of the pin 128 through the plate 134 or mounting/fixing of the pin 128 in the plate 134. Optionally, some ends 128*a* of the pins 128 may butt against the end 133 of the arm or lever 132, when the pins 128 are included with the "top" layer of the mounting bodies 102. On secondary or subsequent layers of mounting bodies 102, optionally the top end 128*a* of the pins 128 may butt against a disk 100 or roller 110 from an above layer.

The rollers 110/disks 100 are spring actuated up the track/ramp 103 until stopped by the pipe ID 12*a* or the disk/roller cage/sleeve 122 or slot on the wedge (cage free design).

Bolt 130 holds the assembly together and can be used to mount to either end of a test plug. Any force applied to the bolt 130 is transferred to the endplates 134 to the mounting body/wedges 103 to the rollers 110 and outward to the pipe id 12*a* keeping the gripping apparatus 120 and/or plug from moving relative to the pipe 12. Bolt 130 may be a bolt or all thread. Bolt 130 may have a hollow drilled center passage to form a through vent or partially drilled to a cross drill to create a pressure port for testing in a double block application.

The sleeve/cage 122 and pins 128 are used to retract and unlock the disk or rollers 110 from being trapped between the pipe ID 12*a* and the mounting body wedge slots 102.

In alternative embodiments, the gripping apparatus 120 may also be cam actuated (not illustrated). The exemplary embodiment of the sleeve 122 as shown defines slot(s) or opening(s) 124 shaped to allow the disks 100 or rollers 110 to release via spring 126 actuation. The specific shape of the slots or openings 124 may be circular, ovular, oblong, slotted, etc. The inner dimensions of the slots 124 preferably function to allow release of the spring 126 actuated disks 100 and rollers 110 and may be limited to prevent escape of the disks 100 and rollers 110 (e.g. disks 100 and rollers 110 may have an extension, post, axle or shaft 107, 117 that extends beyond the width of the slots 124 to prevent their release). The slot(s) or opening(s) 124 may have transverse notches 125 (preferably narrow in width) for receiving and capturing the extension, post, axle or shaft 107, 117 of the respective disks 100 and/or rollers 110 during assembly of the gripping apparatus 120. The number of slots(s) 124 may be complimentary to the number of springs 126, disks 100/rollers 110 and inclined tracks 103. The solid inner dimensions of the sleeve 122 preferably function to limit or hold the disks 100 or rollers 110 in place against the force of the spring 126.

FIGS. 21-26 depict alternate embodiments of a gripping apparatus 140 with wedge jaws 150. In addition to wedge jaws or jaws 150, exemplary embodiments of a gripping apparatus 140 may also include a centered tapered wedge or wedge cone 160, friction reducing devices such as balls cylindrical rollers or other bearings 164, and springs or spring plungers 158. The gripping apparatus 140 is inserted into a pipe 12, and then the jaws 150 are actuated to engage against the pipe internal surface 12a when desired.

The outer surface 168 of the centered tapered wedge or wedge cone 160 may be defined as a substantially conical or frustoconical shape. One or more tracks 162 may be defined on the outer surface 168 of the centered tapered wedge 160. These tracks 162 may be filled with a set of cylindrical rollers 164, but in alternate embodiments the tracks 162 may be filled with ball bearings or the centered tapered wedge 160 may instead use recirculating bearings (not depicted). Each inner surface 153 of a wedge jaw 150 is configured to set or rest against each set of rollers or bearings 164 in the tracks 162. Additionally, in alternative embodiments, the tracks 162 may simply be coated with a low friction coating such as TEFLON brand or a TURCITE brand laminate or coating, with no rollers or bearings 164 set into the tracks 162. The rollers or bearings 164 and the jaw inner surface 153 may also be coated with low friction coatings in alternate embodiments. Moreover, in yet another embodiment, the gripping apparatus 140 may have an uncoated, metal track 162 engaged with an uncoated jaw inner surface 153. Many combinations are possible. Furthermore the centered tapered wedge 160 may also have a throughbore 166 defined therethrough. Additionally the centered tapered wedge 160 defines T-slots 169 adjacent to each side of the tracks 162. The T-slots 169 are configured to complement and engage the T-flange 156 of the wedge jaw 150. The angle 161 of incline of the cone wedge 160 defined relative to the surface of the pipe internal diameter 12a may also be adjusted as desired.

Figure 47:
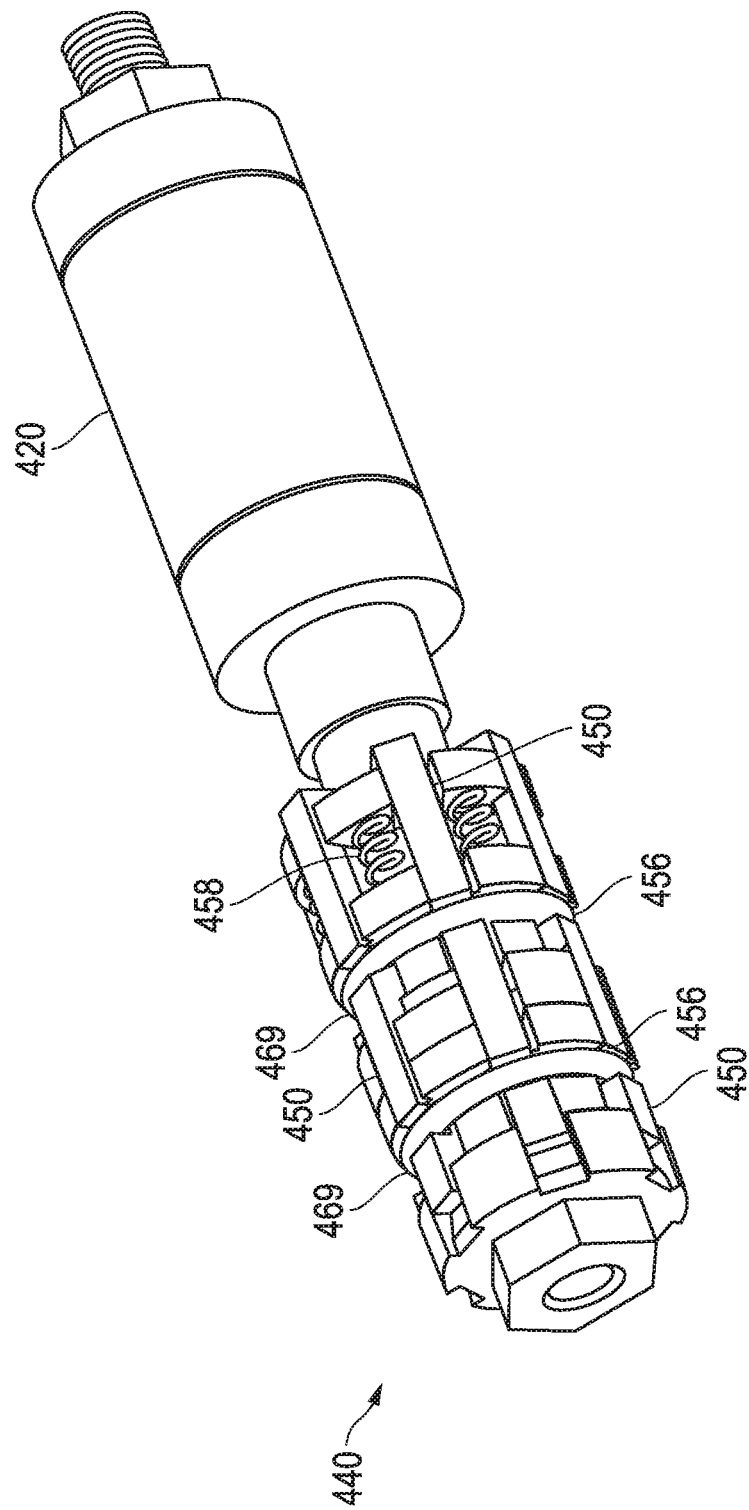
FIG. 47 depicts a schematic perspective view of an alternate exemplary embodiment of a gripping apparatus with individually or independently actuated wedge jaws with the wedge jaws extended.
Figure 48:
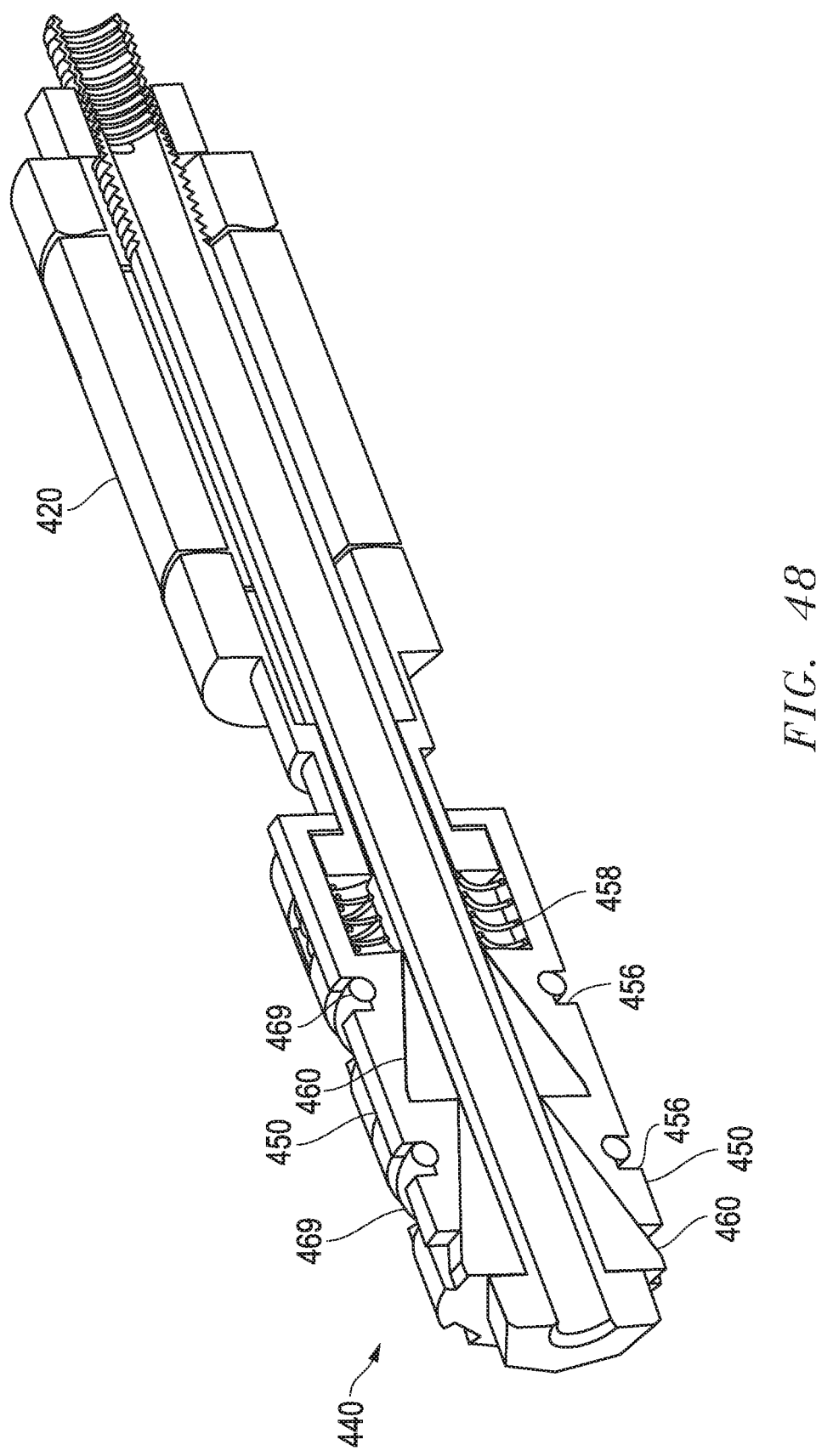
FIG. 48 depicts a sectional schematic perspective view of an exemplary embodiment according to FIG. 47 of a gripping apparatus with wedge jaw(s) extended to engage.

Referring to FIG. 47 and FIG. 48, other devices/methods may be used to retain, by way of example and exemplary embodiment, a wedge jaw 450 may be retained in a gripping apparatus/mechanism 440 by including circumferential biasing bands (such as, for example spring bands, O-rings, or the like) 469 in slots 456. Slots 456 may be defined across the outer surface of the discrete wedge jaws 450. Each wedge jaw 450 may be independently actuated by a captive spring/spring plunger 458 (working with wedge cone(s) 460 with or without rollers). The gripping apparatus/mechanism 440 may function in conjunction with a seal/test plug 420. Each wedge jaw 450 may be in the form of a flat, thin plate, narrow or even blade edge (but not so narrow as to create mar(s) in gripping), jaw 450 for use in a gripping apparatus 440. Such edge may have an outer surface 354 of the wedge jaw 450 having a convex curve, curvature or arch 355, and may have a coating and/or texturing 352 (e.g. hard, layer, antifriction, grit, surface, increased friction, peaks and valleys each/all as discussed herein). Such flat, thin plate, narrow jaw may be implemented into other embodiments of gripping apparatus.

Figure 27:
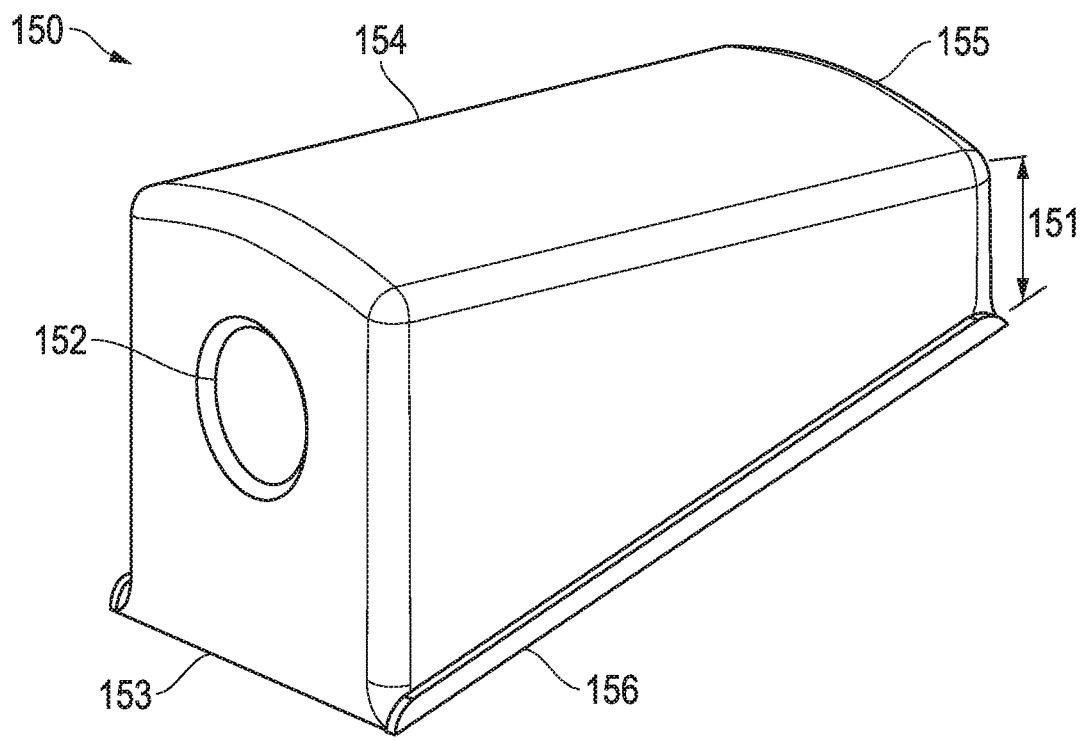
FIG. 27 depicts a front perspective view of an exemplary embodiment of a wedge jaw.
Figure 28:
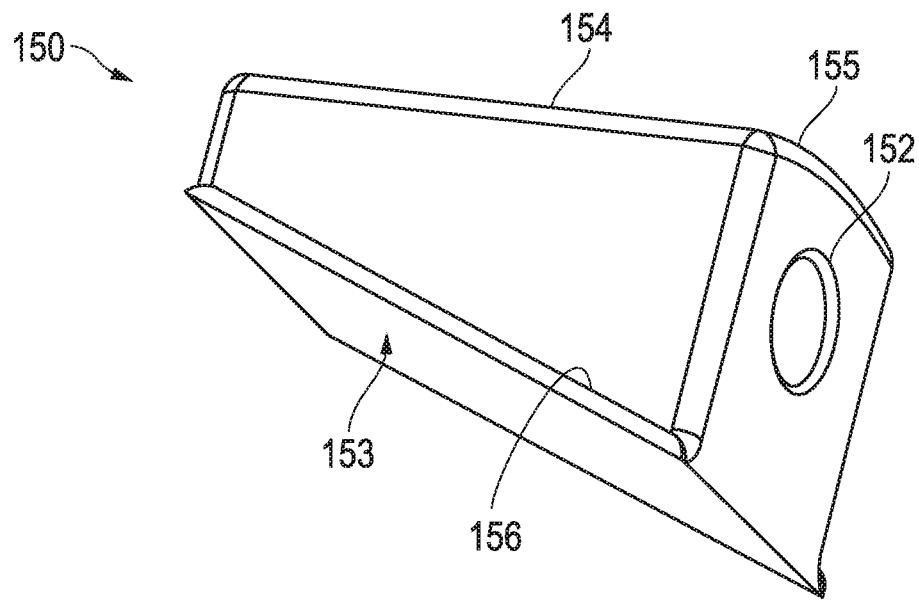
FIG. 28 depicts a bottom perspective view of an exemplary embodiment of a wedge jaw.

As depicted in FIGS. 27-28, the discrete wedge jaw 150 may have an outer surface 154 that defines a curve or curvature 155 that may be substantially similar to the curvature of the pipe internal surface 12a or smaller. The jaw 150 also has a substantially flat inner surface 153 which is configured to be set against the set of cylindrical rollers or bearings 164 or against the track 162 of the center tapered wedge 160. As mentioned previously, this inner surface 153 may be coated with a low friction type of coating to enable the rolling/sliding of the jaw 150 against the rollers 164 or track 162 (linear roller bearing assembly) to engage the pipe internal surface 12a. The profile of the jaw 150 may be substantially triangular or wedge-like in shape and have an angle 151 of incline. This angle 151 and size or width of jaw 150 may be adjusted as so desired. The jaw 150 may also define a bore 152 at one end, wherein the bore 152 is configured to receive a spring or spring plunger 158 (the bore 152 may also be located on the opposite smaller face of the jaw 150 to couple an extension spring instead of the compression spring 158) and also optionally, a pin 159 to provide support for the spring 158 as well. The jaw 150 also defines a T-flange (or dove-tail) 156 along the sides of the jaw inner face 153. The T-flange 156 complementarily engages the T-slots (or dove-tail) 169 (or, as replaced by the embodiment of FIGS. 47-48) of the cone wedge 160, and the combination of the T-flange 156 and T-slots 169 help to keep the jaw 150 aligned along the tracks 162 while enabling sliding motion along said direction defined by tracks 162. Other combinations similar to the T-flange 156 and the T-slots 169 are possible wherein sliding motion is enabled between two pieces along a defined direction.

The gripping apparatus 140 may be spring 158 actuated, similar to the gripping apparatus 40 and gripping apparatus 120. In alternative embodiments, the gripping apparatus 140 may be bolt actuated as well. Moreover, the gripping apparatus 140 may individually actuate each jaw 150, but may also collectively and/or concurrently activate all jaws 150. Initially the jaws 150 are in a retracted position or pushed back to a slightly retracted position as the plug is installed in the pipe (see, e.g. FIGS. 23 and 25). In the free state the jaws 150, balls 70, disks and rollers 110 are naturally fully extended by the spring's 60 actuation (springs 60 may be eliminated and replaced by another means of actuation including but not limited to hydraulic, pneumatic, electrical, magnetic, thermal, gravitational or other mechanical devices). As a test plug 20 is installed, the jaws 150 are retracted by the light end force as they press against the pipe 12 end or pipe flange face until the force is greater than the spring force required to back the jaw 150 down the ramp 161/162 allowing it to enter the pipe 12. At this point nothing has been done with the seal bolts. The gripping apparatus 140 and plug slide in freely under light load, but instantly lock against the pipe inner diameter 12a and cannot be removed from the pipe 12 without first retracting the jaws 150. Literally a hand installed plug slid lightly into a pipe 12 will hold over 100,000 pounds-force depending upon the plug and pipe size. The springs or spring plungers 158 push the jaws 150 away causing the jaws 150 to slide or roll up against the rollers 164. Because the outer surface 168 of the cone wedge 160 is a substantially-conical shape having an incline 161, as the jaws 150 move along the track 162, the jaws 150 are pushed radially outward towards the pipe inner surface 12a and are thusly actuated or engaged with/against the pipe internal diameter 12a. See FIGS. 24 and 26 for examples of a gripping apparatus 140 with wedge jaws 150 actuated (their natural or default position). The incline 161 of the wedge cone 160 will cause the jaws 150 to move further out, applying additional locking force against the pipe internal diameter 12a. However, it should be noted that gripping apparatus 40, 120, 140, 240, 340 and 440 may be used in any combination with conventional plugging devices 20—ahead, behind, or without said plugging devices 20. By way of example, gripping apparatus 40, 120, 140, 240, 340 and 440 can be used ahead of a conventional or other plugging device 20 if attached or connected to such plugging device to keep or prevent it from being ejected if the pressure should attempt to cause the conventional or other plugging device 20 to slip. Some means of retracting the gripping mechanism/gripping apparatus 40, 120, 140, 240, 340 and 440 is made through the conventional or other plugging device 20 to retract the gripping mechanism/gripping apparatus(s) 40, 120, 140, 240, 340 and 440 unless such can be removed through the opposite end of the pipe or tube 12 to which such was installed (retraction mechanisms include, but are not limited to, headed pins, chains, pivoting links, cage, cables and/or tethers to pull retract individually/discretely actuated jaws, rollers, disks, balls, etc.). In other embodiments, the gripping mechanism/gripping apparatus 40, 120, 140, 240, 340 and 440 may be retracted and the plugging device 20 with the gripping mechanism/gripping apparatus(s) 40, 120, 140, 240, 340 and 440 are removed from the end of the pipe or tube 12 from which it was installed. The gripping mechanism/gripping apparatus(s) 40, 120, 140, 240, 340 and 440 can be stand alone or attached to a seal plug mechanism/plugging device 20 on the outside end of the conventional or other plugging device 20 to act as a safety lock to catch the conventional or other plugging device 20 if due to pressure it were potentially capable of being ejected from the pipe or tube 12. The gripping mechanism/gripping apparatus(s) 40, 120, 140 can be used for any purpose where it is desirable to securely grab the inside of a pipe or tube 12 until it is desired to be released or to allow motion in only one direction within the pipe or tube 12 until such is released. By way of further example, gripping apparatus 40, 120 and 140, 240, 340 and 440 may be mounted to a plugging device 20 (or a seal plug), or as a separate device placed in behind the low pressure side of the plugging device 20 to block the plugging device 20 in the pipe 20 should plugging device 20 and/or gripping apparatus 40, 120, 140, 240, 340 and 440 start to move. In alternate embodiments, the gripping apparatus 140 may also employ a cage or sleeve with openings or slots for the jaws 150 (similar to the above disclosed embodiments for gripping apparatuses 40 for balls 70 and gripping apparatus 120 for disks 100/rollers 110). To retract or disengage the jaws 150 from the actuated position, bolts are rotated in an opposite direction and used to retract the jaws 150 down the taper or incline 161 of the wedge cone 160. The jaws 150 move in the reverse or opposite direction away from the pipe inner surface 12a, and the gripping force between the gripping apparatus 140 and the pipe 12 is released. In further alternative embodiments the gripping apparatuses 40, 120, 140, 240, 340 and 440 can be used to mate/engage a groove or step (not shown) located on the inner diameter of a bore, pipe, tube or the like for locking/catching until retracted. Such a groove or step is not required but may be implemented into any embodiment described herein.

Figure 29:
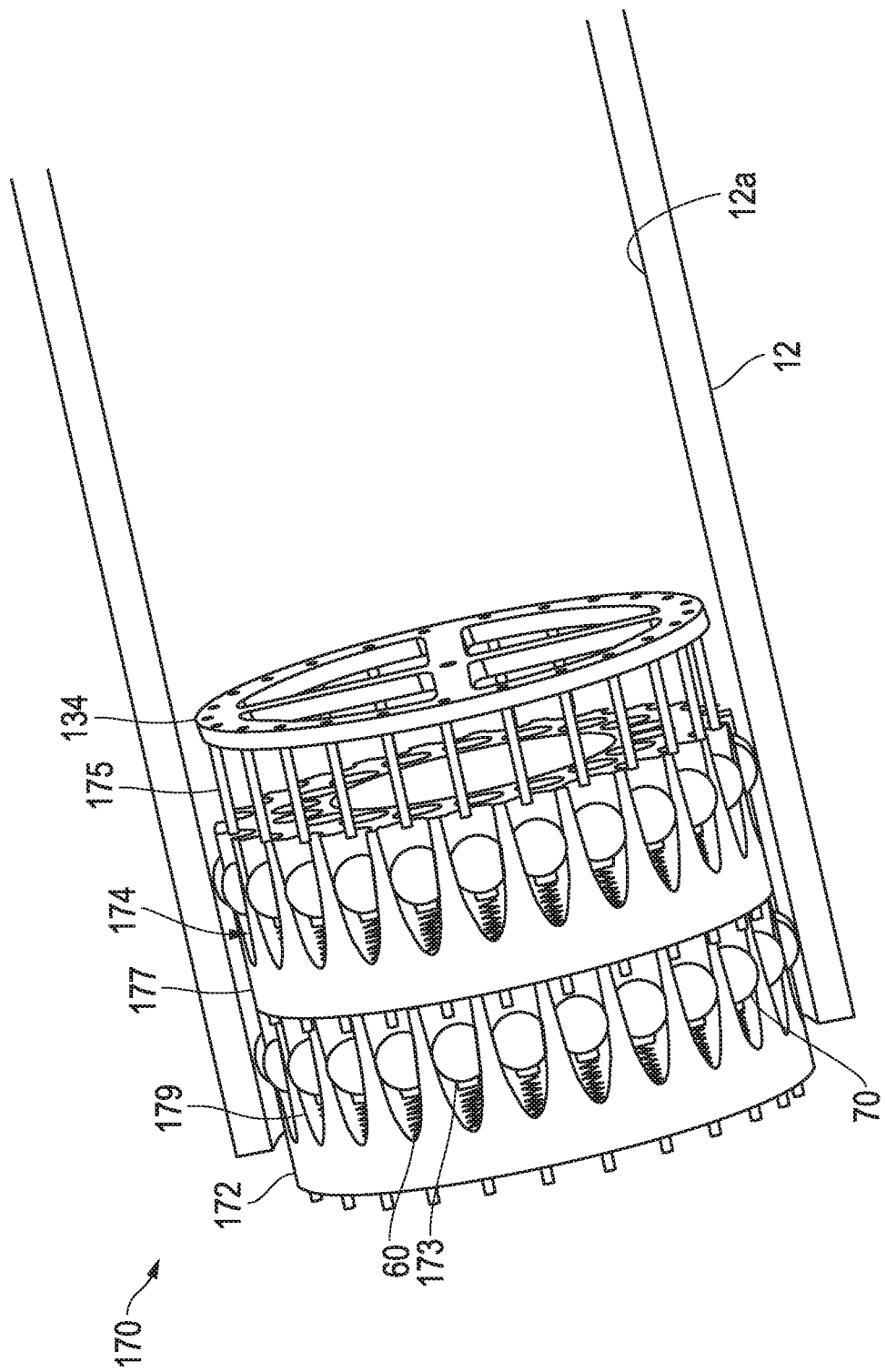
FIG. 29 depicts a schematic perspective view of an alternate exemplary embodiment of a gripping apparatus with balls actuated.
Figure 30:
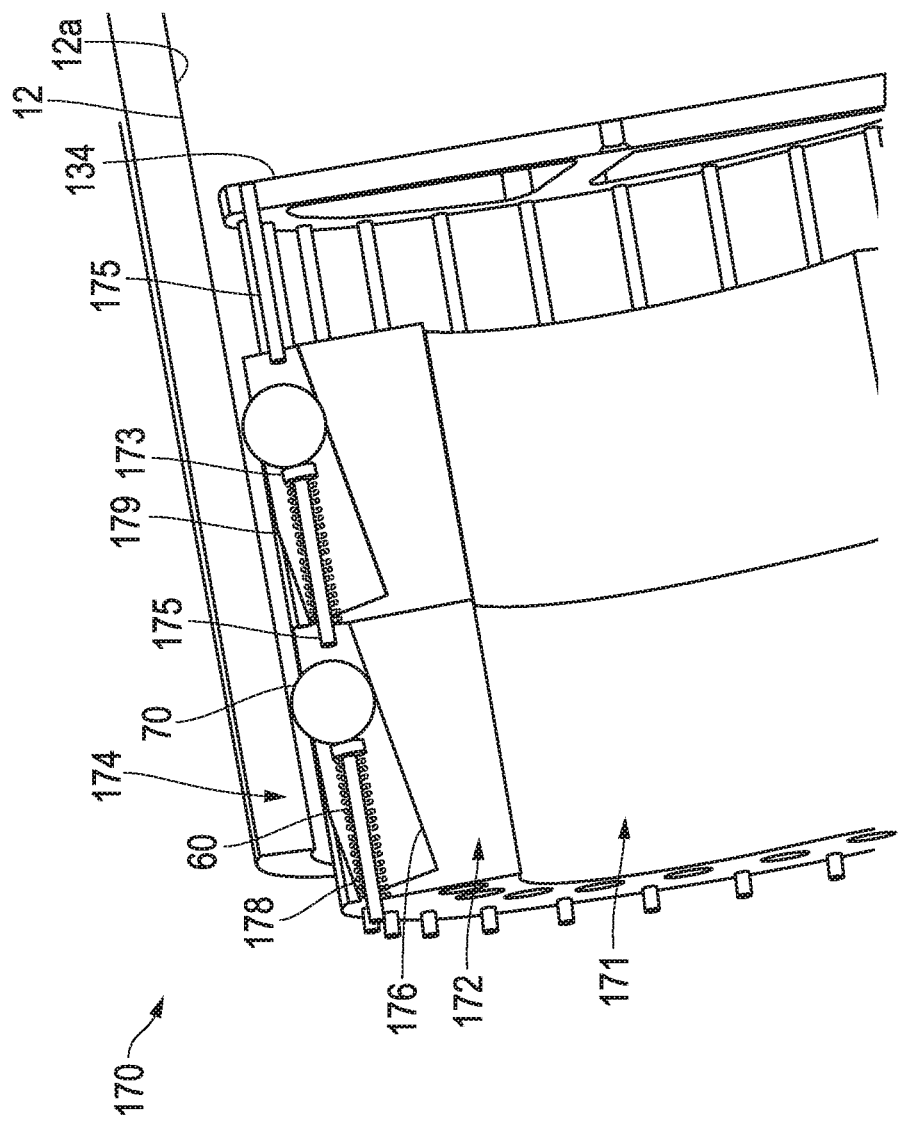
FIG. 30 depicts a schematic perspective view in cross-section of the exemplary embodiment of a gripping apparatus of FIG. 29 with balls actuated.
Figure 31:
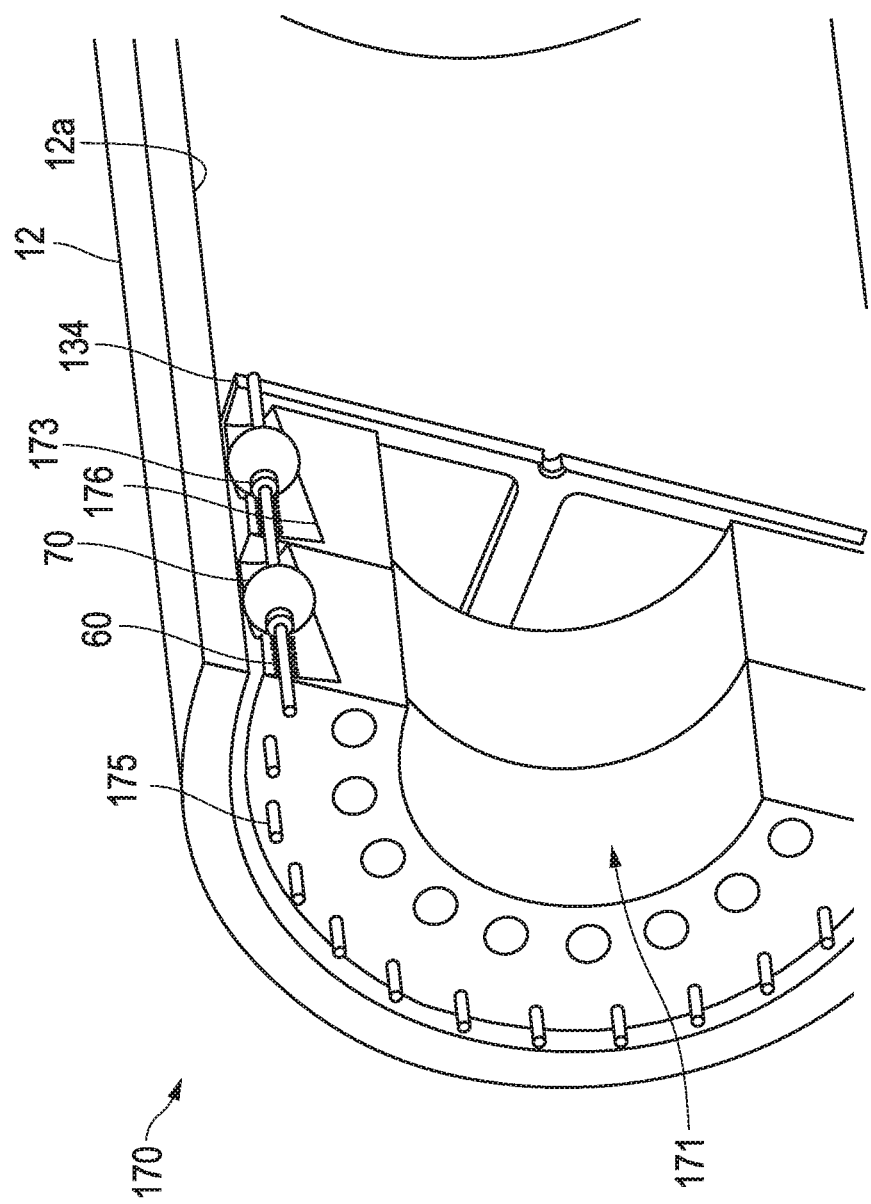
FIG. 31 depicts a schematic perspective view in section of the exemplary embodiment of a gripping apparatus of FIGS. 29-30 with balls retracted.

FIGS. 29 to 31 depict an alternate exemplary embodiment of a gripping apparatus 170 with balls 70 and without any cage or sleeve 80. The exemplary embodiment of the gripping apparatus 170 may also be used in conjunction with a plugging device 20 and may include annular mounting bodies 172, springs 60, balls 70, blocks 173, plates 134 and pins 175. There may be multiple annular mounting bodies 172, each annular body 172 having a throughbore 171 defined axially therethrough. The outer surface or circumference 177 of the mounting body 172 may define a plurality of captive pockets or bores 174 (preferably formed by boring into the mounting body 172 at an angle inclined to its external surface). These pockets or bores 174 include a retained portion of mounting body or cover 178 having an opening 179 over an inclined track 176. The opening 179, as depicted, may be semi-elliptical or ovaloid in shape (preferably defined by the intersection of the bore 174 and the mounting body 172), but may also be defined in the cover 178 as other shapes or configurations as well (such as, by way of example only, a rectangular, trapezoidal, or triangular opening). The opening 179 may be defined to be narrower at one end to stop or prevent the ball 70 from fully moving under the cover 178 of the pocket or bore 174 in the fully retracted state or position (see FIG. 31 for an example of the retracted state of the gripping apparatus 170).

The balls 70 may be mounted adjacent to a spring 60 and situated or positioned into the captive pockets or bores 174. Further, the balls 70 may rest against the inclined mounting track 176, and may optionally include blocks, washers, or pin heads 173 situated between the spring 60 and the balls 70. The balls 70 may be captured by the bore 174 as long as the centerline of the ball 70 (generally coinciding with the centerline of the bore 174) is kept below a point where half the bore 174 is exposed (i.e. the bore 174 is formed in the mounting body 172 such that the circumference of the inner diameter of the bore is always greater than a semicircle in cross section).

A number of pins 175 may be mounted on the plate 134, which is located below an annular mounting body 172. The number of and position of the pins 175 on the plate 134 may correspond to the number of balls 70 in a row on the annular mounting body 172 adjacent to the plate 134. There may also be a number of pins 175 inserted into each spring 60 connected to each block 173 or ball 70 in each annular mounting body 172. Each pin 175 may extend into the bore or pocket 174 in the annular body 172 above each said pin 175. The amount of extension of the pin 175 into the bore or pocket 174 above may be adjusted as desired by the operator of the gripping apparatus 170 depending on whether to engage the balls 70 of the gripping apparatus 170 with the internal diameter 12a of the pipe 12, or to retract the balls 70 from the internal diameter 12a.

As in other embodiments of the gripping apparatus, the gripping apparatus 170 may be cam actuated, threadably actuated, spring actuated, and/or bolt actuated. Actuation of the gripping apparatus 170 results in the balls 70 moving along the inclined tracks 176 and toward and engaging the internal diameter 12a of the pipe 12. The gripping apparatus 170 may retract the balls 70 by use of the pins 175 by reversing the cam, thread, spring or bolt actuation as well. Reversing, by way of example, a bolt actuated gripping apparatus 170, will move the pins 175 progressively farther into each pocket or bore 174 above said pins 175, and against the bottom of the balls 70 in the above pockets or bores 174. Upon contact with and/or pushing force from the pins 175, the balls 70 disengage from the internal diameter 12a of the pipe 12 and move up along the inclined track 176 until the balls 70 reach the end of the opening 179 (or the cover 178).

Figure 32:
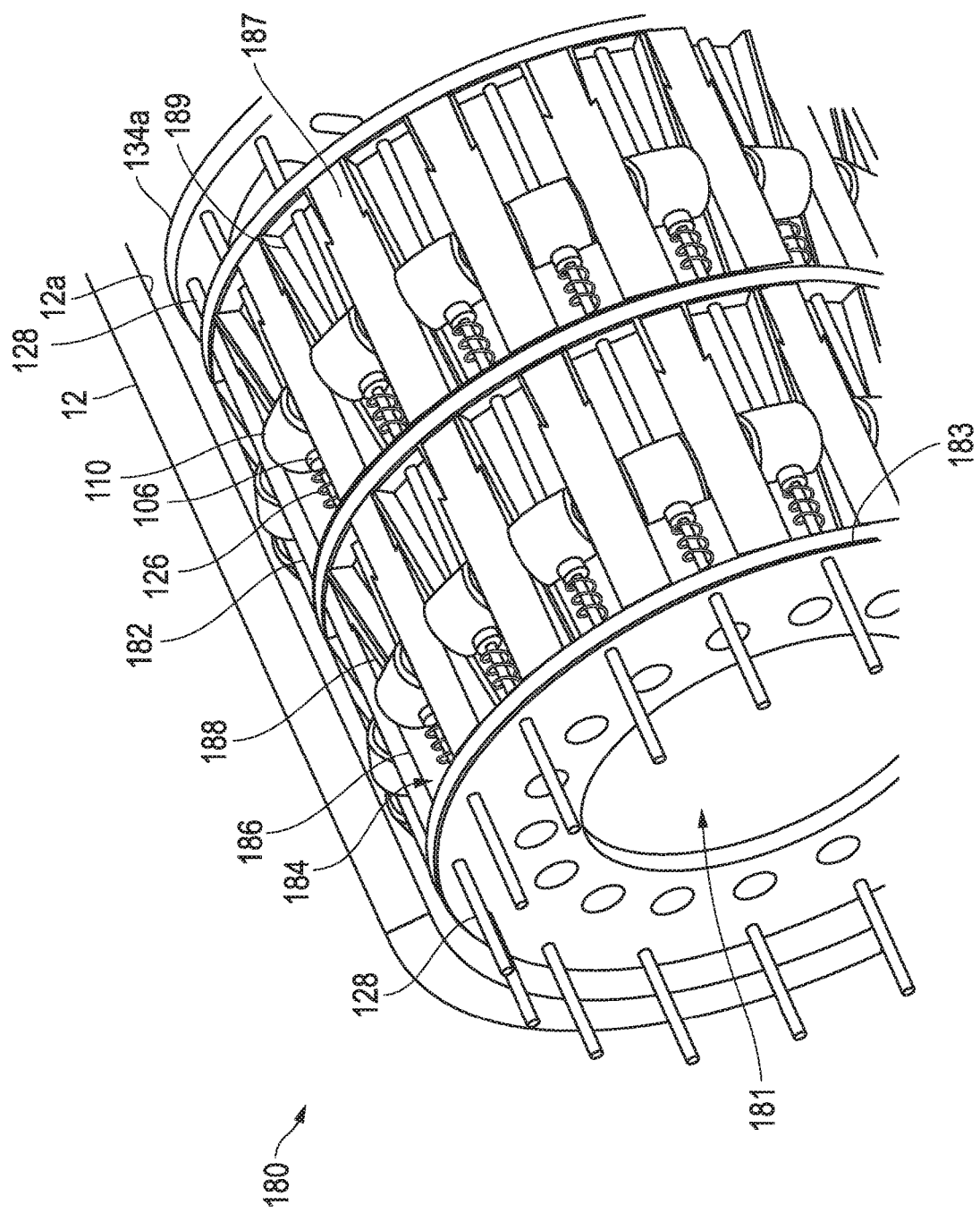
FIG. 32 depicts a schematic perspective view of an alternate exemplary embodiment of a gripping apparatus with rollers at least partially retracted.
Figure 33:
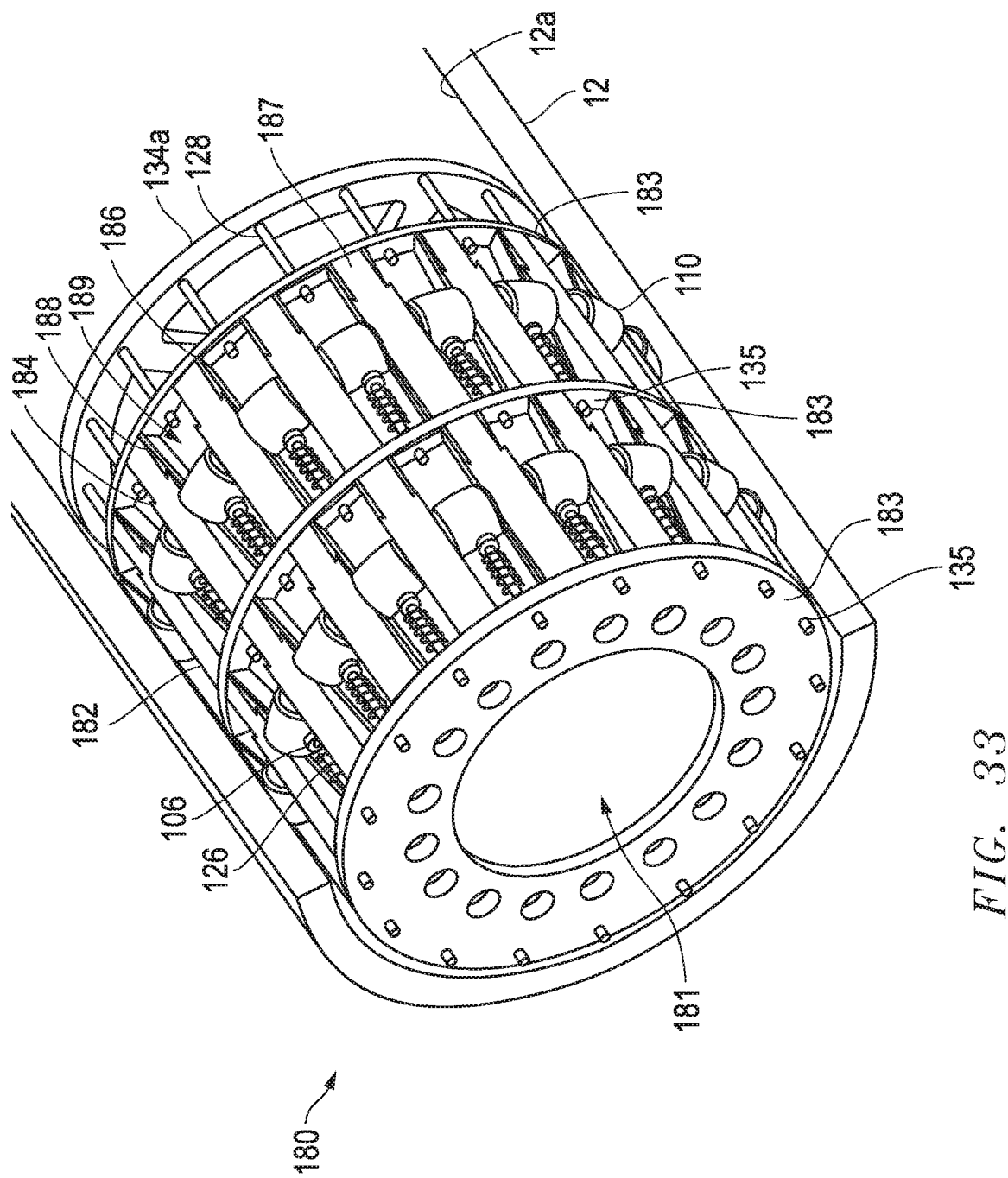
FIG. 33 depicts a schematic perspective view of an alternate exemplary embodiment of a gripping apparatus with rollers of FIG. 32 showing rollers individually or independently at least partially actuated or actuated to grip the inner diameter of the pipe (shown in cross-section).
Figure 34:
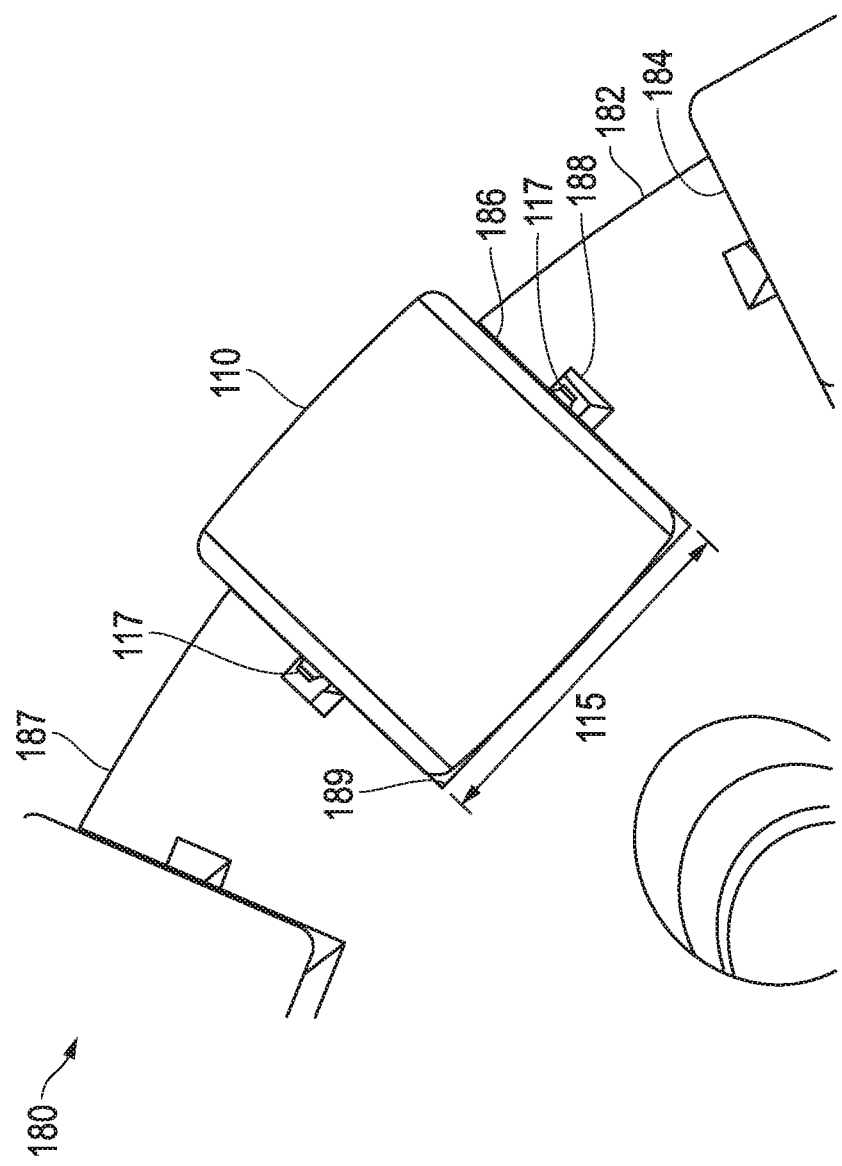
FIG. 34 depicts an enlarged schematic top end view or end sectional view of the exemplary embodiment of a gripping apparatus with rollers of FIGS. 32-33, not within the tube.

FIGS. 32-34 depict views of an alternate exemplary embodiment of a gripping apparatus 180 with rollers 110, and having no cage or sleeve 80 (although shown with rollers 110, disks 100 may be substituted in alternate exemplary embodiments). FIG. 32 depicts a view of the gripping apparatus 180 with the rollers 110 at least partially retracted, and FIG. 33 depicts a view of the gripping apparatus 180 with the rollers 110 at least partially actuated/engaged with the inner diameter 12a of the pipe 12. The gripping apparatus 180 may include rollers 110, one or more annular mounting bodies 182, springs 126, blocks, washers, or pin heads 106 (functioning similar to as described with respect to FIG. 31 above), plates 134, and pins 128. Each annular mounting body 182 is inscribed with a plurality or series of compartments, pockets or slots 184 along the outer circumference or surface 187 of the annular mounting body 182. Each annular body 182 may define a throughbore 181 defined axially therethrough.

Similar to the embodiments of the gripping apparatus 120, the rollers 110 (or disks 100) of the gripping apparatus 180 may be mounted below and adjacent to a block, washer, or pin heads 106 (functioning similar to as described with respect to FIG. 31 above). A spring 126 may be connected to and above the block 106, and the spring 126 may further be mounted around a pin 128. The pin 128 may travel through pin openings 135 defined in the bottom flanges 183 of the mounting bodies 182 (or alternatively, or additionally, through pin openings 135 defined in plates 134 interspersed between the mounting bodies 182).

The pockets 184 may be defined by: a width 185 which may be slightly greater the width of the roller 110, so as to house the roller 110; two pocket walls 186 on either side of the pocket 184; and an inclined track 189 along the bottom of the pocket 184 upon which the rollers 110 rests (inclined relative to the inner surface or inner diameter of the pipe or tube 12). The pocket walls 186 are raised above the inclined track 189 and may be inscribed or slotted with a T-slot 188 in each wall 186 (see FIG. 34). The T-slots 188 may be inclined similar to the incline of the inclined track 189 (or also, inclined relative to the inner diameter 12a of the pipe 12). The rollers 110 each have an extension, post, axle, or shaft 117 on either side of the roller 110. Each axle 117 extends into (or is held captive by) each T-slot 188 within the pocket walls 186 (e.g. the length of the axle 117 is greater than the distance between facing pocket walls 186 but less than the distance between facing/opposite T-slot(s) 188.

Similar to the embodiment of the gripping apparatus 170, the bottom plate 134a includes a number of pins 128 equal to the number of rollers 110. These pins 128 may disengage the rollers 110 from the actuated position by applying pushing force to the bottom of the rollers 110 through the bottom of the annular mounting bodies 182. The pins 128 may travel through the flanges 183 of a mounting body 182, and/or through plates 134 interspersed between each annular mounting body 182, and through greater than one pocket, compartment or slot 184.

The actuation of the gripping apparatus 180 to engage the rollers 110 with the inner diameter 12a of the pipe 12 is similar as described above for the gripping apparatus 120 embodiments. To disengage, retract or release the gripping apparatus 180, the bottom plate 134a pushes the pins 128 into the bottommost set of rollers 110, thus pushing the bottommost rollers 110 back along the inclined track 189. The pins 128 of the bottommost set of rollers 110 are also moved backwards, and into the next compartment or pocket 184 above and the next set of rollers 110 through the pin openings 135 of the flange 183 or plate 134. This next set of rollers 110 is thus accordingly also disengaged, and the force is passed long the pin 128 into another set of rollers 110 to disengage (if applicable). Although not depicted in the figures, the top-most row of rollers 110 may optionally just use springs 126 without a pin 128, as there is no other additional set of rollers 110 to disengage.

Figure 35:
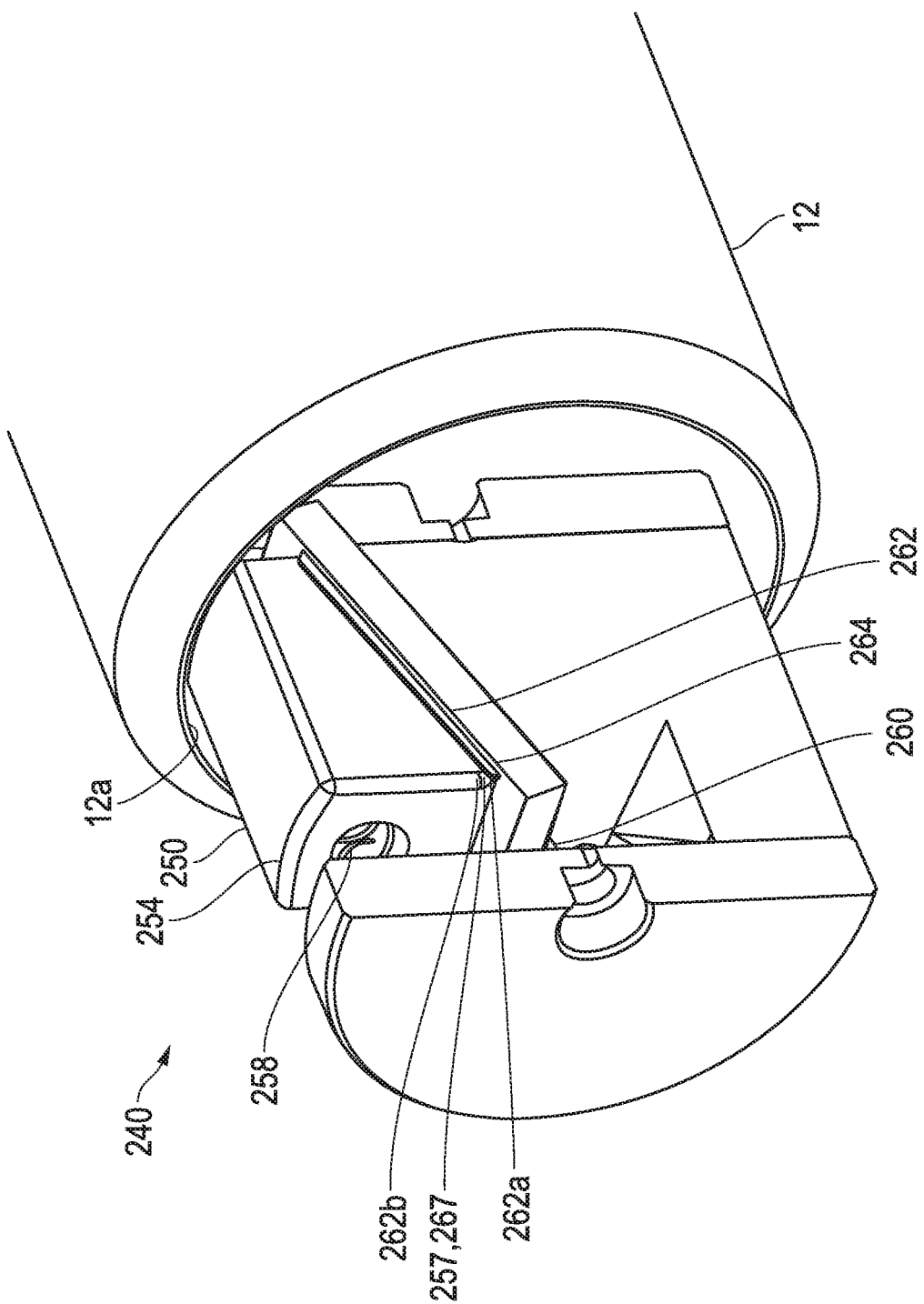
FIG. 35 depicts a schematic perspective view, partially in section, of an alternate exemplary embodiment of a gripping apparatus with sliding jaws.

FIG. 35 depicts a schematic perspective view, partially in cross-section, of an alternate exemplary embodiment of a gripping apparatus 240 with sliding jaw(s) 250 (only one represented but there may be more in the spirit of the other embodiments). In addition to sliding jaws or jaws 250, exemplary embodiments of a gripping apparatus 240 may also include a centered tapered wedge or wedge cone 260, base plate or block 264 with track/slide plate/hardened wear surface 262, and springs or spring plungers 258. The gripping apparatus 240 is inserted into a pipe 12, and then the jaws 250 are actuated to engage against the pipe internal surface 12a when desired. The track/slide plate/hardened wear surface 262 of the independently sliding jaw 250 may be one unitary piece (attached to one or the other of sliding jaw(s) 250 or base plate 264; or as a part of the sliding jaw 250 at the innermost end) or a track plate 262a (attached to base plate 264) in combination with a slide plate 262b (attached to sliding jaw(s) 250) each having a respective wear surface 267. Any or all wear surface(s) 267 may have a layer of antifriction coating(s) 257, such as, but not limited to, TURCITE brand. Each sliding jaw(s) 250 may have an outer-upper gripping surface 254. The outer-upper gripping surface 254 is preferably a hard coating or layer on sliding jaw(s) 250 with texture for the gripping the pipe internal diameter 12a. The sliding jaw(s) 250 must have enough friction to allow the force (between outer-upper gripping surface 254 and pipe internal diameter 12a) to increase as pressure is applied to back of the wedge cone 260. The base plate or block 264 may be integrated with the wedge cone 260 if desired.

The embodiment of a gripping apparatus 240 with sliding jaw(s) 250 functions similar to the embodiment(s) of FIGS. 21-28 but without rollers 164. Jaws 150, 250 may, by way of example only, be modified to any trapezoidal shape or any pie-shape. Jaws 150, 250 and their respective assembly in any gripping apparatus, e.g., 150, 240, may be utilized for flushing sand and/or debris in use for plugging or connecting (including any trapezoidal or pie shape), and may be hollowed-out and/or grooved for same. Slots for receiving the respective jaws 150, 250 need not be limited to a rectangular profile/slot.

Figure 36:
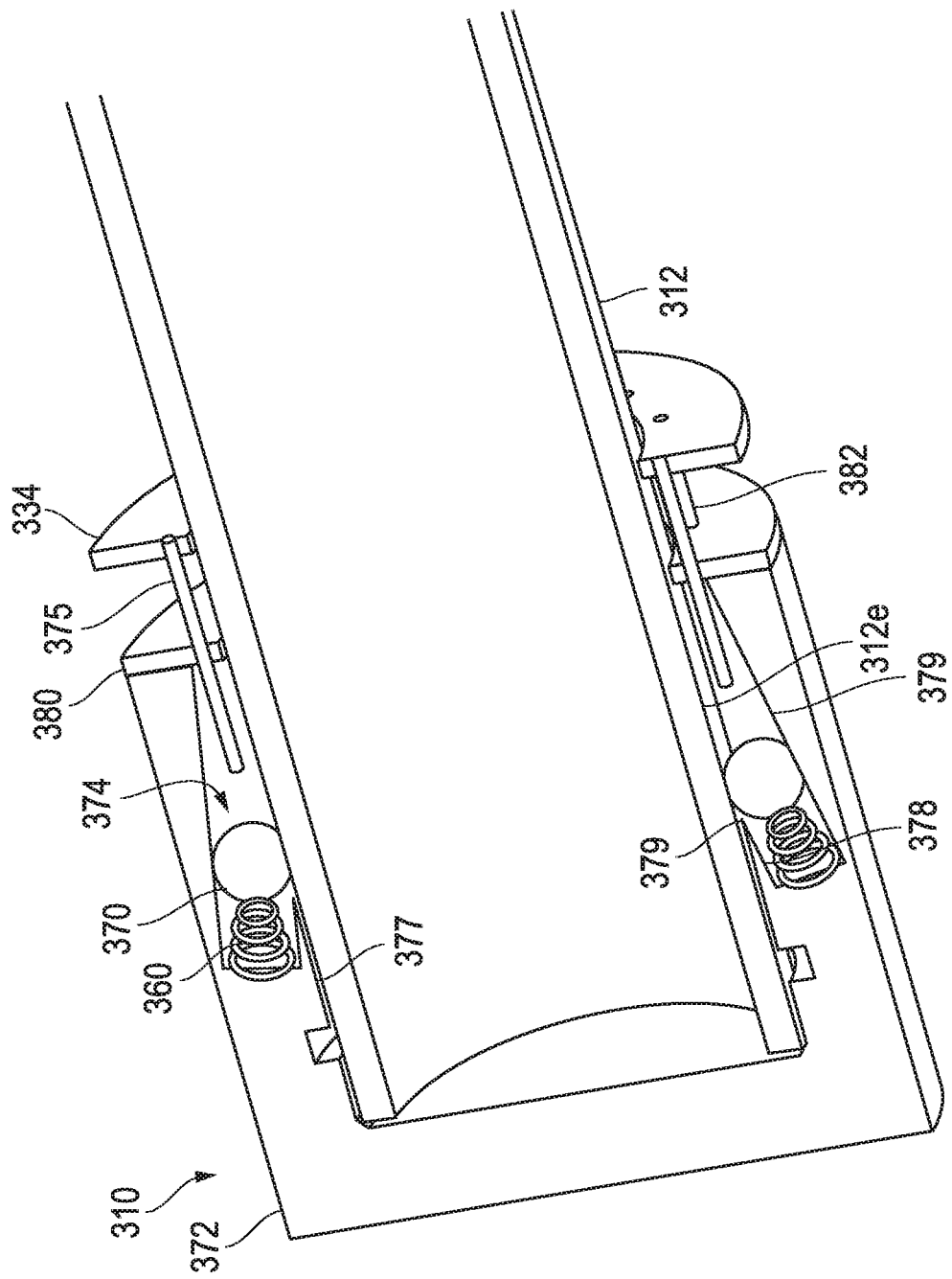
FIG. 36 depicts a schematic perspective view of an alternate exemplary embodiment of a gripping apparatus for external gripping with balls at least partially actuated.
Figure 37:
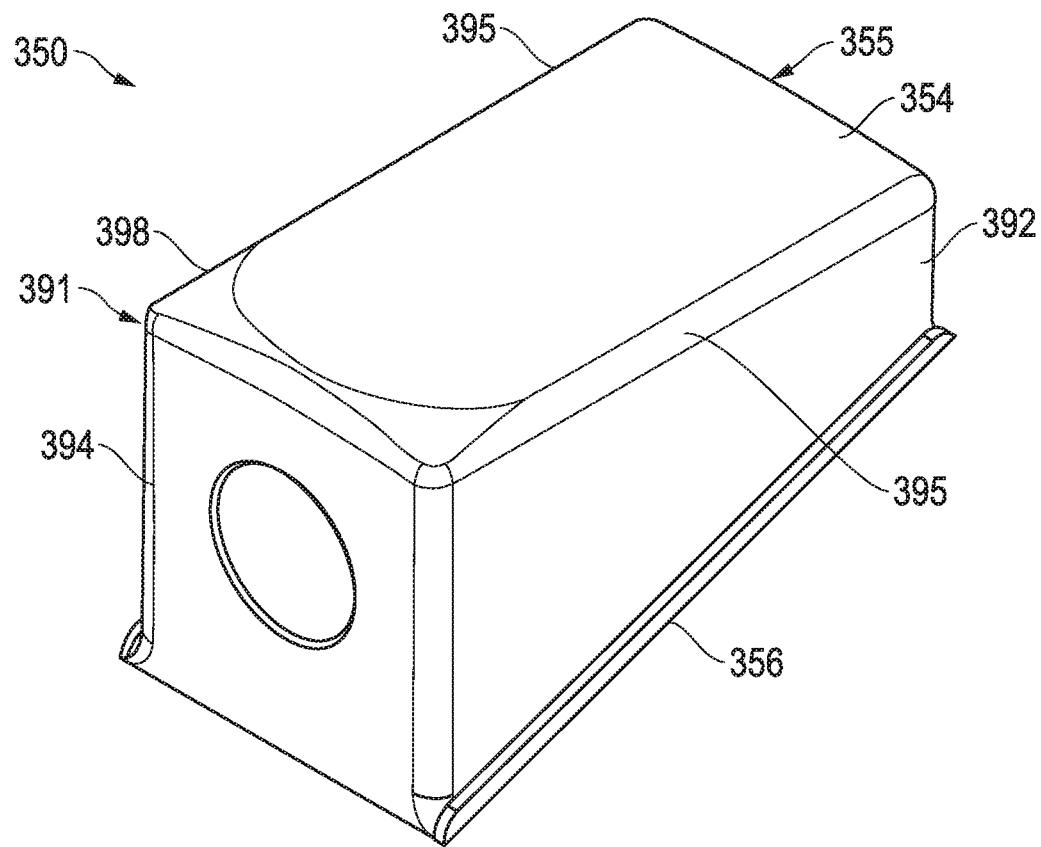
FIG. 37 depicts a perspective view of an exemplary embodiment of a wedge jaw.
Figure 38:
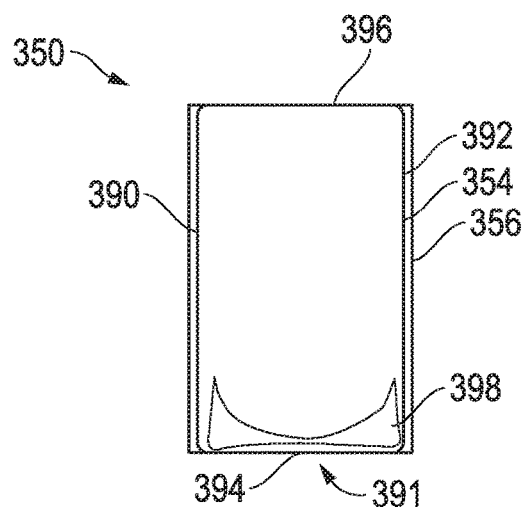
FIG. 38 depicts a top view of the embodiment shown in FIG. 37.
Figure 39:
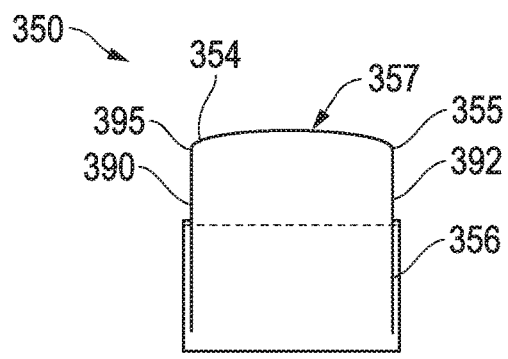
FIG. 39 depicts a side-end view of the embodiment shown in FIGS. 37-38.

FIG. 36 depicts a schematic perspective view, partially in cross-section, of an alternate exemplary embodiment of a gripping apparatus or plug 310. Such a gripping apparatus or plug 310 may be used for plugging externally or making an external or exterior connection (e.g. female to male connection) to a pipe, rod or tube 312. The gripping apparatus 310 is represented with balls 370 (but balls 370 could be replaced by or combined with rollers or jaws within the spirit of the many embodiments taught or disclosed). The inner surface or circumference 377 of the mounting body 372 may define a plurality of captive pockets or bores 374 (preferably formed by molded cast, boring or otherwise formed, optionally including a T slot means of guiding, into the mounting body 372 at an angle inclined to its internal surface 377). These pockets or bores 374 include a retained portion of mounting body or cover 378 having an opening 379 over a declined track 376 (i.e. angled toward the central axis of mounting body 372 or pipe 312). The opening 379, as depicted, may be semi-elliptical or ovaloid in shape (preferably defined by the intersection of the bore 374 and the mounting body 372), but may also be defined in the cover 378 as other shapes or configurations as well (such as, by way of example only, a rectangular, trapezoidal, or triangular opening). The opening 379 may be defined to be narrower at one end of its aperture length (or even at the opening's access interface at the surface 377) to stop or prevent the ball 370 from fully moving under the cover 378 of the pocket or bore 374 in the fully retracted state or position.

The balls 370 may be mounted adjacent to a spring 360 and situated or positioned into the captive pockets or bores 374. Further, the balls 370 may rest against the declined mounting track 376 and/or cover 378. The spring 360 may be mounted on a plunger rod with a cap for retaining the spring 360 (similar to pins 175 of FIG. 30). The balls 370 may be captured by the bore 374.

A number of pins 375 may be mounted on the plate or disc 334, which is located proximate an annular mounting body 380 having pinholes 382. The number of and position of the pins 375 on the plate 334 may correspond to the number of balls 370 in a row on the annular mounting body 372 adjacent to the annular mounting body 380. The amount of extension of the pins 375 into the bore or pocket 374 above may be adjusted as desired by the operator of the gripping apparatus 310 (and plate or disc 334) depending on whether to engage the balls 370 of the gripping apparatus 310 by means of the outer surface of the balls 370 with the external or exterior diameter 312e of the pipe 312, or to retract the balls 370 from the external diameter 312e.

FIGS. 37-40 show an exemplary embodiment of an outer jaw gripping surface 354 for a discrete wedge jaw 350 (similar to FIGS. 27-28) which may be included as part of an overall gripping apparatus 340 as represented in FIGS. 41-44. The wedge jaw 350 has four sidewalls 390, 392, 394 & 396 arranged in parallel pairs. The top surface or outer surface 354 of the wedge jaw 350 has a convex curve, curvature or arch 355 bounded or defined from one sidewall 390 to another parallel sidewall 392 (the longer sidewall pair) with the highpoint of the curve 355 generally defined at the center-point of sidewalls 394 and 396 where they terminate at outer surface 354 such that the radius of the curve 355 of the wedge jaw 350 is preferably slightly smaller than the inside pipe radius. The radius of the curve 355 of the wedge jaw 350, however, may be the same as the inside pipe radius or more significantly smaller (i.e. less than or equal to the inside pipe diameter or radius). In one working example of "slightly smaller" by way of example only, the radius of the curve 355 is 3.75 inches whilst the nominal inner diameter 12a of the pipe is 7.65 inches for an eight inch pipe or tube 12. In this embodiment, the outer jaw surface 354 allows for gradual transitions when actuating or de-engaging the gripping apparatus to/from the pipe internal diameter or surface 12a during normal use, which, by way of example only, may be similar to as actuated in FIG. 35.

The arch of the curve 355 can be a circular or cylindrical type curve but is not limited to same, and could, for example, be an elliptical, ovular, or parabolic shape or even a wave shape such as sinusoidal. The outer surface 354 may have texturing 352 (texturing as further described below). The outer surface 354 may be fully or only partially textured 352.

Similar to FIGS. 27, 28 & 35, the wedge jaw 350 may have an angle 351 (by way of example only, twenty degrees), a T or rounded flange 356, with springs or spring plungers (not shown) as part of a sliding jaw 250 with slide plate 262.

The outer jaw surface 354 may optionally have a tapered edge(s) 395 at the top of any (one or more) or all of sidewall(s) 390, 392, 394, 396 bounded by outer surface 354. The tapered edge(s) 395 may be, for example, a radius, shallow chamfer, a beveled edge, rounds or any tangential or near tangential plane. The tapered edge(s) 395 may be textured 352 and/or allowing for a gradual load concentration with no sharp load transitions to mark or damage the pipe inner diameter 12a. The tapered edge(s) 395 may be partially or fully textured 352.

The texturing 352 may, by way of example only, but not limited to, be stippling/dimples such as in a grit coating (e.g. carbide grit) 353a (see FIG. 45), a series of peaks/ridges and valleys 353b (see FIG. 46), or otherwise generally braids, reticulation, friction padding, a typical file surface, a criss-cross series of ridges and valleys such as in a file surface although in this case un-sharpened (such as in an unsharpened nail file or metal file of a pocket knife) or the like texturing 352. The metal hardness may also be selected, according to one as skilled in the art, so as to reduce or eliminate inner diameter 12a damage to the pipe 12 and in relation to the material type and/or surface treatment of the pipe 12.

The outer jaw surface 354 may optionally have a transition surface(s) 398. The transition surface(s) 398 is at least a thinning of the outer surface 354 and may, for example be, swept chamfer, swept arc or radius, compound leading edge curve(s), gradient(s), radius, beveled edge, or other non-liner edge tangent or near-tangent lines/planes/arcs off the high-point or center-point of the curve 355 proximate and bounded by sidewall 394. The transition surface(s) 398 is mounted proximal to the spring plunger base plate (seen in FIG. 35) to keep the edge 391 (defined between sidewall 394 and outer surface 354) opposing the axial load of spring plunger base plate from digging into or marking the pipe inner diameter 12a in normal use of the isolation plug of double block and bleed pipe test plug. This transition surface(s) 398 eliminates or reduces any sharp transition points (and may be included in other embodiments beyond the wedge jaw, e.g., balls, disks, rollers, and the like). By way of example only, it could be a swept chamfer similar to a shallower nut chamfer or a larger swept arc, a straight swept arc, or shallow chamfer (akin to the front of a snow shoe) that is swept along the top curvature.

The outer jaw surface 354 may optionally have a surface coating layer(s) or textured hard enhanced friction coating 357. The surface coating layer(s) 357 (and/or layer of antifriction coating(s) 257) may for example be wear coated with tungsten carbide, be diamond, hard stainless steel, or any roughened surface.

The contour(s) of the outer jaw surface 354 help prevent sharp load transitions which may damage or mark the pipe or tube inner diameter 12a around the outer jaw surface perimeter. The outer jaw surface 354 as defined herein and/or the smooth radius or curve 355 of the outer jaw surface 354 allows a slight gradual transition away from the interface or contact area between the gripping apparatus 340 and the pipe internal diameter or surface 12a to avoid causing or reduce damage to a pipe or tube inner diameter 12*a*, as examples, for gripping isolation plugs or gripping double black and bleed plugs for testing.

Figure 40:
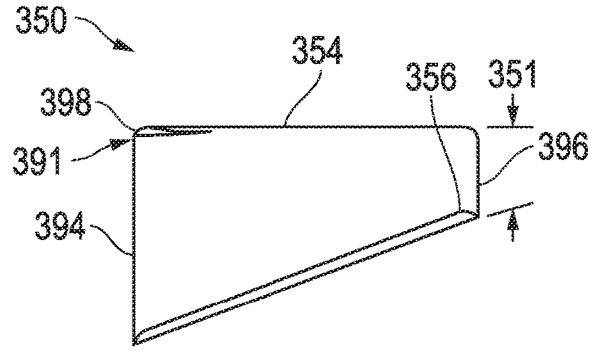
FIG. 40 depicts a side view of the embodiment shown in FIGS. 37-39.
Figure 45:
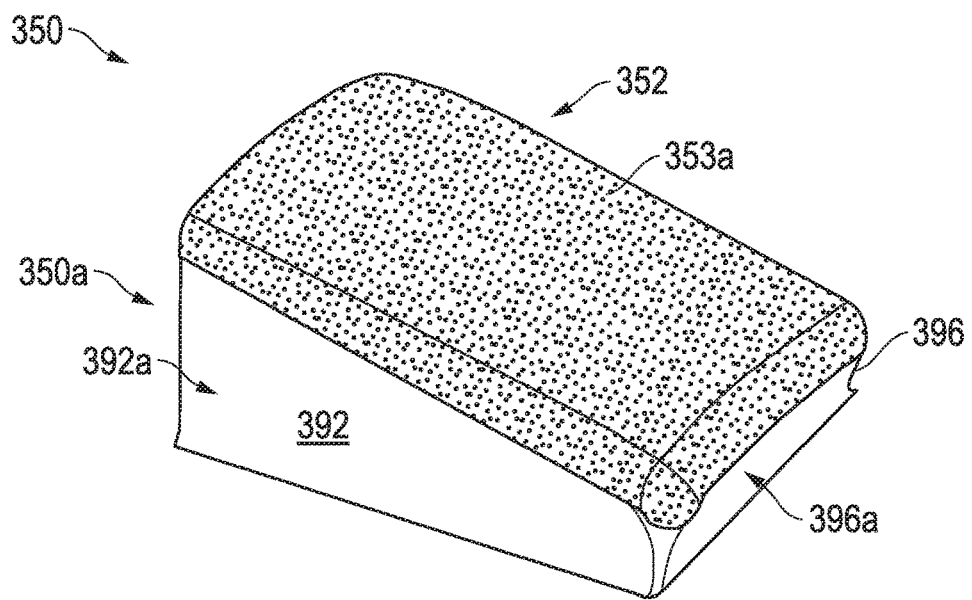
FIG. 45 depicts a perspective view of an exemplary embodiment of a wedge jaw having an exemplary embodiment of texturing.
Figure 46:
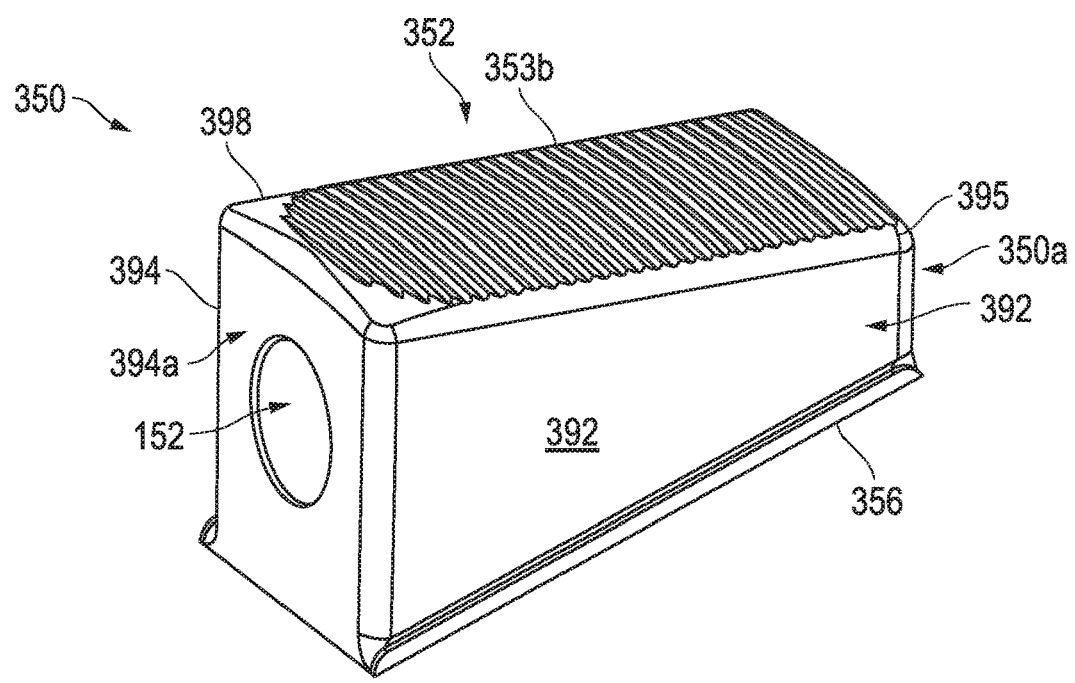
FIG. 46 depicts a perspective view of an exemplary embodiment of a wedge jaw having an exemplary embodiment of texturing.

As best seen in FIGS. 40, 45 & 46 a pair or sidewall 390 and 392 may have a generally trapezoidal shape or profile 392*a* and in one exemplary embodiment the shape of a right trapezoid thereby dictating the wedge shape 350*a* of the wedge jaw 350. The other two sidewalls 394 and 396 may be generally of a rectangular shape 394*a*, 396*a* respectively, one of greater height than the other has dictated by the wedge shape 350*a* of the wedge jaw 350. However it is to be understood that any polygon that has one face acting as a wedge contact and another face acting as the pipe internal diameter or surface contact 12*a* can be used, or even just one or two ball shaped contact point surfaces riding against a conical/wedge ramp/track.

The exemplary embodiments of FIGS. 37-40 (and also FIGS. 27-28, & 35) for an outer jaw gripping surface 354 are not limited to a wedge shape and the jaw 350 could be any other shape, such as, by way of example only but not limited to, rectangular, square, cylindrical, fin-shaped, arcuate, or spiraled with curve 355 as part of the outer jaw gripping surface 354.

Figure 41:
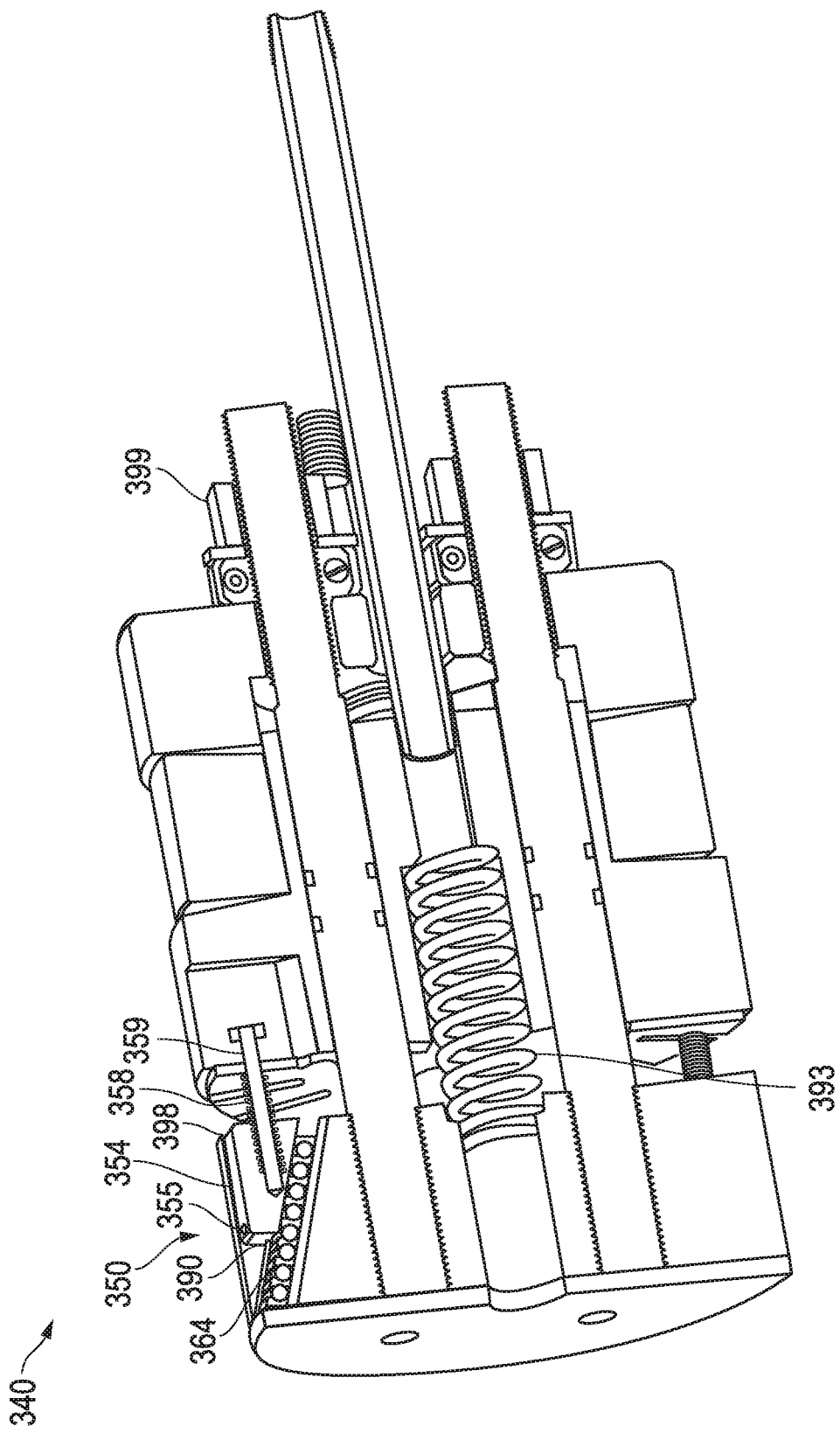
FIG. 41 depicts a schematic sectional perspective view of an alternate exemplary embodiment of a gripping apparatus with wedge jaws.
Figure 42:
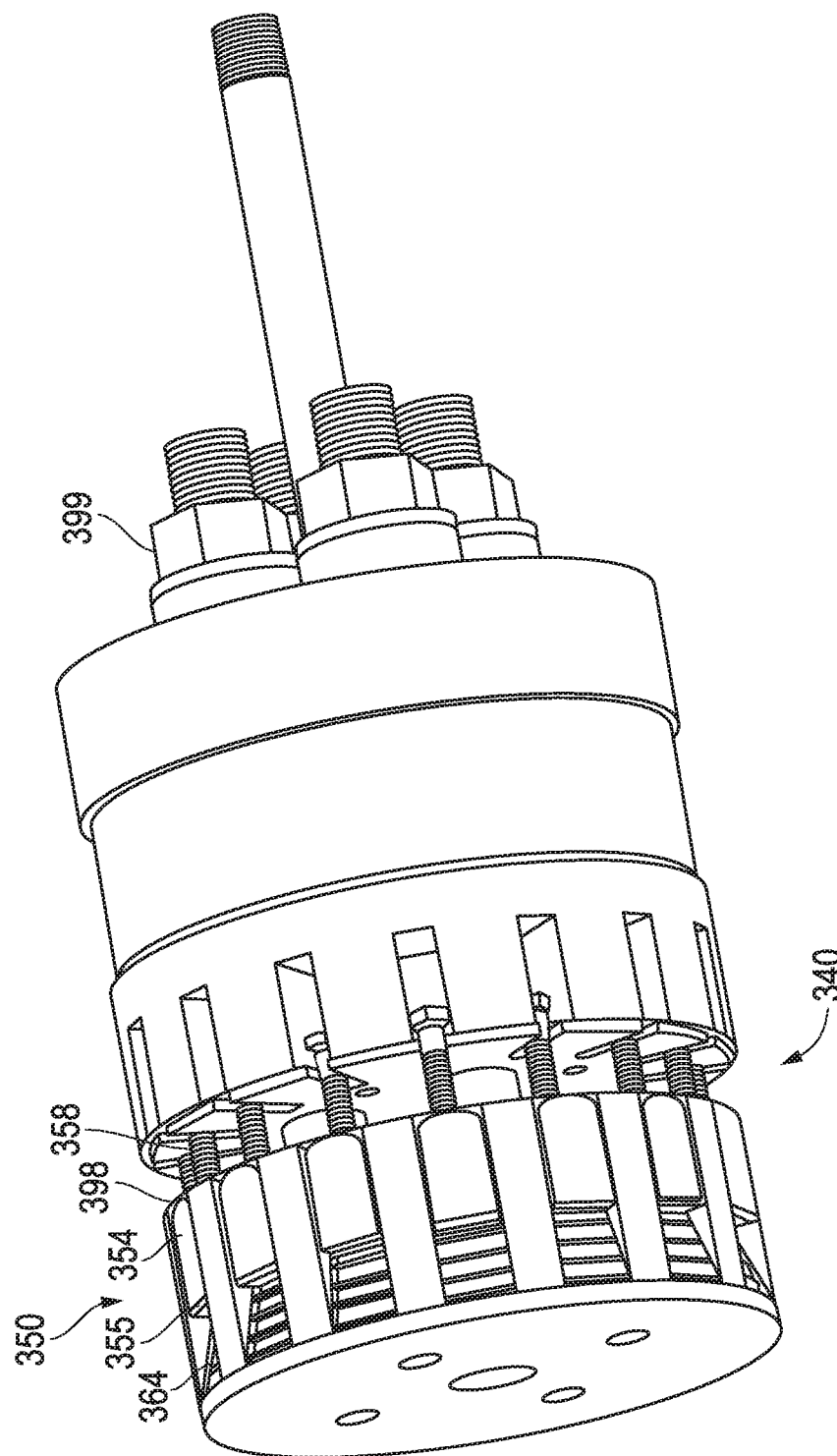
FIG. 42 depicts a schematic perspective view of an alternate exemplary embodiment of a gripping apparatus with wedge jaws.
Figure 44:
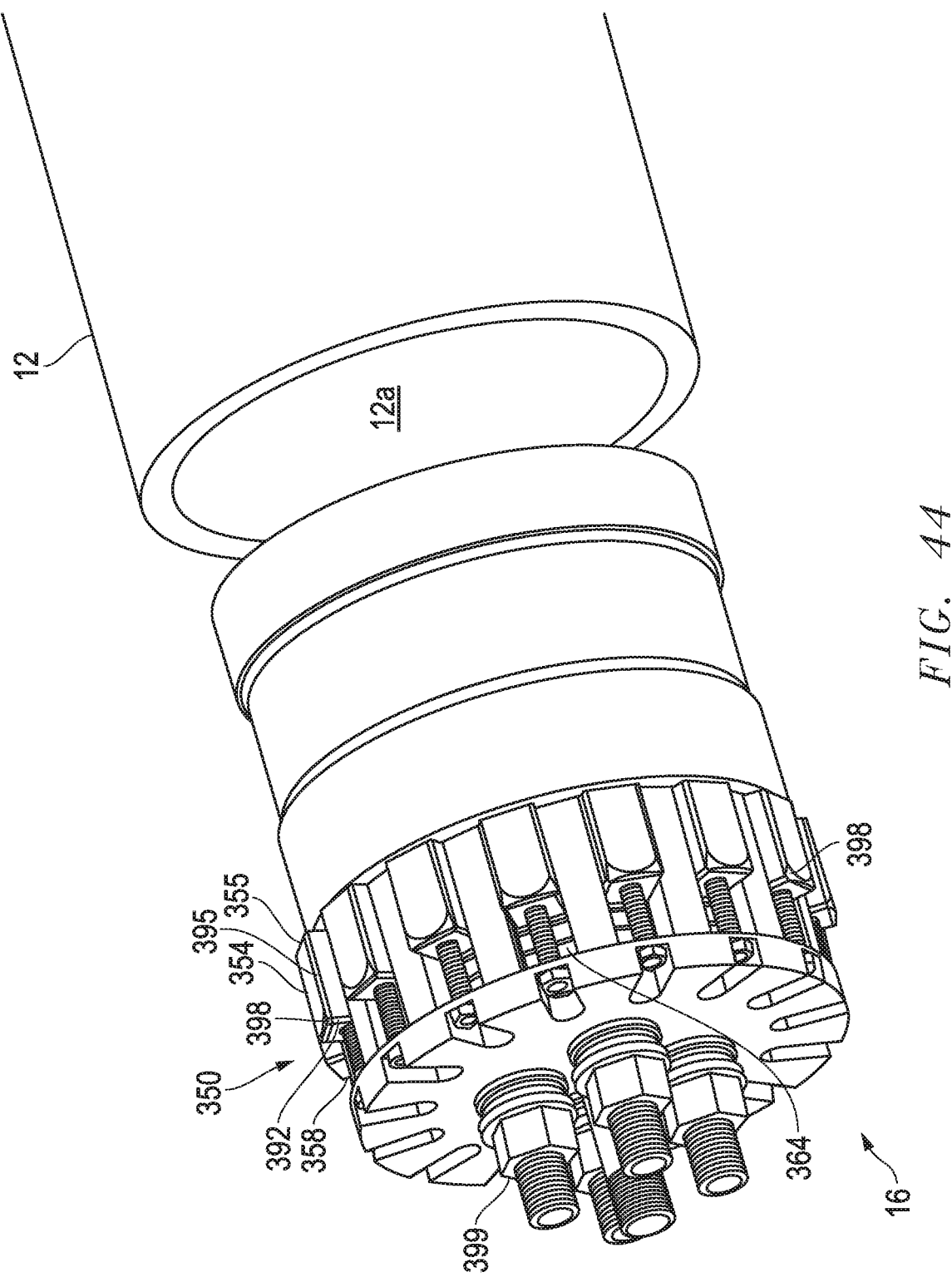
FIG. 44 depicts a schematic perspective view of an alternate exemplary embodiment of a gripping apparatus with wedge jaws.
Figure 44A:
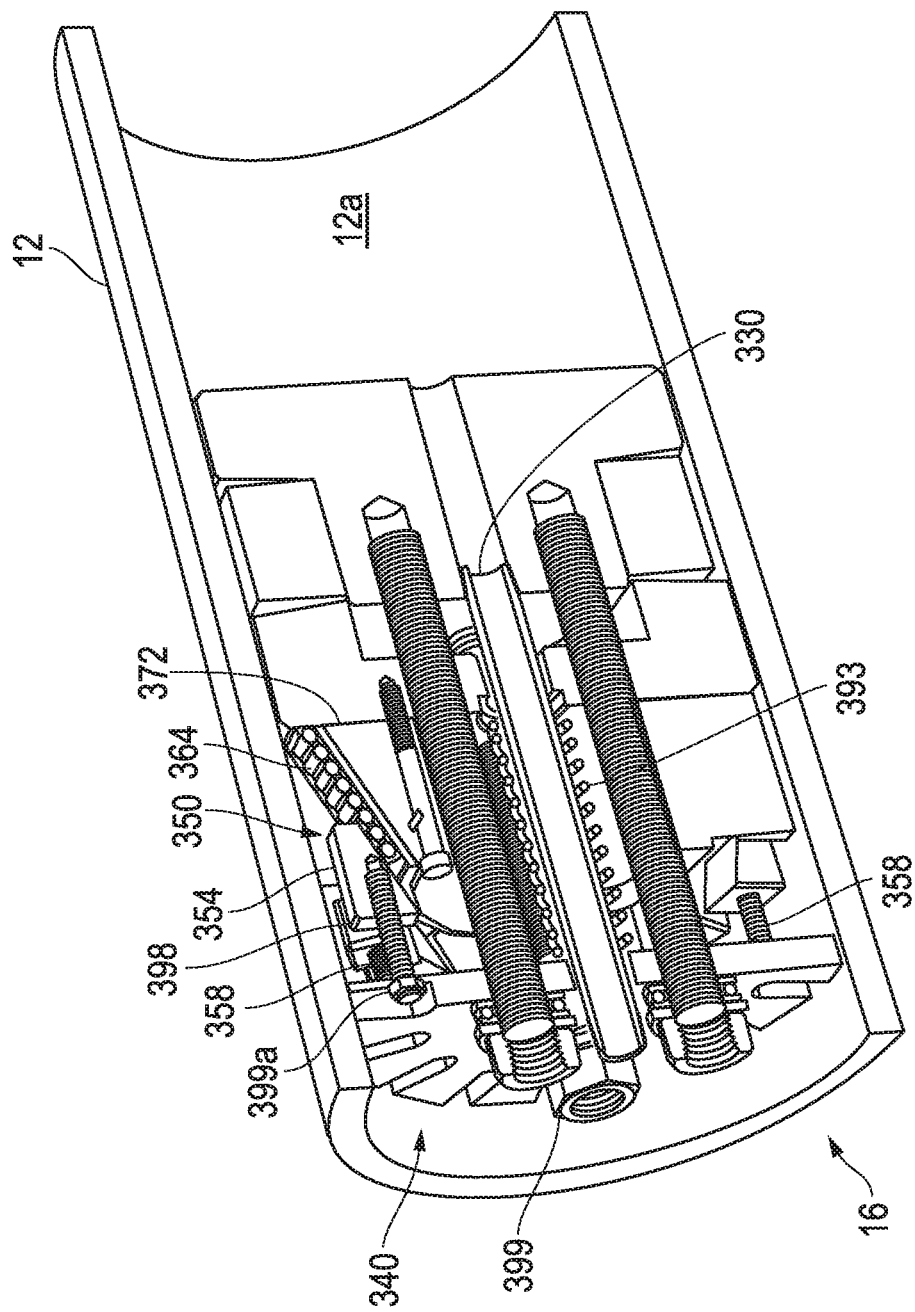
FIG. 44A is similar to FIG. 44 and shows a sectional perspective view of a front gripping apparatus with independently self-actuated jaws having the jaws retracted.
Figure 44B:
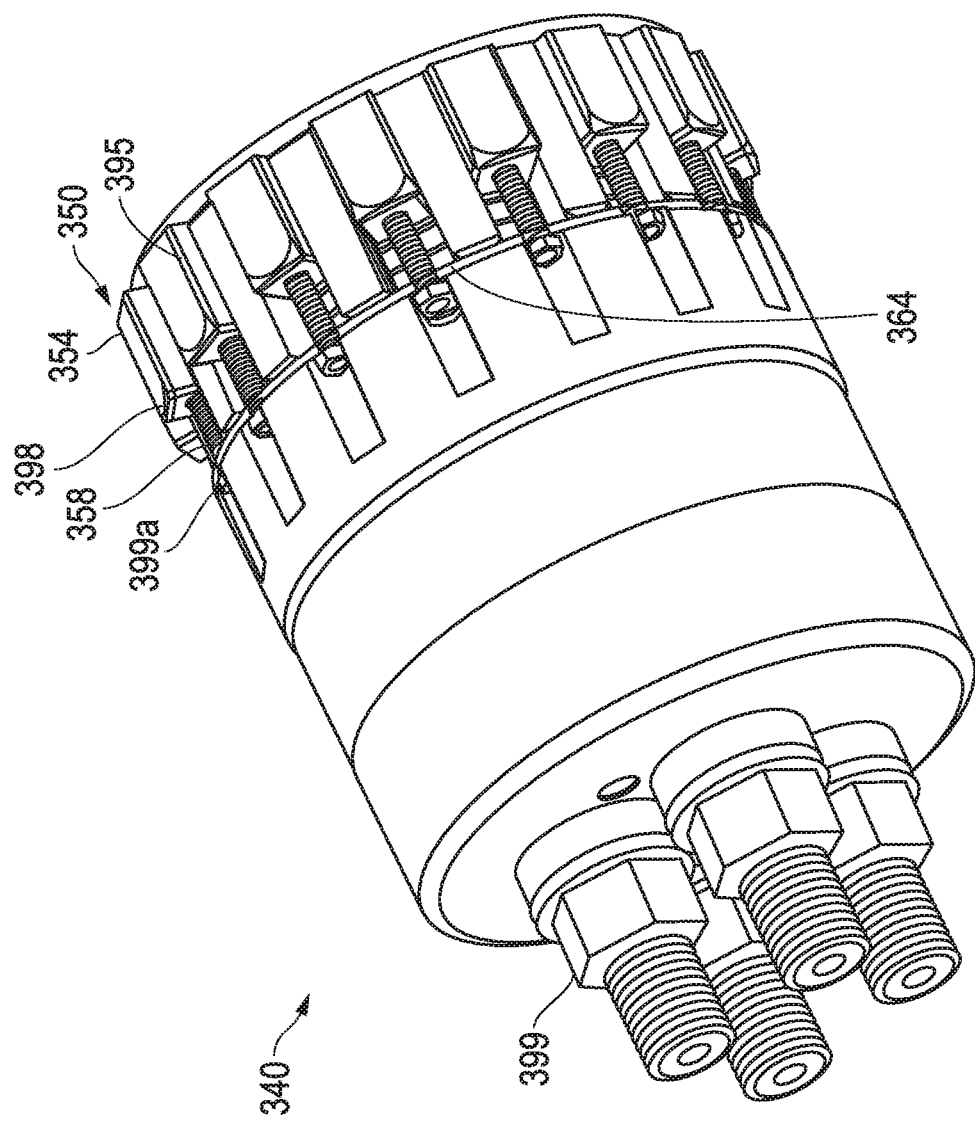
FIG. 44B is similar to FIG. 44 and shows a perspective view of a rear gripping apparatus with independently self-actuated jaws having the jaws actuated.
Figure 44C:
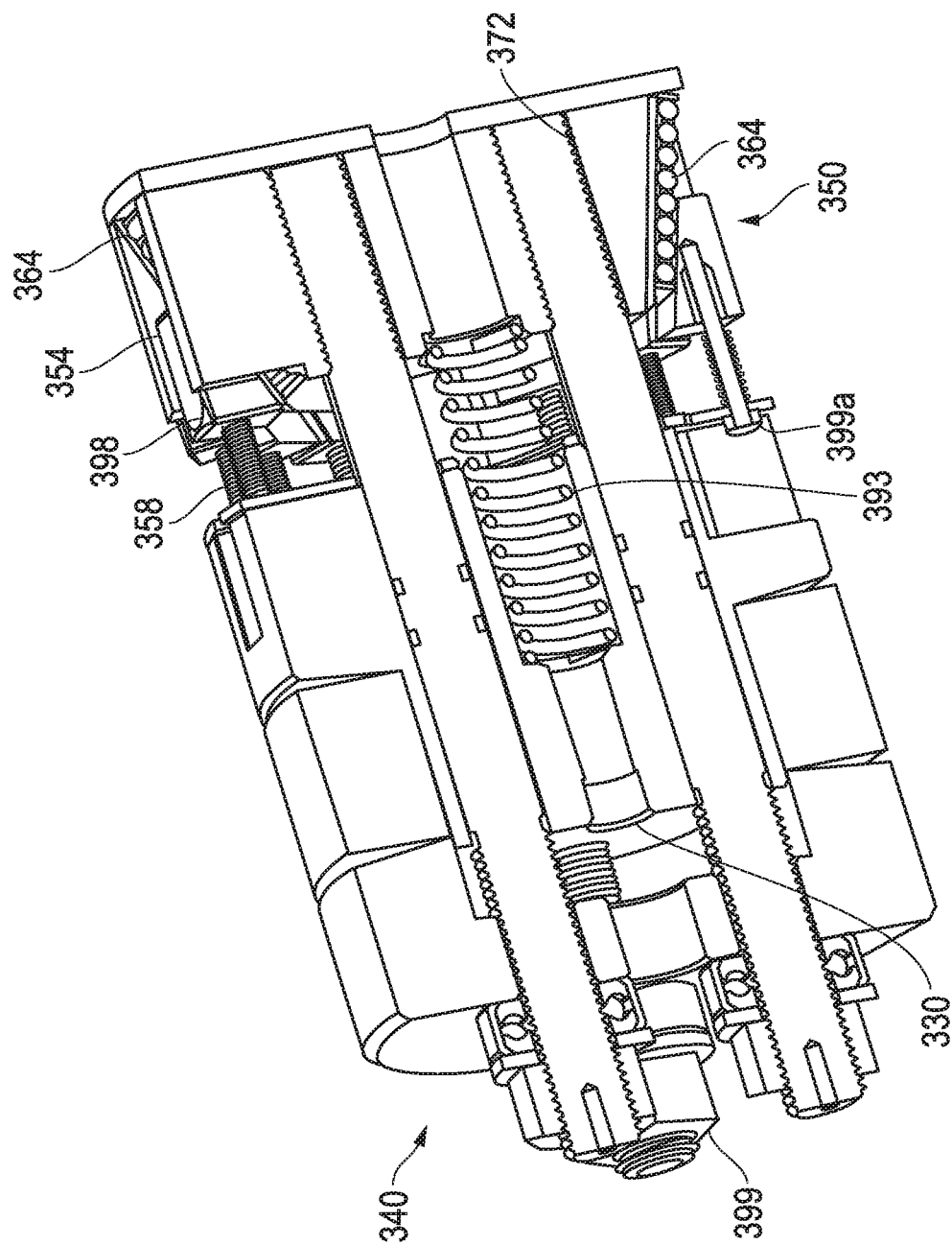
FIG. 44C is similar to FIG. 44A and shows a sectional perspective view of a rear gripping apparatus with independently self-actuated jaws having the jaws retracted.

FIG. 41-44 show exemplary embodiment(s) of an overall gripping apparatus(s) 340 similar to that represented in FIGS. 21-26 except utilizing/incorporating the discrete wedge jaw 350 exemplary embodiment(s). Like FIGS. 21-26, rollers (or other bearings) 364 are utilized. Springs 358 may be supported by pins 359 (similar to FIG. 17 in some manner for actuation and retraction). FIGS. 41 and 42 show embodiment(s) used as a gripping apparatus 340 inside the pressure end of the pipe 12. FIGS. 43, 44, 44A, 44B and 44C, show embodiments of the gripping apparatus 340 on the open end of the pipe 12. As the nuts 399 (four shown as an example) are backed out evenly, the larger center spring 393 pulls the jaws 350 back automatically. In FIG. 44 the jaws 355 are extended. In FIG. 44A the jaws are retracted from the pipe 12. FIG. 44A shows a front gripping apparatus 340 with the center spring 393 and a center vent pipe/tube 330, and the jaws 350 are retracted via the nuts 399. FIG. 44B shows a rear gripping apparatus 340 with the jaws 350 actuated. FIG. 44C shows a rear gripping apparatus 340 with the jaws 350 retracted via the nuts 399.

Figure 49:
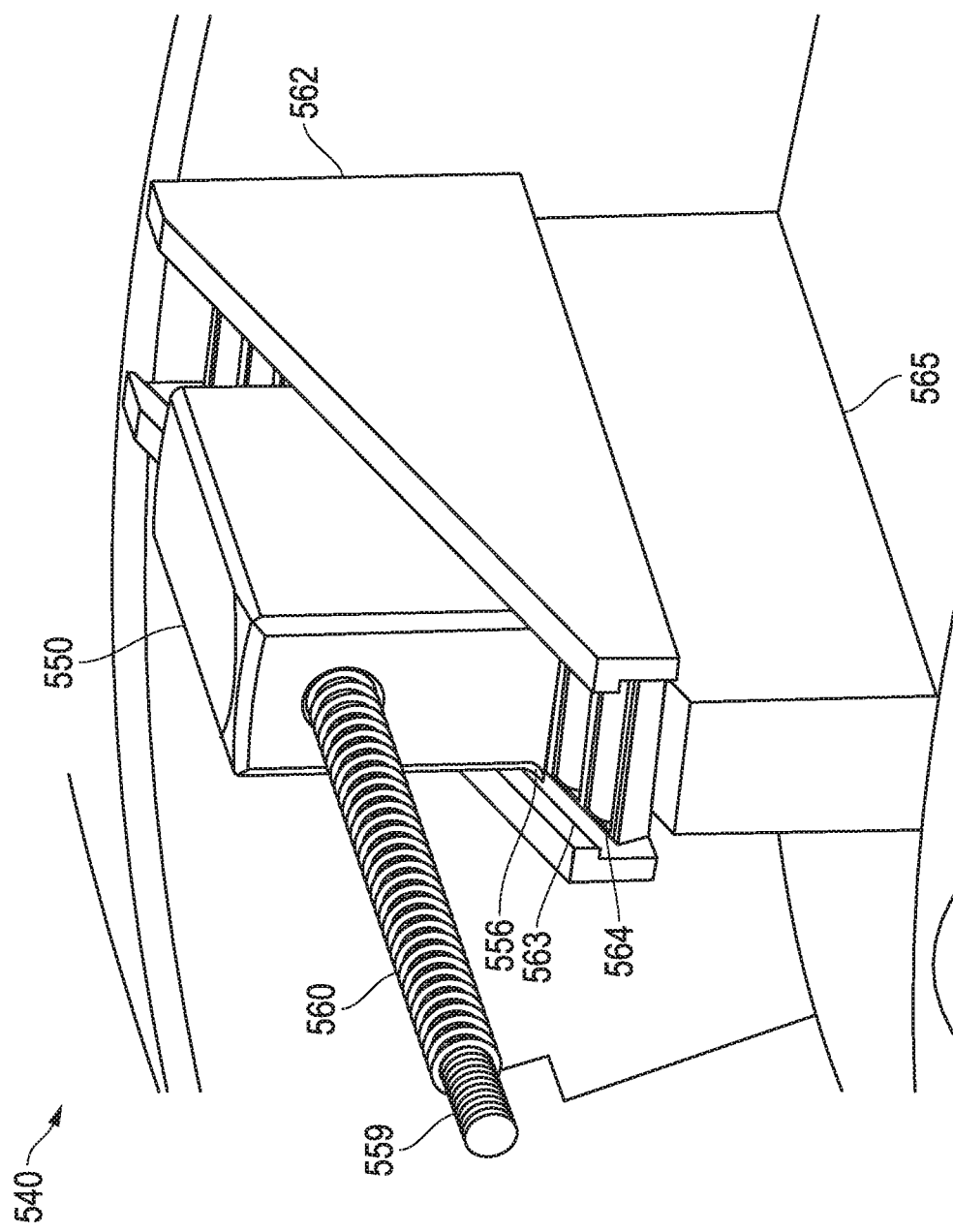
FIG. 49 depicts a schematic perspective view of an alternate exemplary embodiment of a gripping apparatus with a wedge jaw.

FIG. 49 shows an exemplary embodiment of a separate/individual/discretely wedge block/jaw 550 (somewhat similar to FIG. 41, but individual, together with FIG. 46) which may be included as part of an overall gripping apparatus 540. The gripping apparatus 540 includes pins 559, springs 560, rollers or bearings 564 mounted in a ramp assembly 562, and mounted on a base block 565. The ramp assembly 562 has T-slot/guidewalls 563 for retention and guiding of T or round flange 556 of the separate/individual discrete wedge block/jaw 550. The separate/individual/discrete wedge block/jaw 550 or gripping apparatus 540 may be useful for selective gripping to a catch or pocket on a mating surface. By way of example, a T-slot 563 may be used to capture balls, rollers, disks, jaws, etc. as part of a test plug gripping apparatus 40, 140, 240, 340, 440, 540 and as further described herein.

Figure 50:
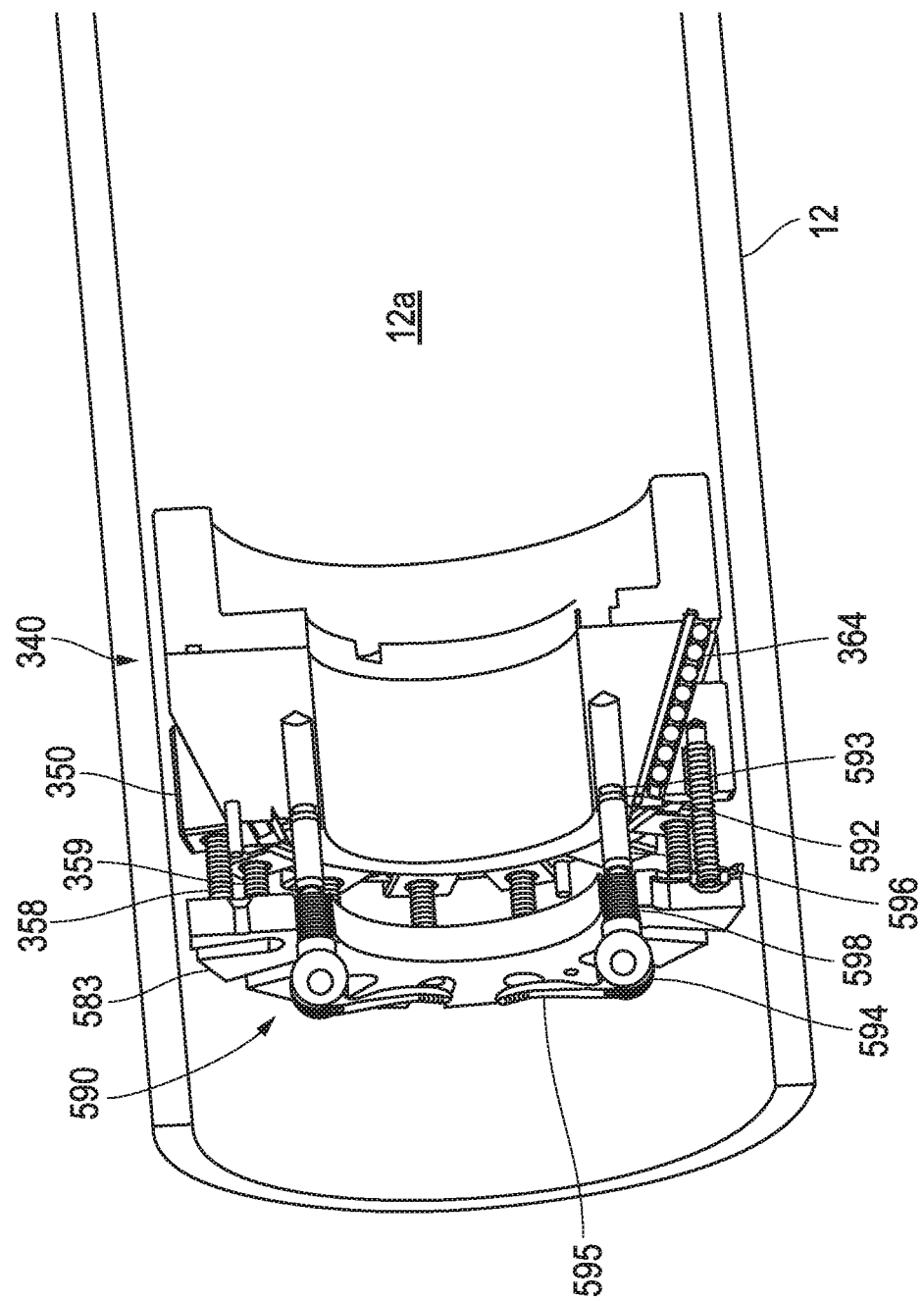
FIG. 50 depicts a schematic perspective view of an alternate exemplary embodiment of a gripping apparatus with independently self-actuated wedge jaw(s) retracted.

FIG. 50 represents an exemplary embodiment of an overall gripping apparatus embodiment 340 similar to that represented in FIGS. 41-44; incorporating the discrete wedge jaw 350 exemplary embodiment(s); rollers (or other bearings) 364 are utilized in the exemplary embodiment shown; springs 358 may be supported by pins 359 (similar to FIG. 17 in some manner for actuation and retraction); except the FIG. 50 exemplary embodiment(s) utilizes a cam activator/deactivator 590. The exemplary embodiment of the cam activator/deactivator 590 shown includes a center pin 592 which may be driven and released by a cam mechanism 594 via handle 595. The center pin 592 includes a conical foot 593. A collar 596 (having a central bore) is mounted on and surrounds the center pin 592. As the flange/unitary plate 583 is pushed in the wedge jaw 350 via springs 358 activate. The cam mechanism 594 is anchored to the flange/unitary plate 583 via a screw 598 (having a central bore through which the center pin 592 may thrust and retract). Screw 598 also opposes motion of collar 596. After the flange/unitary plate 583 is pushed in, the cam mechanism 594 is locked (whilst the jaws 350 actuate automatically) by turning the handle 595, which pulls the center pin 592 linearly toward the cam mechanism 594 so that conical foot 593 wedges into the collar 596 to expand collar 596 and lock the flange 583 in place. Then, to release, the cam mechanism 594 is released via the handle to push the center pin 592, the collar 596 will contract and flange 583 is released along with jaws 350.

Figure 51:
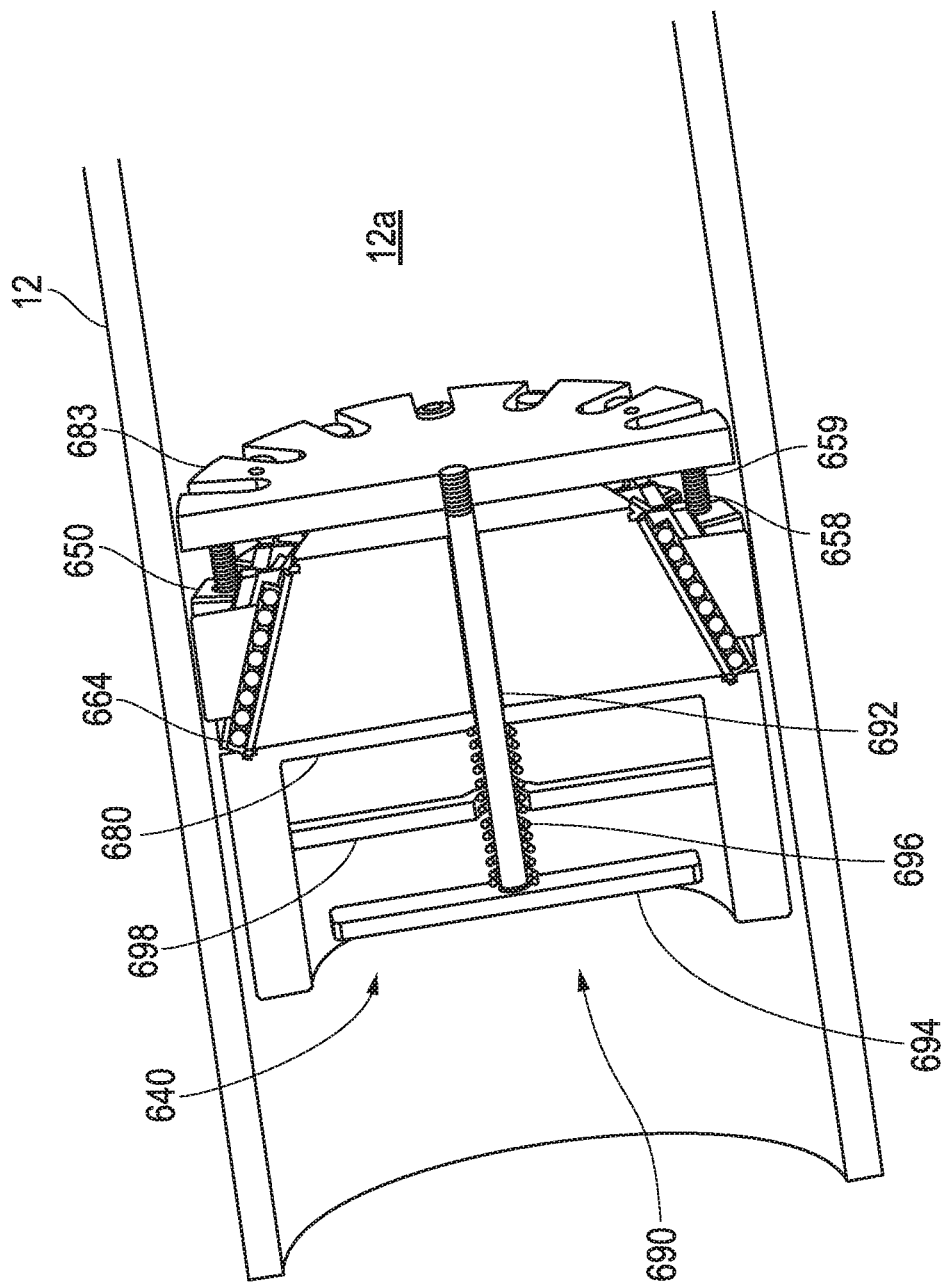
FIG. 51 depicts a schematic perspective view of an alternate exemplary embodiment of a gripping apparatus with independently self-actuated wedge jaw(s) extended to engage.

FIG. 51 represents an exemplary embodiment of a gripping apparatus 640 for insertion into a pipe 12, and for hand operated insertion and retraction. In the exemplary embodiment shown, the gripping apparatus 640 incorporates discrete wedge jaws 650, springs 658 may be supported by pins 659, rollers (dowel pins or other bearings) 664. The wedge jaws 650 may be activated by springs and pins (both not shown in FIG. 51 but similar to FIG. 17 and other embodiments) via plate 683. A hand operated insertion/release mechanism 690 has a center rod 692 attached to the plate 683; a T-handle 694 connected to the center rod 692; an activation spring 696 which may compressed by hand between the T-handle 694 and body 680; and a grip 698 mounted in the body 680. The gripping apparatus 640 may be moved into the pipe 12 and move in one direction (but not the opposite direction) within the pipe 12. To release and pull the gripping apparatus 640 out of the pipe 12, one must squeeze the T-handle 694 and the grip 698 together against the force of spring 696 to move the plate 683 away from the back of the wedge jaws 650.

Figure 52:
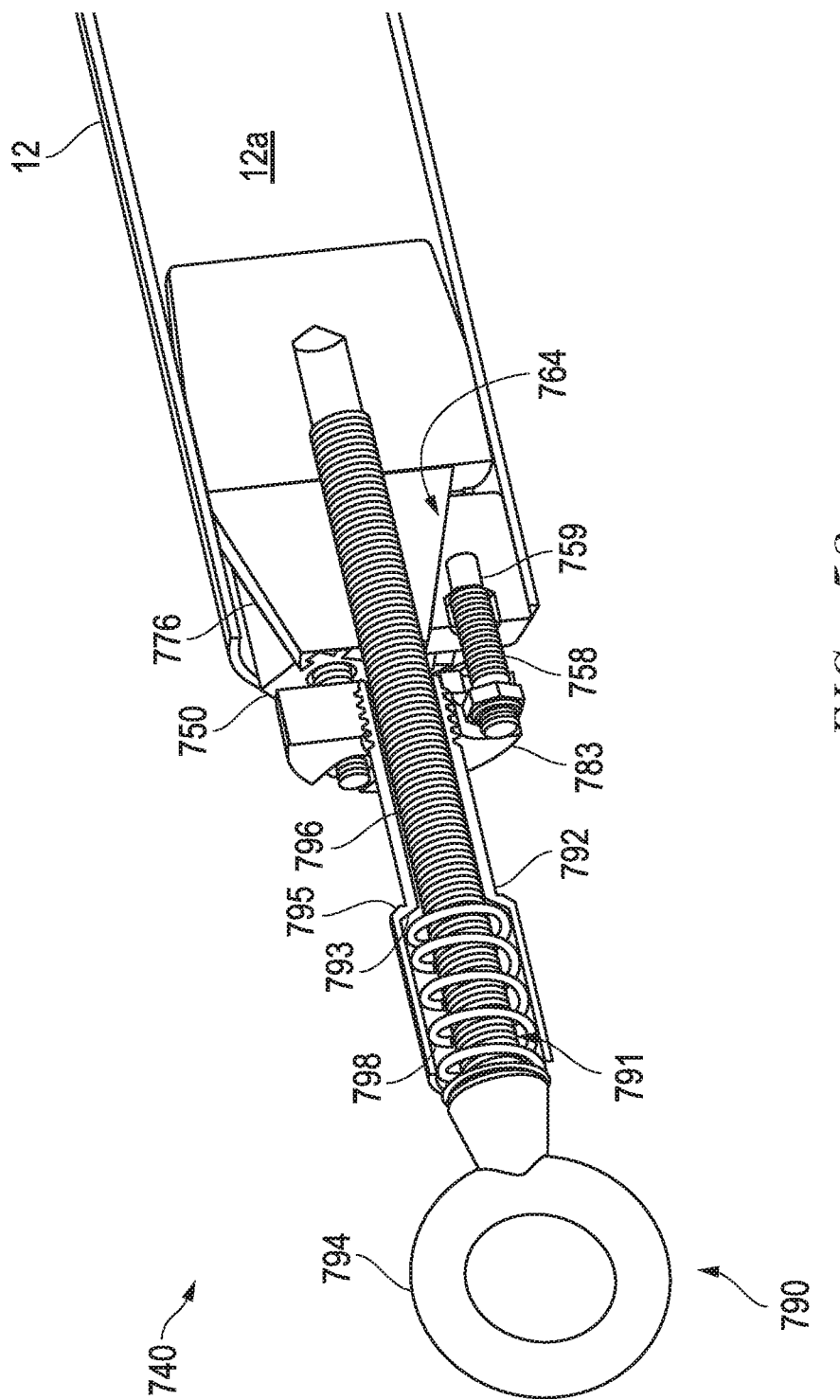
FIG. 52 depicts a schematic perspective view of an alternate exemplary embodiment of a gripping apparatus with independently self-actuated wedge jaw(s) extended to engage/lift the pipe.

FIG. 52 represents an exemplary embodiment of a gripping apparatus 740 for insertion into and, for example, lifting of pipe 12, and for hand operated insertion and retraction. In the exemplary embodiment shown, the gripping apparatus 740 for insertion into and lifting of a pipe 12 incorporates wedge jaws 750, and bearing surface(s)/layer(s) 764. The discrete wedge jaw(s) 750 may be activated by springs 758 and pins 759 via annular plate 783. A hand operated pipe lifting mechanism 790 has a center housing 792 attached to the plate 783; a ring/handle 794 connected to a center rod/bolt 796 wherein the center bolt 796 is fixed to a conical (or semi-conical) mounting body/declined track 776; an activation spring 798 which may be compressed by hand between the ring 794 and a shoulder 793 on in the center housing 792. The center housing 792 defines a central bore 791 on the interior and on the exterior 795 may be used as a handle. Spring 798 pushes the center housing 792 toward the annular plate 783, and springs 758 push the wedge jaws 750 up the mounting body 776 across bearing surface(s)/layer(s) 764 and into engagement with the internal diameter 12*a* of the pipe 12. By grasping and pulling the ring 794 together/towards with the exterior handle 795 of center housing 792 (or holding the exterior handle 795 and pushing the ring 794) one may release the hand operated pipe lifting mechanism 790 from the pipe 12 (via pushing the conical mounting body 776 somewhat into the interior of the pipe 12 and/or relieving spring force from the jaws 750).

Figure 53:
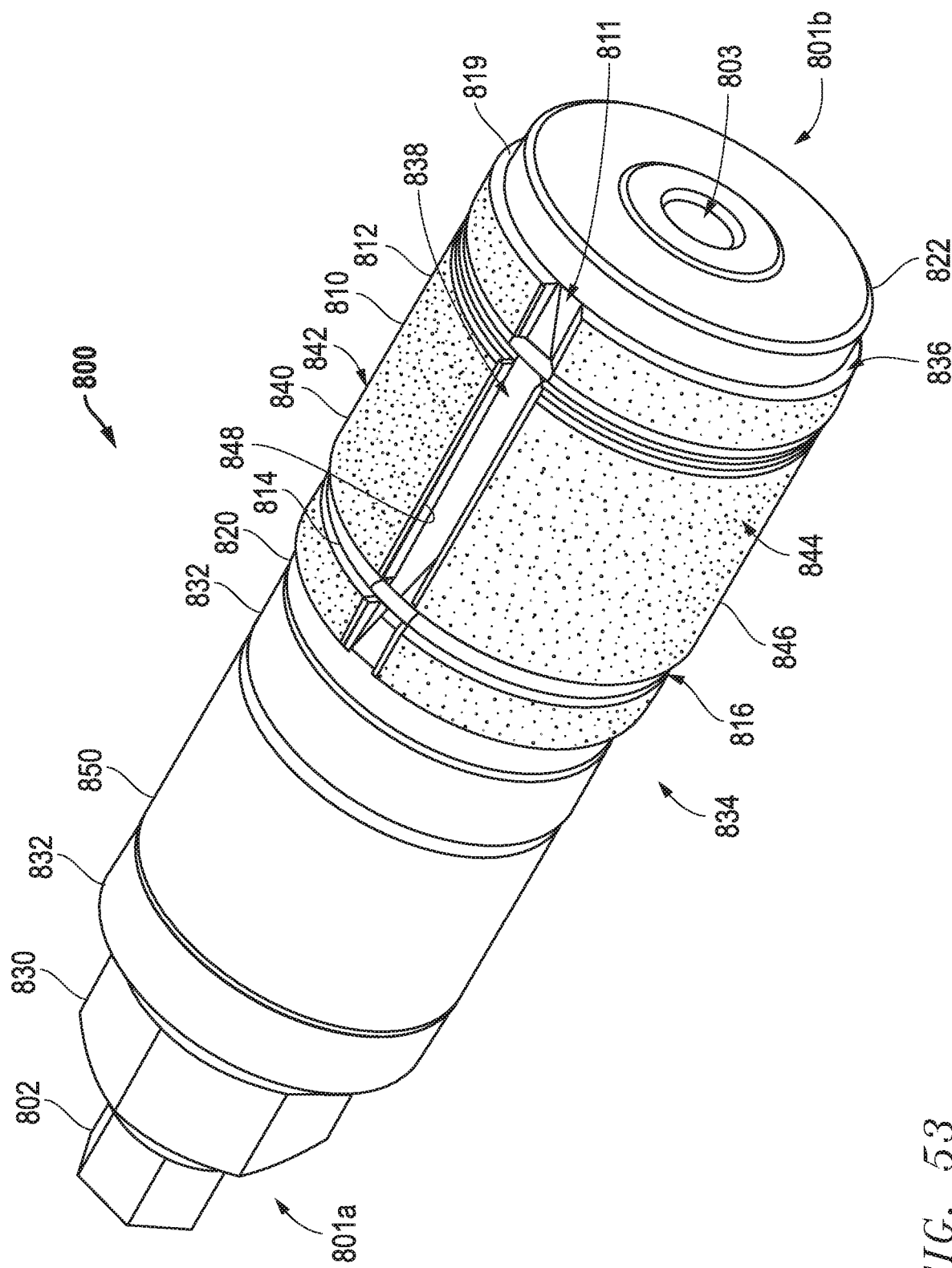
FIG. 53 depicts a perspective view of an exemplary embodiment of a collectively actuated and retracted gripping apparatus having at least one discrete gripping device with a textured outer surface with two wedge cones.
Figure 54:
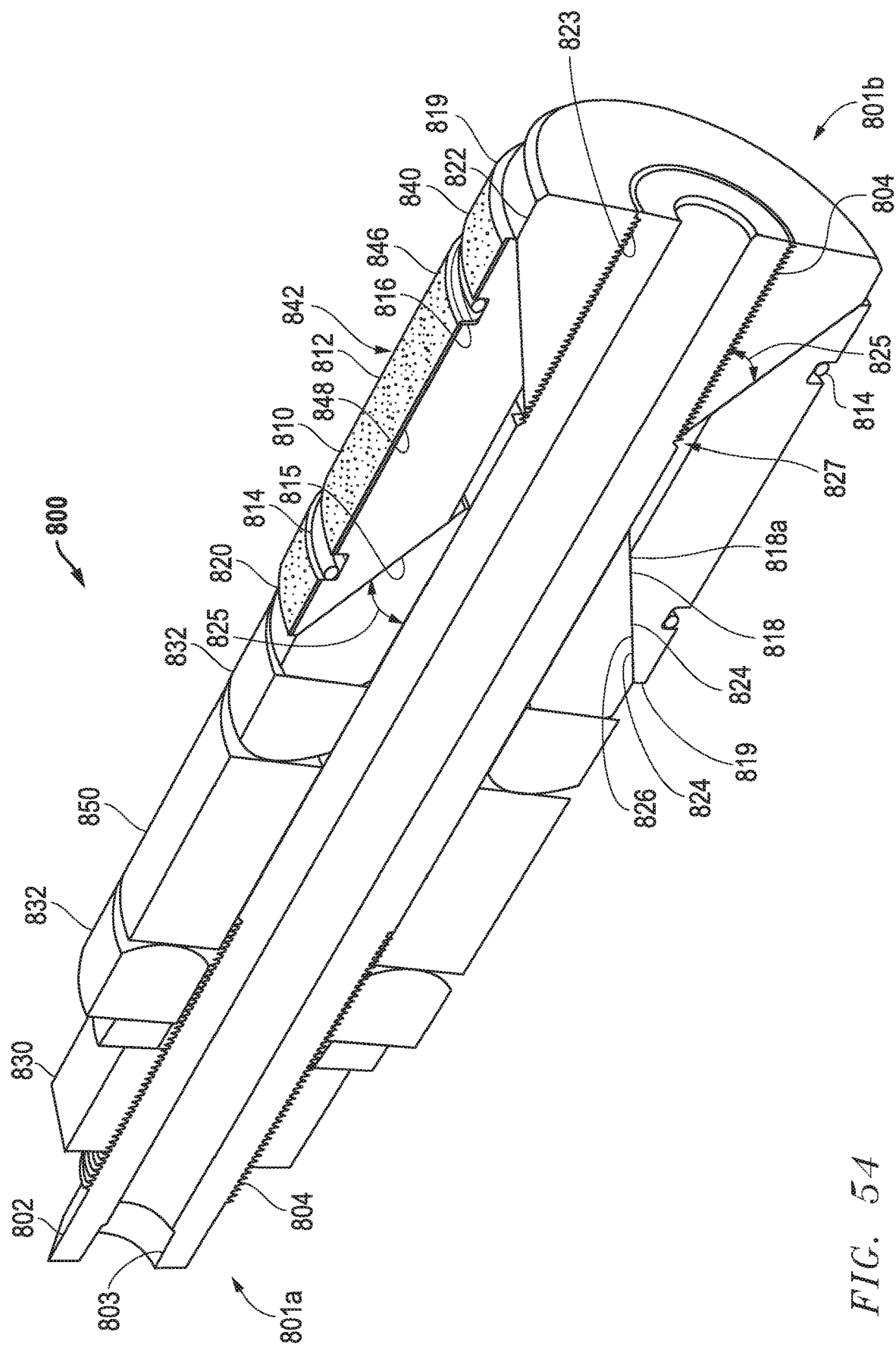
FIG. 54 depicts a schematic sectional perspective view of the embodiment shown in FIG. 53.
Figure 55:
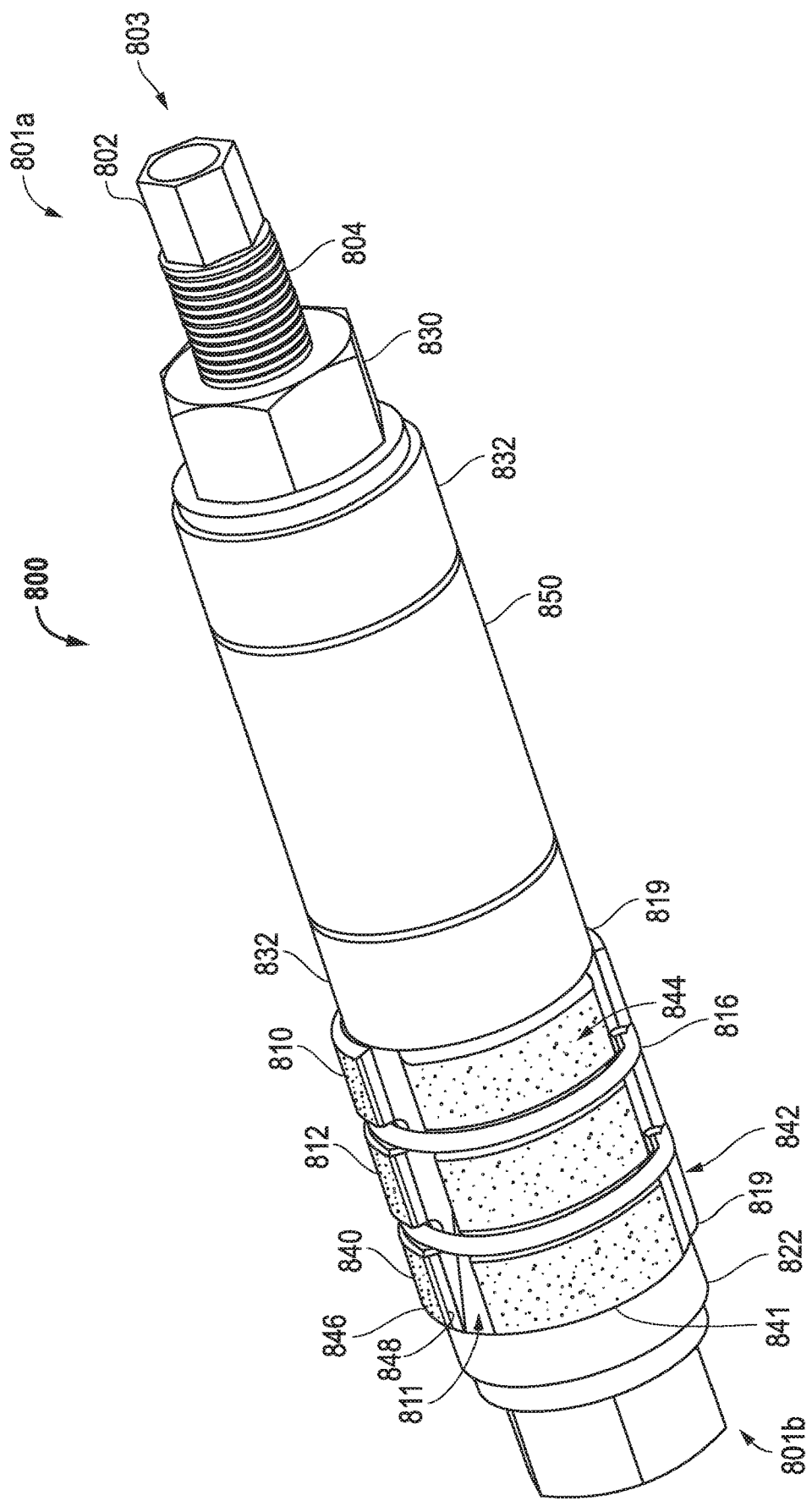
FIG. 55 depicts a perspective view of an alternate exemplary embodiment of a collectively actuated and retracted gripping apparatus having at least one discrete gripping device with a textured outer surface with two wedge cones.
Figure 56:
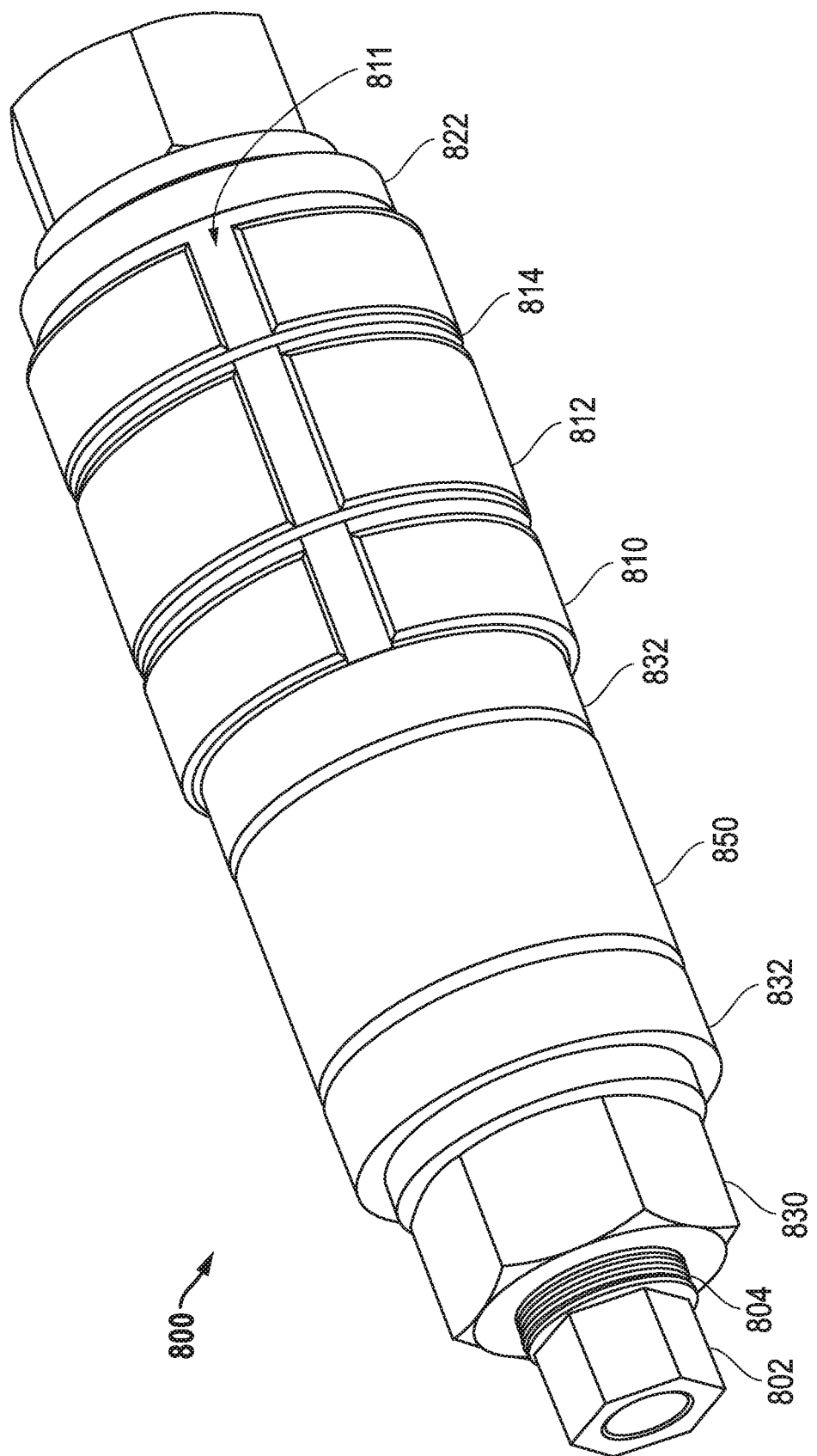
FIG. 56 depicts a perspective view of an alternative exemplary embodiment of a collectively actuated and retracted gripping apparatus having at least one discrete gripping device with a textured outer surface having a single wedge cone.
Figure 57:
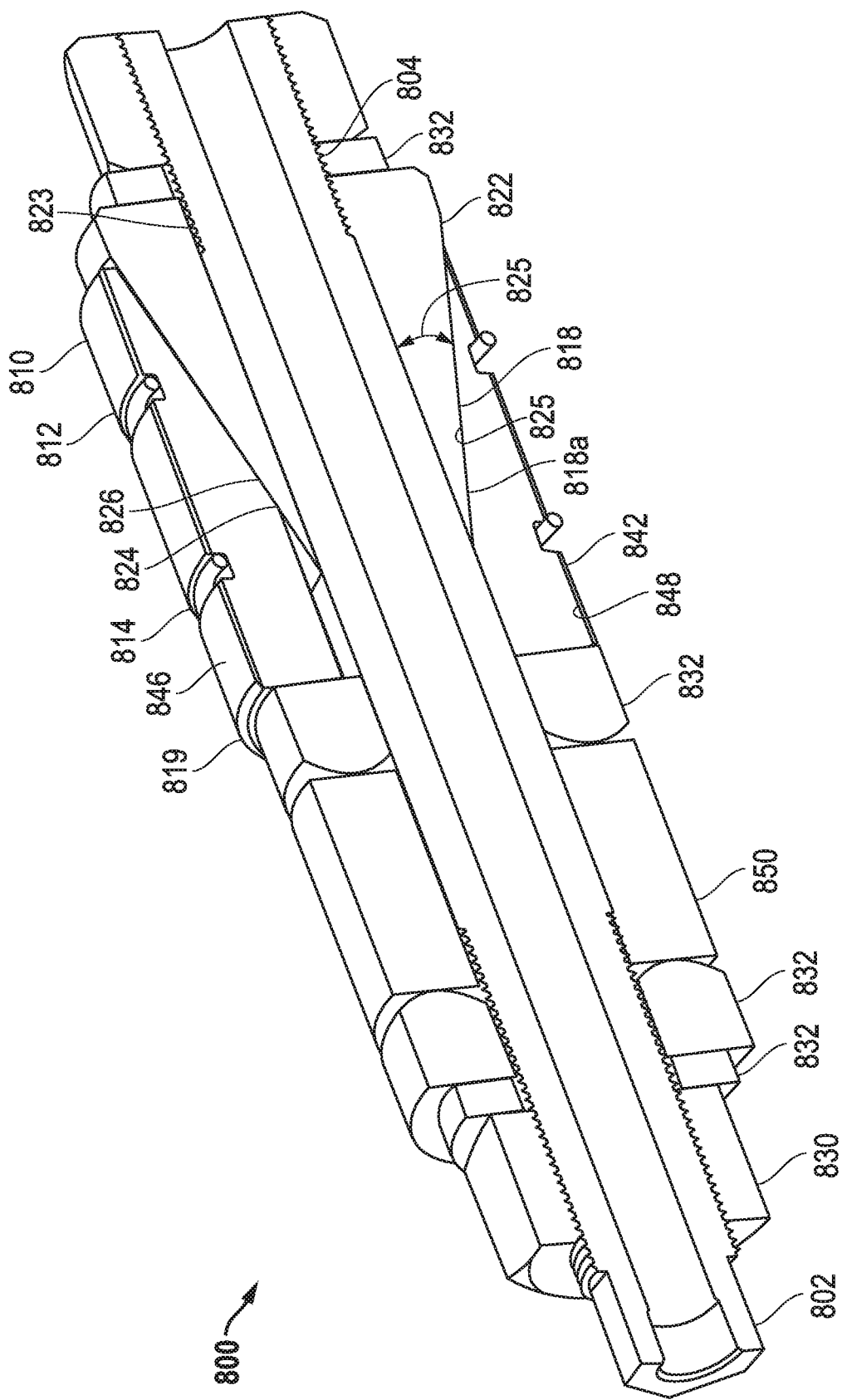
FIG. 57 depicts a schematic sectional perspective view of the embodiment shown in FIG. 56.
Figure 58:
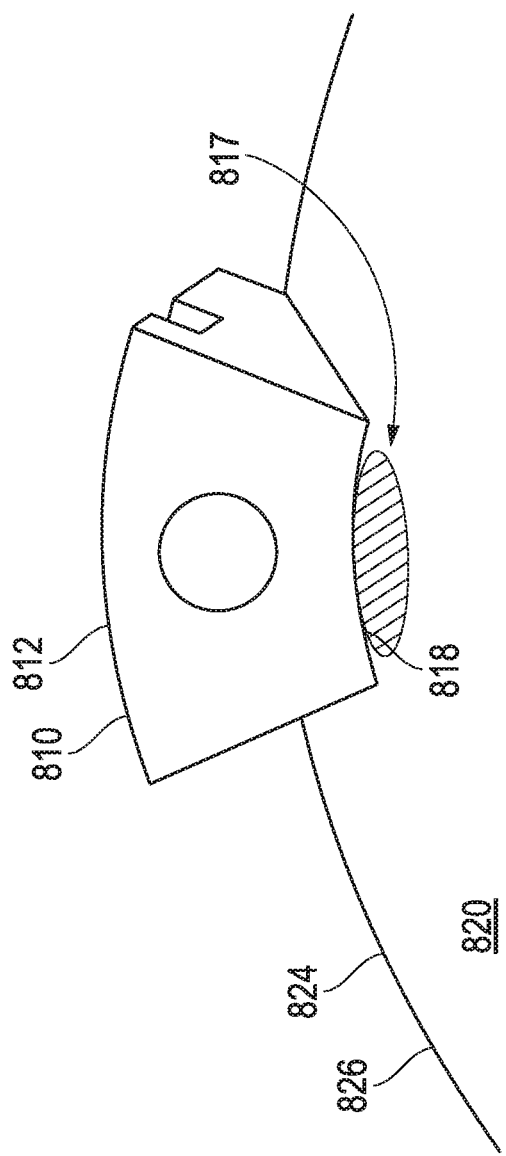
FIG. 58 depicts an enlarged partial perspective view of an exemplary embodiment of a discrete gripping device on a conical wedge of a collectively actuated and retracted gripping apparatus.

FIGS. 53-55 represents an exemplary embodiment of a gripping apparatus or plug 800 for insertion into a pipe 12, and for hand operated insertion, actuation and retraction of a dual-cone gripping apparatus or plug 800. FIGS. 56-57 represents an alternative exemplary embodiment of a gripping apparatus or plug 800 for insertion into a pipe 12, and for hand operated insertion, actuation and retraction of a single-cone gripping apparatus or plug 800. The pipe 12 and pipe interior 12a are not illustrated in FIGS. 53-57, but are shown in other figures, e.g. FIGS. 1-3; the embodiments of the pipe 12 are similar to the pipe for gripping apparatus 800.

Concurrent and/or collective actuation as described in the gripping apparatuses 800 of FIGS. 53-57 is advantageous over conventional jaw style gripping apparatuses which only result in only a few areas of unequal contact pressure. Concurrent and/or collective actuation is the simultaneous activation or actuation of each and every gripping device 810 and/or wedge jaw 812 against the interior 12a of the pipe 12. Collective retraction is the simultaneous retraction or disengagement of each and every gripping device 810 and/or wedge jaw 812 from the pipe interior 12a.

By way of example, the gripping apparatus 800 may be used in gripping plugs, pipe connectors, or other lifting or grabbing devices. The gripping apparatus 800 may include discrete gripping devices 810 as actuated by a first or movable wedge cone, cone wedge, tapered wedge, or wedge block 820 (see e.g. FIGS. 53-55), or as actuated by another force-transferring element, such as a plate or annular piece 832 (see e.g. FIGS. 56-57), such that an outer gripping surface 840 of the discrete gripping devices 810 grips against a pipe 12. The gripping apparatus 800 may also include an inner rod or tube 802 having threading 804 on the tube 802 towards a front end 801a and a rear end 801b of the tube 802. The tube 802 may also define a throughbore 803.

A second or fixed wedge cone, cone wedge, tapered wedge, or wedge block 822 includes threading 823 on the interior of the wedge cone 822, and the second wedge cone 822 is threaded via threading 823 onto the threading 804 of the tube 802 and mounted around the tube 802. The second wedge cone 822 may be fixed into position on tube 802 via the threading 823 and threading 804. The first or moveable wedge cone 820 may also be positioned around tube 802, adjacent to the second fixed wedge cone 822 in FIGS. 53-55. Both the first wedge cone 820 and second wedge cone 822 may be substantially conical or frustoconical in shape. Generally, the wedge cones or cone wedges 820, 822 may be positioned on the tube 802 such that the points 827 of the wedge cones 820, 822 may be directed at each other. Both wedge cones 820, 822 also have a ramp or outer surface 826. The steepness of the ramp 826 is defined by an incline 825 which may be adjusted as desired and may be defined relative to the inner diameter of the pipe 12. Furthermore, the ramp 826 of wedge cones or cone wedges 820, 822 may also define the wear surface 824 of wedge cones 820, 822. The wear surface 824 is adjacent to the inner surface 818 of the gripping devices 810, and the wear surface 824 may include antifriction coating or antifriction devices 815 to reduce deterioration of the wear surface 824 and/or the inner surface 818 of the gripping devices 810. Although the exemplary embodiments of FIGS. 53-55 are depicted with both a moveable wedge cone 820 and a fixed wedge cone 822, in alternative exemplary embodiments as depicted in FIGS. 56-57, only a single fixed wedge cone 822 may be used that is set onto the rod 802 via threading 823, 804 or affixed into place via alternative known affixing means. The alternative exemplary embodiments as shown in FIGS. 56-57 may be used on smaller (relatively) gripping apparatuses 800.

The gripping apparatus 800 may include one or more discrete gripping devices 810. The discrete gripping devices 810 may be positioned such that there is a gap 811 between each discrete gripping device 810. Where there is only a singular collectively or cooperatively discrete gripping device 810, there may nonetheless be a gap 811 defined within the discrete gripping device 810 (see, e.g. FIG. 53). This gap 811 may be increased when the gripping apparatus 800 is activated or engaged when the discrete gripping devices 810 slide against ramp(s) 826 of the wedge cone(s) 820, 822 to grip against pipe inner diameter 12a.

Furthermore, the plurality of discrete gripping devices 810 may each include an inner surface 818 configured to set or rest against the outer surface or ramp 826 of the cone wedges 820, 822. One or both of the inner surface 818 or the outer surfaces 826 may have an antifriction coating or device 815. By way of example only, antifriction devices 815 may include tracks with rollers or bearings, (see e.g. FIG. 21 and corresponding description) or alternatively, include a low friction coating such as TEFLON brand or a TURCITE brand laminate or coating. The inner surface 818 of the plurality of discrete gripping devices 810 may form or be in the shape of a hollow conical pocket 818a which matingly matches with the ramp or outer surfaces 826 of the wedge cones 820, 822 (see, e.g. FIGS. 54 and 57).

Figure 59:
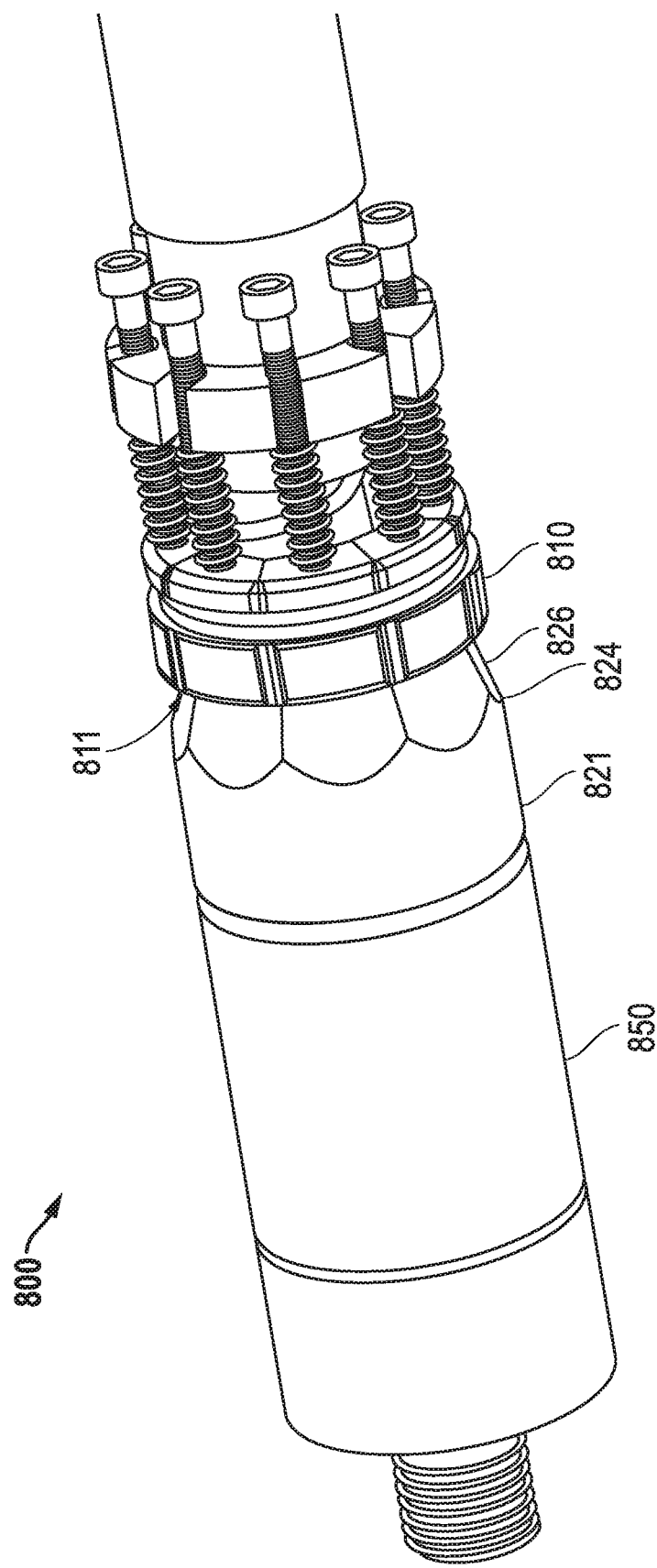
FIG. 59 depicts a perspective view of an exemplary embodiment of a collectively actuated and retracted gripping apparatus having at least one discrete gripping device with a textured outer surface with a facetted wedge cone.
Figure 60:
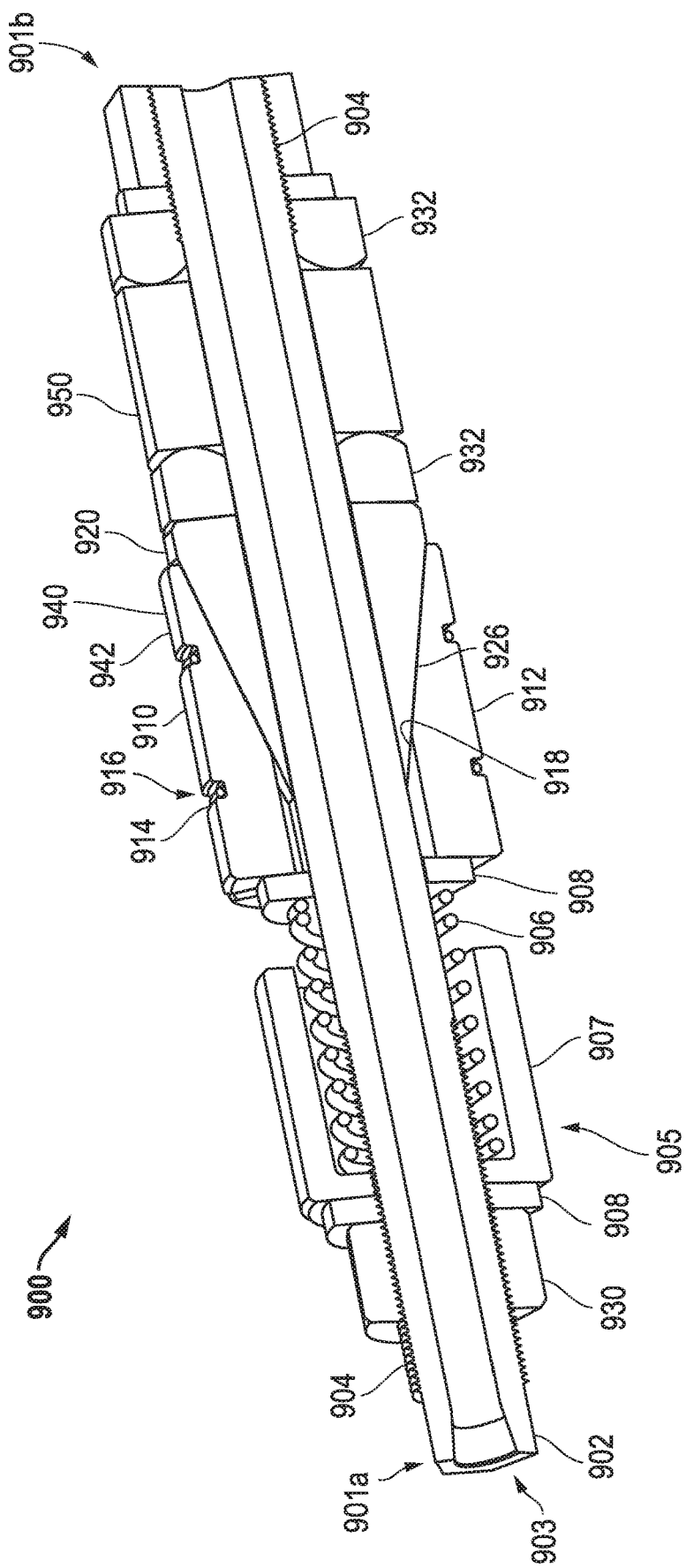
FIG. 60 depicts a schematic sectional perspective view of an exemplary embodiment of a collectively actuated-retracted and instantly gripping apparatus.

Referring to FIG. 53-58, if conical wedge cones 820, 822 are used, the taper of the interior surface 818 and conical pocket 818a of the gripping device 810 or wedge jaw 812 can be designed, made or machined to match the wear surface 824 or ramp or outer surface 826 of the conical wedge cones 820, 822 at or near the point where the gripping devices 810 contact the pipe 12, so that there is little or no gap or space 817 (see FIG. 58) between the interior surface 818 and the wear surface 824 or outer surface 826 of the conical wedge cones 820, 822 (gap or space 817 may be defined by differences between diameter of curvature at such surfaces). If one or more facetted wedge cones 821 are used (as illustrated, by way of example, in FIG. 59), then the wedge gripping apparatus 800 may use a flat face or ramp 826 at the same angle 825 to leave no gap/space 817 between the interior surface 818 of the gripping devices 810 and the wear surface 824 or outer surface/ramp 826 of one or more facetted wedge cones 821, but again as the gripping devices 810 move up the facetted cones 821 the gap 811 between the gripping devices 810 will also increase. The matching or mating of surfaces 818 of the discrete gripping device 810 and surface(s) 824 or 826 of the cone(s) 820, 822, or 821 will spread the load when the outer surface 840 of the wedges 812 or gripping devices 810 clamps the internal diameter 12a of the nominal sized pipe 12. Variations of the pipe internal diameter 12a may cause this small gap or space 817, but as long as the gap or space 817 is within the elastic limits of the material of the wedge 812 or discrete gripping devices 810, such gap or space 817 will not cause any failures of the gripping apparatus 800.

By way of example only, the gripping apparatus 800 may have an odd number of discrete gripping devices 810 as an odd number of the discrete gripping devices 810 may load more evenly against the interior of the pipe 12 if the interior of the pipe 12 is out of round. However, gripping apparatuses 800 with two or other even numbers of discrete gripping devices 810 are considered within the present disclosure. In certain exemplary embodiments, the discrete gripping devices 810 may be in the form of wedge jaws 812.

By way of example only, as depicted in FIG. 55, the wedge jaws 812 may be a triple jaw design for use in a 1½ inch (or 3.81 cm) nominal pipe 12 size.

The discrete gripping devices 810 may define slots or grooves 816 circumferentially around, about or across the outer surface 840 of the plurality of discrete gripping devices 810. The slots 816 and the top 834 of the gripping devices 810, bottom 836 of the gripping devices 810, and the sides 838 of the gripping devices 810 may define or segment the outer surface 840 into the form of substantially rectangular pipe contact patches 844 (rectangular in top plan view). Circumferential biasing bands (such as, for example spring bands or band retraction springs, O-rings, or the like) 814 as inserted into the slots or grooves 816 may retain or bias the plurality of discrete gripping devices 810 in the gripping apparatus 800. Said circumferential biasing bands 814 may also be used for collective, mutual and/or concurrent retraction or disengagement of the discrete gripping devices 810 from gripping the pipe interior surface 12a. Each and every collectively or mutually biasing bands 814 may simultaneously collectively extend towards the pipe inside 12a, and subsequently, then simultaneously collectively retract each and every gripping device 810 and/or wedge jaw 812. As depicted in the exemplary embodiments of FIGS. 53-55, there are two circumferential biasing bands 814 per gripping apparatus 800, however, more or less biasing bands 814 may be used as desired. The biasing bands 814 may collectively extend towards the pipe interior surface 12a as the biasing force of the biasing bands 814 is overcome, and may collectively retract or bias back towards the rod or tube 802 at other times, or when the biasing force of the biasing bands 814 is not overcome. The biasing bands 814 may be one exemplary embodiment of a collective extension-retractable mechanism, but other kinds or types of collective extension-retractable mechanisms are possible.

The outer surface 840 of the wedge jaws 812 or discrete gripping devices 810 may optionally have one or more transition surface(s) 819. The transition surface(s) 819 is at least a thinning of the outer surface 840 and may, for example be, swept chamfer, swept arc or radius, relieved arc, compound leading edge curve(s), gradient(s), radius, beveled edge, or other non-liner edge tangent or near-tangent lines/planes/arcs at the top 834, bottom 836, and/or edges, walls, sides or sidewalls 838 of the outer surface 840. Additionally, the outer surface 840 may also define a curvature or circumference 841 which is different from the pipe interior 12a which is being gripped by the gripping apparatus 800. The transition surfaces 819 and different surface curvature 841 of the gripping devices 810 may help to avoid sharp shear loads or sharp transition points on the pipe interior surface 12a. Further discussion of similar transition surfaces 398 may be found in the description relating to FIGS. 37-40 and FIGS. 45-46.

The outer surface 840 and the patches 844 of outer surface 840 may also include a coating, surface coating or texturing 842 on said outer surface 840. The coating, surface coating or texturing 842 may include a binding layer 848 which attaches, adheres, connects, mounts, or binds the grit 846 to the outer surface 840. The surface coating or texturing 842 may be, by way of example only, and not limited to, tungsten carbide, silicon carbide, diamond with binder, quartz with binder, fractured carbide, and/or any other coating having carbide grit. In certain exemplary embodiments, the outer surface 840 and/or the coating 842 may be harder than the surface (for example, the interior surface 12a of the pipe 12) that is gripped by the outer surface 840 of the discrete gripping devices 810 or wedge jaws 812. The surface coating or texturing 842 also includes carbide grits or other types of grits 846 which are situated to expose a significant portion of the grit 846 above the binding layer 848 and/or the outer surface 840 allowing the discrete gripping devices 810 or wedge jaws 812 to clamp or grip through pipe 12 deposits such as rust, calcium, oil, grease, mill scale and others. Furthermore, the exposed grit 846 may have a thickness greater than the thickness of the deposit on the pipe interior 12a. By way of example only, the physical size of the carbide grit or other hard grit 846 may be larger than a #120 grit size, or larger than a sieve designation of 125 µm.

Furthermore, the binding layer 848 may be composed of a nickel based alloy, but may alternatively be composed of or include cobalt, silver solder, or any number of brazing alloys or brazing compounds. Stronger materials and higher melting temperatures of materials are preferred when manufacturing binding layer 848 of the surface coating 842. The material of the binding layer 848 may be strong enough to handle the shear force that each discrete gripping device 810 and/or wedge jaw 812 transfers back to the pipe wall 12a. During manufacturing, the binding layer 848 is applied as a paste with flux to the outer surface 840 and the grit 846 is generally evenly distributed or sprinkled to completely cover the brazing compound of the binding layer 848 in a single layer. The binding layer 848 is then quickly heated, thus melting the brazing compound into metal that flows up around and to surround the grit 846 through natural wicking. The binding layer 848 (and brazing compound/alloy) then cools and quickly solidifies to capture the grit 846. The finished wedge jaw 812 is composed of metal having a top layer of brazing (binding layer 848) that then surrounds the sides and bottom of each grit 846. The grit 846 may be mostly exposed above the binding layer 848 like sprinkles on a donut.

One or more seals 850 and clamping plates (or plates) 832 may be mounted onto the tube 802 adjacent to the discrete gripping devices 810 and wedge cone 820. A nut 830 may be mounted or threaded on an end of the gripping apparatus 800 adjacent to the seals 850, plates 832 and/or wedge cones 820, 822. The nut 830 may collectively transfer and remove force from the seals 850, plates 832 and/or wedge cones 820, 822 to collectively actuate and retract the gripping apparatus 800, respectively. The nut 830 may be one exemplary embodiment of a collective actuation-retraction mechanism, but other kinds or types of collective actuation-retraction mechanisms are possible and considered within the present disclosure, including, but not limited to, levers, cams, springs, chains, headed pins, pivoting links, cage, cables, tethers, pneumatic, and/or hydraulic mechanisms.

In the depicted exemplary embodiments of FIGS. 53-55 of dual cone collective activation/actuation and retraction, nut 830 is threaded onto the front end 801a of the tube 802. Any force applied to the collectively or coactively nut 830 is transferred to the plates 832 and seals 850 and to the movable wedge cone 820. When sufficient force is transferred from the nut 830 to the movable wedge cone 820 to overcome the retaining biasing force of the biasing bands 814, the movable wedge cone 820 moves towards the fixed wedge cone 822 to collectively and/or concurrently actuate, activate, and/or motivate every gripping device 810 or wedge jaw 812 into sliding against the incline 825 of the wedge cones 820, 822 to engage, grip, lock onto or secure the pipe inner surface 12a via the outer surface 840. The biasing bands 814 are also collectively extended or expanded towards the direction of the pipe interior 12a when the biasing force of the biasing bands 814 are overcome during the collective actuation of the gripping devices 810.

To collectively retract or disengage the gripping devices 810 or jaws 812 from the actuated position of the gripping apparatus 800 in FIGS. 53-55, the nut 830 is rotated in an opposite direction thus relieving the force applied upon the wedge cone 820, plates 832 and seal 850. The biasing or retaining force of the biasing bands 814 then bias or retract towards the tube 802, thus collectively and/or concurrently disengaging or retracting the gripping devices 810 or jaws 812 to slide down the tapers or inclines 825 of the wedge cones 820,822. The gripping devices 810 or wedge jaws 812 collectively and/or concurrently move in the reverse or opposite direction away or disengaging from the pipe inner surface 12a towards the tube 802, and the gripping force between the gripping apparatus 800 and the pipe 12 is released. Alternative means of retracting or disengaging the gripping devices 810 or jaws 812 from the pipe 12 as known to one of ordinary skill in the art is considered within the present disclosure.

In the depicted exemplary embodiments of FIGS. 56-57 for single cone collective activation/actuation and retraction, nut 830 is threaded onto an end of the tube 802. Any force applied to the nut 830 is transferred to the plates 832 and seals 850 and to the plurality of gripping devices 810 or wedge jaws 812. When sufficient force is transferred from the nut 830 to the plurality of gripping devices 810 or wedge jaws 812 to overcome the retaining biasing force of the biasing bands 814, the plurality of gripping devices 810 or wedge jaws 812 collectively and/or concurrently actuate, activate, and/or motivate under the force and move towards the fixed wedge cone 822 and the biasing bands 814 extend towards the pipe inner surface 12a. The interior surfaces 818 of the plurality of gripping devices 810 or wedge jaws 812 collectively and/or concurrently slide outward against the incline 825 of the fixed wedge cone 822 to expand outwards and all gripping devices 810 collectively engage, grip, lock onto or secure the pipe inner surface 12a, via the outer surface 840. In FIGS. 56-57, to retract or disengage the gripping devices 810 or jaws 812 from the actuated position, the nut 830 is rotated in an opposite direction thus relieving the force applied upon the plurality of gripping devices 810 or jaws 812. The biasing or retaining force of the biasing bands 814 then bias or retract towards the tube 802, thus collectively and/or concurrently disengaging or retracting the gripping devices 810 or jaws 812 down the taper or incline 825 of the wedge cone 822. The gripping devices 810 or wedge jaws 812 collectively and/or concurrently move in the reverse or opposite direction away or disengaging from the pipe inner surface 12a towards the tube 802, and the gripping force between the gripping apparatus 800 and the pipe 12 is released.

FIGS. 60-66 represents an exemplary embodiment of a collectively actuated-retracted and instantly gripping apparatus or plug 900 for insertion into a pipe 12, and for hand operated insertion, actuation and retraction of a gripping apparatus or plug 900. The collectively actuated-retracted and instantly gripping apparatus 900 may include discrete gripping devices 910 or wedge jaws 912, as actuated by any collectively actuated force transferring element, such as a washer 908, spring 906, cup 907, plate 932, or nut 930, such that an outer gripping surface 940 of the discrete gripping devices 910 grips against the pipe 12. The gripping apparatus 900 may also include an inner rod or tube 902 having threading 904 on the tube 902 towards a front end 901a and a rear end 901b of the tube 902. The tube may optionally define a throughbore 903.

Figure 62:
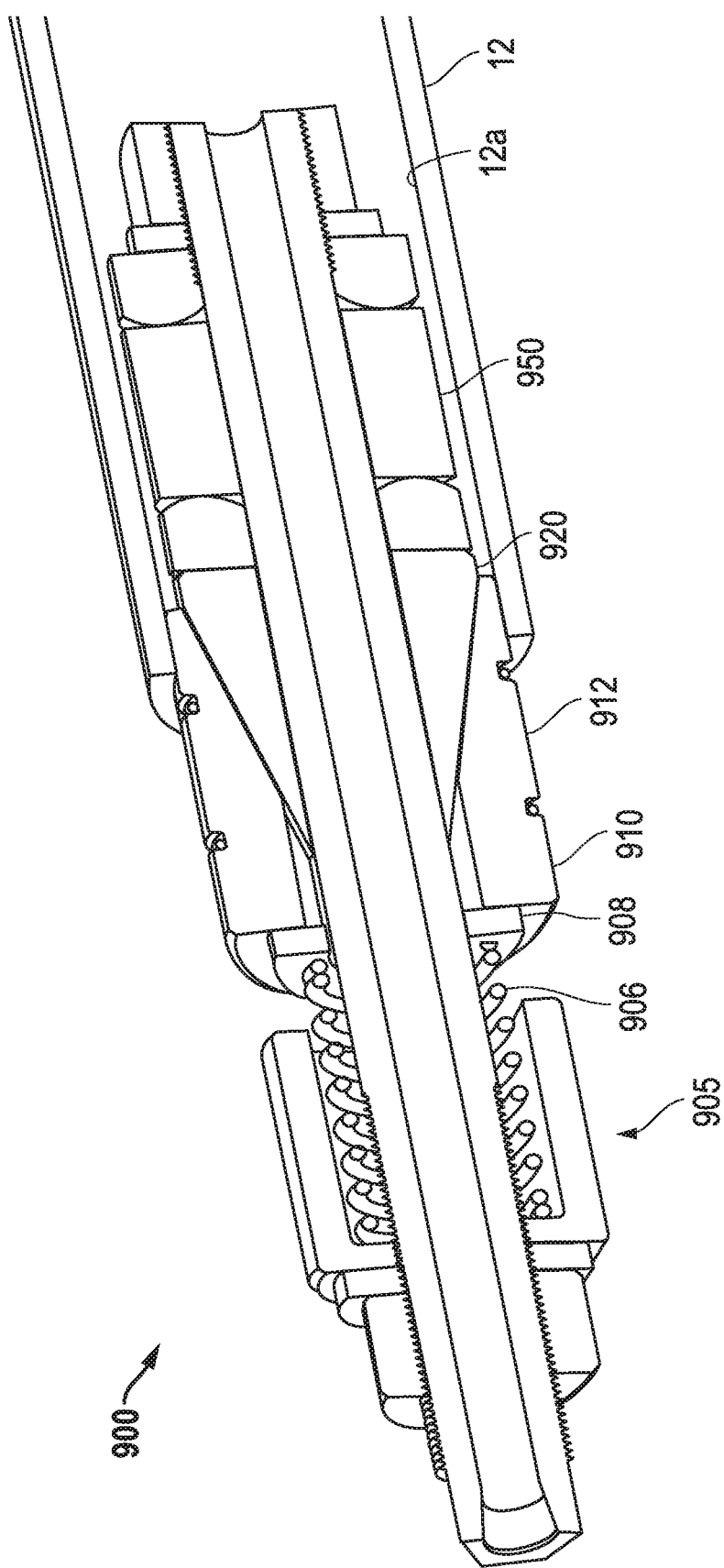
FIG. 62 depicts a schematic sectional perspective view of an exemplary embodiment of a collectively actuated-retracted and instantly gripping apparatus partly inserted into a pipe.

The "instantly gripping" or "instant gripping" as described for the gripping apparatus 900 may refer to the outer surface 940 of the discrete gripping devices 910 and/or wedge jaws 912 immediately engaging, securing, gripping or contacting the inner diameter 12a upon initial insertion (see e.g. FIG. 62). The "instantly gripping" or "instant gripping" as described for the gripping apparatus 900 may also refer to the nut 930 (or other collective and/or concurrent actuating-retracting element) fully tightening to the torque specification at the desired position for the gripping apparatus 900 to immediately engage, secure, grip and contact the discrete gripping devices 910 and/or wedge jaws 912 with full tension against the pipe inner diameter 12a (see e.g. FIG. 64).

One or more cones, cone wedges, tapered wedges or wedge blocks 920 may be slidably mounted onto the tube 902. The cone 920 may be substantially conical or frusto-conical in shape, and may be positioned such that the point 827 of the wedge cone 920 is directed towards the front end 901a of the tube 902. The wedge cone 920 may have a ramp or outer surface 926 that may include antifriction coatings or antifriction devices to reduce the deterioration of the surface 926.

The gripping apparatus 900 may include one or more discrete gripping devices 910. The discrete gripping devices 910 may be one or more gaps 911 (see e.g. FIG. 66) between each discrete gripping device 910 which may expand when the discrete gripping devices 910 are engaged against the pipe 12. A singular collectively or cooperatively gripping device 910 is considered within the disclosed embodiments herein.

Furthermore, the plurality of discrete gripping devices 910 may each include an inner surface 918 configured to set or rest against the outer surface or ramp 926 of the cone wedge 920. One or both of the inner surface 918 or the outer surfaces 926 may have an antifriction coating or device. The inner surface 918 of the plurality of discrete gripping devices 910 may form or be in the shape of a hollow conical pocket which matingly matches with the ramp or outer surfaces 926 of the wedge cones 920. The outer surface 940 of each discrete gripping device 910 or wedge jaw 912 may extend beyond the pipe inner diameter 12a (see, for example, FIG. 61) in the instantly gripping apparatus 900 such that the pipe inner diameter 12a is engaged by the discrete gripping devices 910 as the discrete gripping devices 910 are inserted into the pipe 12.

The discrete gripping devices 910 may define slots or grooves 916 circumferentially around, about or across the outer surface 940 of the plurality of discrete gripping devices 910. Circumferential biasing bands (such as, for example spring bands or band retraction springs, O-rings, or the like) 914 as inserted into the slots or grooves 916 may retain or bias the plurality of discrete gripping devices 910 in the gripping apparatus 900. Said circumferential biasing bands 914 may also be used for collective and/or concurrent retraction or disengagement of the discrete gripping devices 910 from gripping the pipe interior surface 12a. Each and every collectively or mutually biasing bands 914 may simultaneously collectively extend towards the pipe inside 12a, and subsequently, then simultaneously collectively retract each and every gripping device 910 and/or wedge jaw 912. The biasing bands 914 may collectively extend towards the pipe interior surface 12a as the biasing force of the biasing bands 914 is overcome, and may collectively retract or bias back towards the rod or tube 902 at other times, or when the biasing force of the biasing bands 914 is not overcome.

The outer surface 940 of the wedge jaws 912 or discrete gripping devices 910 may optionally have one or more transition surface(s) 919. Further discussion of similar transition surfaces 398 may be found in the description relating to FIGS. 37-40 and FIGS. 45-46. The outer surface 940 may also include a coating, surface coating or texturing 942 on said outer surface 940. The surface coating or texturing 942 may include a binding layer and a grit (see FIGS. 53-57 and related discussion).

One or more seals 950, clamping plates (or plates) 932 and/or washers 908 may be mounted onto the tube 902 adjacent to the discrete gripping devices 910 and wedge cone 920. A nut 930 and a compression spring actuator 905 may be mounted on an end of the gripping apparatus 900 adjacent to each other, towards the front end 901*a* of the seals 950, plates 932, washers 908 and/or wedge cone 920. The collectively or coactively nut 930 may be threaded onto the rod 902. The nut 930 may collectively transfer and remove force from the compression spring actuator 905, seals 950, plates 932, washers 908 and/or wedge cone 920 to collectively actuate and retract the gripping apparatus 900, respectively. The nut 930 may be one exemplary embodiment of a collective actuation-retraction mechanism, but other kinds or types of collective actuation-retraction mechanisms are possible and considered within the present disclosure, including, but not limited to, levers, cams, springs, chains, headed pins, pivoting links, cage, cables, tethers, pneumatic, and/or hydraulic mechanisms.

The compression spring actuator 905 may be mounted adjacent to the nut 930, wherein the compression spring actuator 905 is optionally sandwiched between washers 908 and positioned such that the force from the nut 930 is transferred to the compression spring actuator 905. The collectively or aggregately compression spring actuator 905 may include a spring cup or housing 907 and a spring 906. The cup or housing 907 may contain or house a portion or end of the spring 906. The collectively or aggregately cup 907 and the collectively or aggregately spring 906 may be adjacent to the discrete gripping devices 910, a wedge cone 920, washers 908, seal 950, and/or plates 932. Once into position at the desired depth within the pipe 12, and upon sufficient force from the nut 930, the compression spring actuator 905 collectively and instantaneously actuates the discrete gripping devices 910 to grip against the interior diameter 12*a* of the pipe 12.

Figure 61:
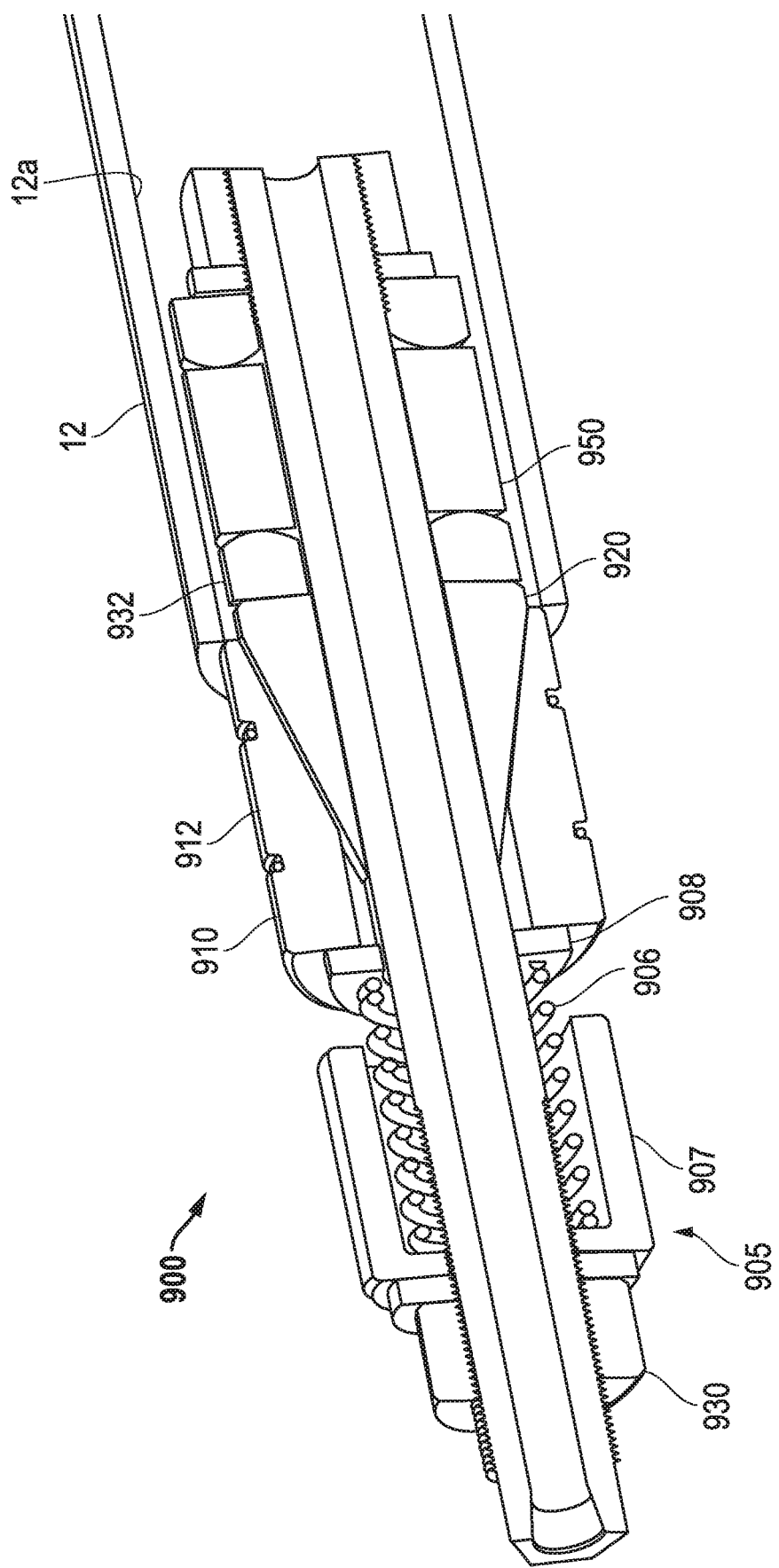
FIG. 61 depicts a schematic sectional perspective view of an exemplary embodiment of a collectively actuated-retracted and instantly gripping apparatus partly inserted into a pipe.
Figure 63:
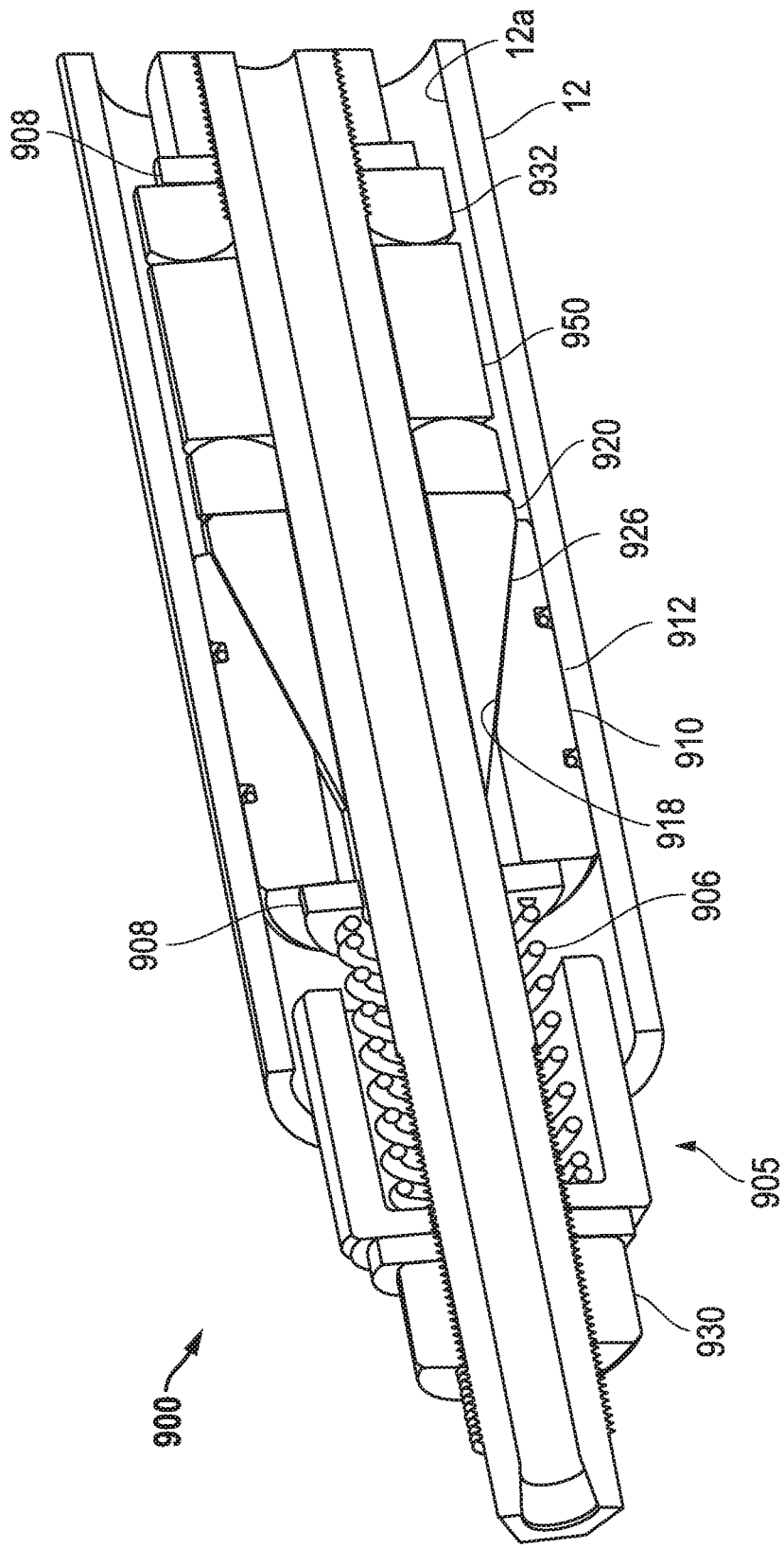
FIG. 63 depicts a schematic sectional perspective view of an exemplary embodiment of a collectively actuated-retracted and instantly gripping apparatus inserted into a pipe, wherein at least one discrete gripping device is placed to the desired depth within the pipe.
Figure 64:
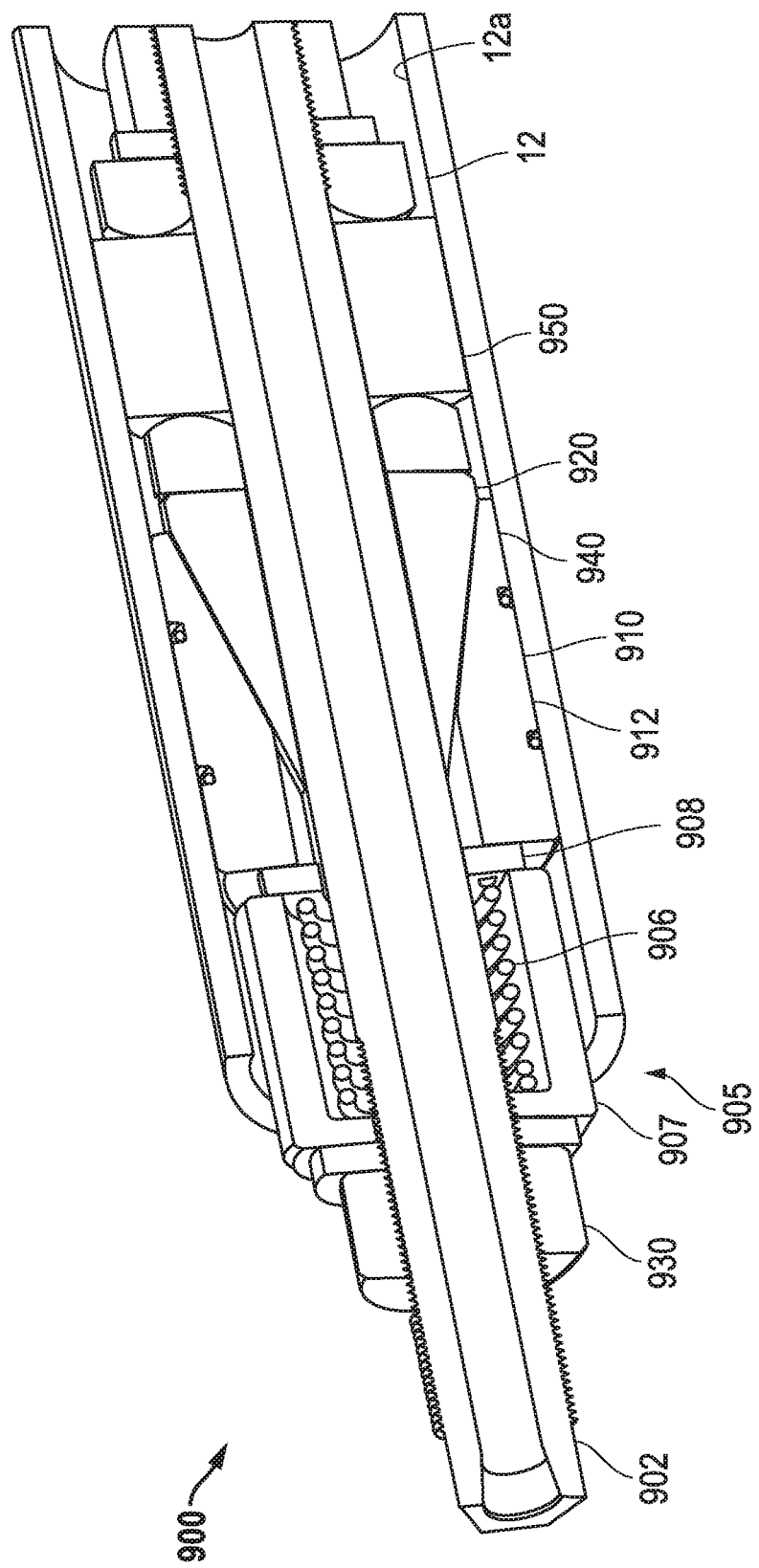
FIG. 64 depicts a schematic sectional perspective view of an exemplary embodiment of a collectively actuated-retracted and instantly gripping apparatus or plug inserted into a pipe, wherein the gripping apparatus or plug is collectively actuated and engaged with the pipe inner diameter.
Figure 65:
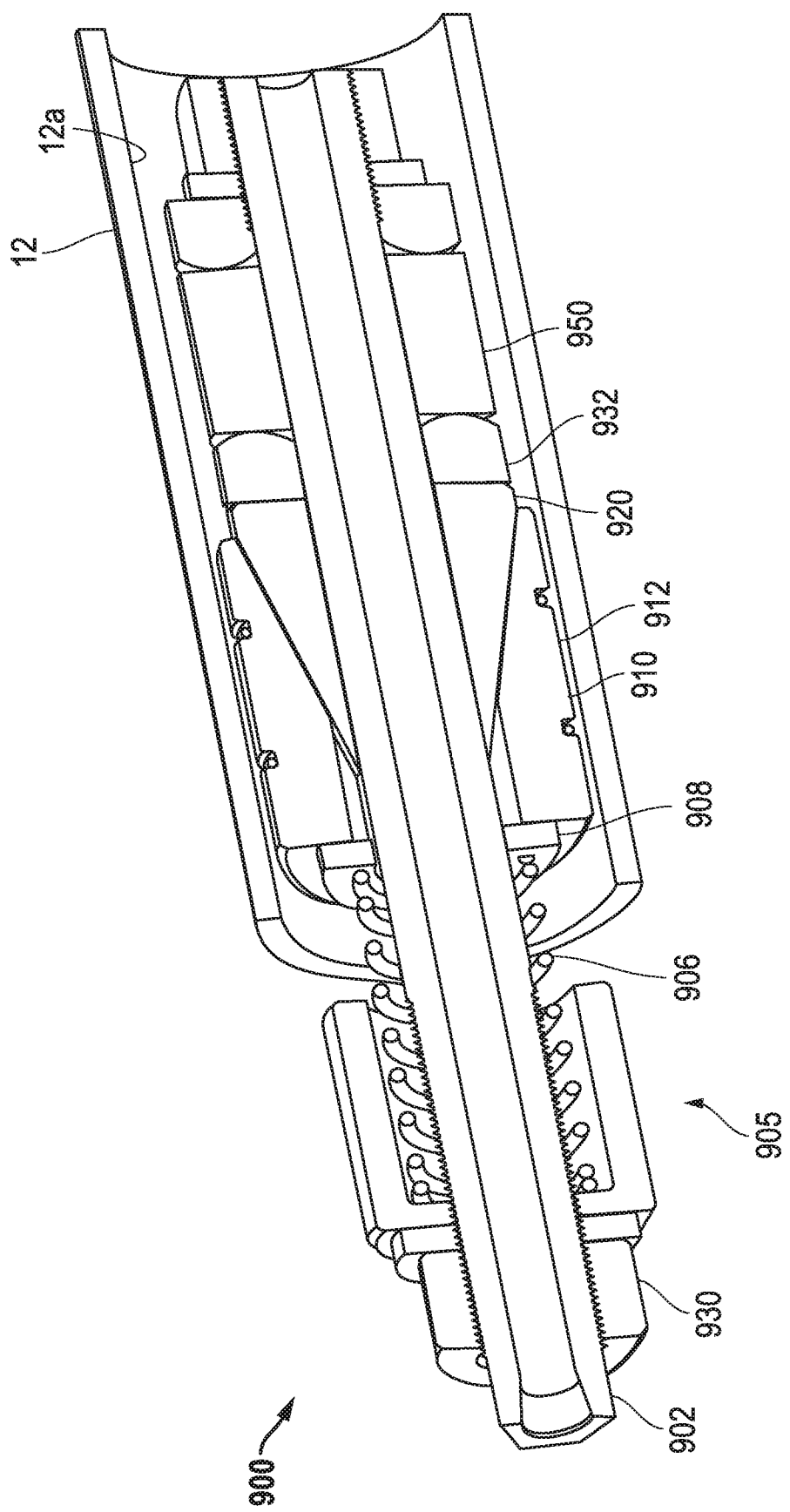
FIG. 65 depicts a schematic sectional perspective view of an exemplary embodiment of a collectively actuated-retracted and instantly gripping apparatus or plug inserted into a pipe, wherein the gripping apparatus or plug is collectively retracted from the pipe inner diameter.
Figure 66:
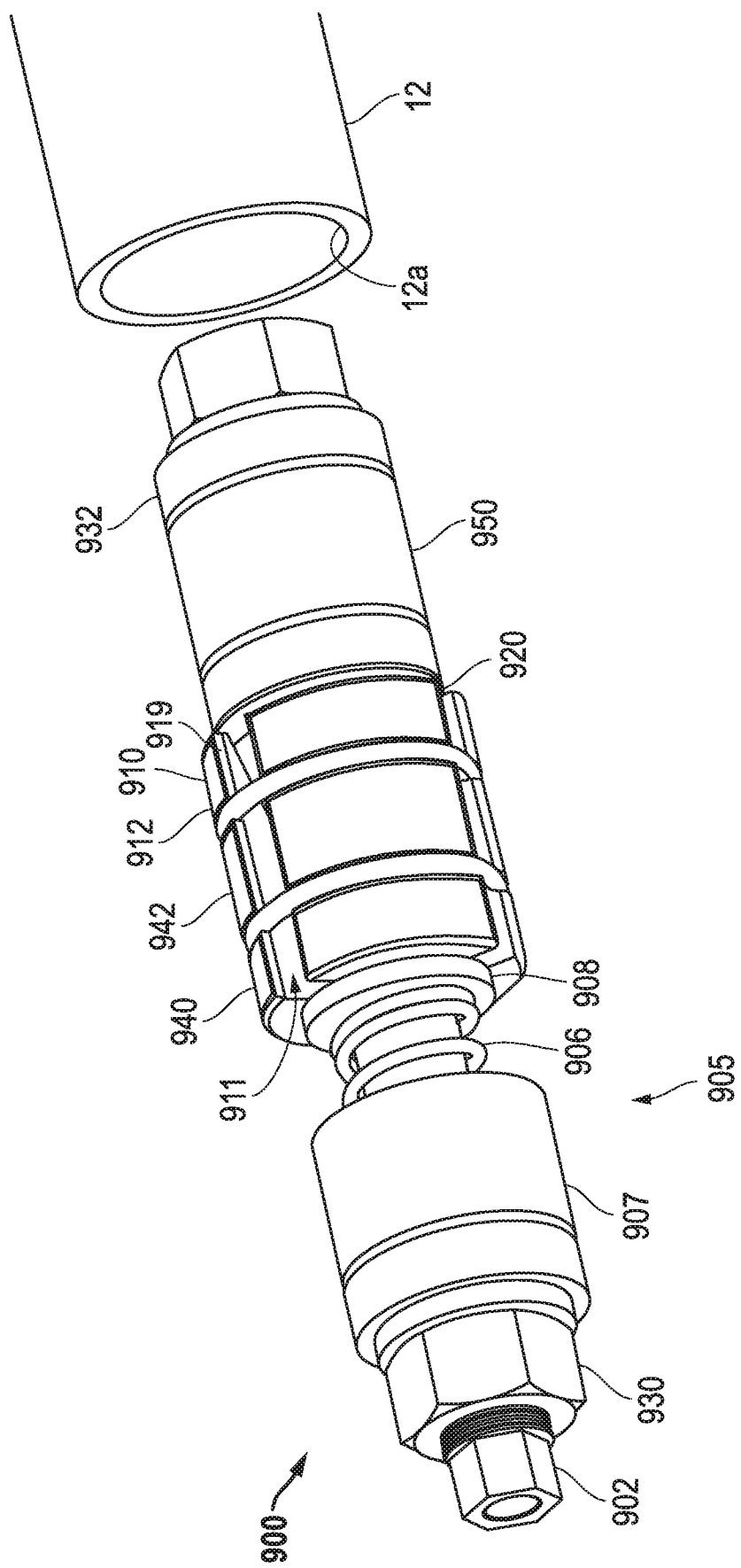
FIG. 66 depicts a perspective view of an exemplary embodiment of a collectively actuated-retracted and instantly gripping apparatus having at least one discrete gripping device with a textured outer surface.

Before insertion, the nut 930 is tightened to a point where the outer surface 940 of discrete gripping devices 910 or wedge jaws 912 extend beyond the pipe inner diameter 12*a*. In FIG. 61, the gripping device 900 is initially inserted or pushed into the pipe 12. The outer surface 940 of the gripping devices 910 and the wedge jaws 912 may also hit or engage an end of the pipe 12 upon insertion. In FIG. 62, the continued insertion of gripping apparatus 900 pushes the discrete gripping devices 910 or wedge jaws 912 into the wedge cone 920. The discrete gripping devices 910 or wedge jaws 912 are now biased against the pipe internal diameter 12*a* and instantly grip or engage the pipe internal diameter 12*a*. The spring 906 should not be fully compressed while in steps of FIG. 61-63 (i.e. there should still be room to compress spring 906)—this combined with the nut's 930 and spring's 906 initial pre-biasing of the wedge jaws 912 to extend beyond the inner diameter 12*a* of the pipe 12 allows the gripping apparatus 900 to continue to be slid, pushed, or inserted into the pipe 12 as the wedge jaws 912 grip against the pipe inner diameter 12*a*, yet blocks and prevents the gripping apparatus 900 from being removed from the pipe 12. In FIG. 63, the discrete gripping devices 910 or wedge jaws 912 are placed or have reached to the desired depth in the pipe 12. Even with the seal 950 not yet compressed, the discrete gripping devices 910 and/or wedge jaws 912 will keep the gripping apparatus 900 from being ejected from the pipe 12. In FIG. 64, the nut 930 is tightened to the torque specification to further engage the spring actuator cup 907 fully against the washer 908, further instantly gripping and securing the discrete gripping devices 910 and/or wedge jaws 912 with the full nut/bolt tension against the pipe inner diameter 12*a* and, also expanding the optional seal 950 to seal the pipe 12. In FIG. 65, after use and removal of any back pressure, the nut 930 may be backed off, untightened, or reversed, to allow the band springs (garter springs or O-rings) 914 to retract the discrete gripping devices 910 and/or wedge jaws 912 down the wedge cone 920 and such that the discrete gripping devices 910 and/or wedge jaws 912 are no longer in contact with the pipe inner diameter 12*a*. The seal 950 may also return to its steady state size, allowing the removal of the gripping apparatus 900 from the pipe 12. Note that in FIG. 65, the position of the nut 930 on the tube 902 is backed off to a position further back than the position of the nut 930 in FIG. 61 upon initial insertion (in which the nut 930 is threaded farther down the tube 902 to 'set' the spring 906 to bias the gripping devices 910 and wedge jaws 912).

While the embodiments are described with reference to various implementations and exploitations, it will be understood that these embodiments are illustrative and that the scope of the inventive subject matter is not limited to them. Many variations, modifications, additions and improvements are possible. For example, a spring may be combined in a wedge jaw in a dual wedge jaw design.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. A gripping apparatus, for use in connecting to a pipe wherein the pipe defines an inside radius, comprising:
    at least one discrete gripping device mounted in a body;
    an outer surface on each of the at least one discrete gripping device, wherein the outer surface has a coating;
    a collective actuation-retractable mechanism connected to the body;
    a collective extension-retractable mechanism connected to each of the at least one discrete gripping device; and
    a spring connected to the collective actuation-retraction mechanism, wherein an end of the spring is connected to the at least one discrete gripping device, and further wherein the at least one discrete gripping device is each initially biased by the spring to extend beyond the inside radius.

2. The gripping apparatus according to claim 1, wherein the at least one discrete gripping device defines a gap between each of the at least one discrete gripping device.

3. The gripping apparatus according to claim 2, wherein the outer surface defines one or more slots.

4. The gripping apparatus according to claim 3, wherein the collective extension-retractable mechanism comprises a biasing band and further wherein the biasing band is inserted into the slot.

5. The gripping apparatus according to claim 4, wherein the coating comprises a binding layer and a grit evenly distributed on the binding layer.

6. The gripping apparatus according to claim 5, wherein the grit has a grit size larger than #120.

7. The gripping apparatus according to claim 1, wherein the coating further comprises a grit exposed above the outer surface.

8. The gripping apparatus according to claim 7, wherein the grit has a grit size larger than #120.

9. The gripping apparatus according to claim 8, wherein the coating further comprises a binding layer beneath the grit.

10. The gripping apparatus according to claim 1, wherein the coating on the outer surface is comprised of tungsten carbide.

11. The gripping apparatus according to claim 1, wherein the coating on the outer surface is comprised of silicon carbide.

12. The gripping apparatus according to claim 1, wherein the coating on the outer surface is comprised of diamond with binder.

13. The gripping apparatus according to claim 1, wherein the coating on the outer surface is comprised of quartz with binder.

14. The gripping apparatus according to claim 1, wherein the outer surface is harder than a surface of the inside radius of the pipe.

15. The gripping apparatus according to claim 1, wherein the coating on the outer surface is comprised of fractured carbide.

16. A gripping apparatus, for use in connecting to a pipe wherein the pipe defines an inside radius, comprising a wedge cone in the gripping apparatus;
   at least one wedge jaw slidably mounted against the wedge cone;
   an outer surface defined on each of the at least one wedge jaw;
   a coating on each outer surface;
   a spring connected to the at least one wedge jaw, wherein the spring is initially configured to bias the outer surface of each of the at least one wedge jaw beyond the inside radius;
   a nut threaded onto the gripping apparatus, wherein the nut is configured to transfer and to remove force collectively to the spring and the at least one wedge jaw; and
   a biasing band mounted around the at least one wedge jaw, wherein the biasing band is configured collectively to extend the at least one wedge jaw towards the inside radius of the pipe and to retract the at least one wedge jaw from the inside radius of the pipe.

17. The gripping apparatus of claim 16, wherein the coating comprises a binding layer and a grit exposed above the binding layer.

18. The gripping apparatus of claim 17, wherein the grit is a carbide grit.

19. The gripping apparatus of claim 18, wherein the grit has a sieve designation larger than 125 μm.

20. The gripping apparatus of claim 19, wherein the binding layer comprises a brazing compound.

* * * * *